US012444393B1

(12) United States Patent
Janes

(10) Patent No.: US 12,444,393 B1
(45) Date of Patent: Oct. 14, 2025

(54) SYSTEMS, DEVICES, AND METHODS FOR DYNAMIC SYNCHRONIZATION OF A PRERECORDED VOCAL BACKING TRACK TO A LIVE VOCAL PERFORMANCE

(71) Applicant: Eidol Corporation, Studio City, CA (US)

(72) Inventor: Clayton Janes, Woodland Hills, CA (US)

(73) Assignee: Eidol Corporation, Studio City, CA (US)

( * ) Notice: Subject to any disclaimer, the term of this patent is extended or adjusted under 35 U.S.C. 154(b) by 0 days.

(21) Appl. No.: 19/182,460

(22) Filed: Apr. 17, 2025

(51) Int. Cl.
*G10H 1/36* (2006.01)
*G10L 15/02* (2006.01)

(52) U.S. Cl.
CPC ............. *G10H 1/366* (2013.01); *G10L 15/02* (2013.01); *G10H 2210/005* (2013.01);
(Continued)

(58) Field of Classification Search
CPC ............. G10H 1/366; G10H 2210/005; G10H 2210/031; G10H 2210/375; G10L 15/02; G10L 2015/025
(Continued)

(56) References Cited

U.S. PATENT DOCUMENTS 5,693,903 A * 12/1997 Heidorn ................. G10H 1/361 84/645
5,739,452 A * 4/1998 Nagata ................... G10H 1/366 84/630
(Continued)

FOREIGN PATENT DOCUMENTS

CN 115550776 A 12/2022
EP 1962278 A1 8/2008
(Continued)

OTHER PUBLICATIONS

Sangeon Yong, Juhan Nam, Singing Expression Transfer from One Voice to Another for a Given Song, 2018 IEEE International Conference on Acoustics, Speech and Signal Processing (ICASSP), Apr. 2018, pp. 151-155, Institute of Electrical and Electronics Engineers, Piscataway, New Jersey.
(Continued)

*Primary Examiner* — Christina M Schreiber
(74) *Attorney, Agent, or Firm* — Stone Creek Services LLC; Alan M Flum

(57) ABSTRACT

Disclosed are systems, methods, and devices, that overcome timing and self-expression limitations experienced by vocalists when using prerecorded vocal backing tracks to enhance live performances. The disclosed system, devices, and methods, dynamically synchronizes prerecorded vocal backing tracks with a live vocal stream by extracting vocal elements, such as phonemes, vector embeddings, or vocal audio spectra, from the live vocal performance in real-time. These extracted vocal elements are matched against corresponding timestamped vocal elements previously derived from the prerecorded vocal backing track, enabling precise real-time adjustment and alignment of the backing track timing to the live performance. Additionally, the system enhances expressive performance by identifying prosody factors, such as pitch, vibrato, accent, stress, dynamics, and level, in the live vocal performance, and dynamically adjusting corresponding prerecorded prosody factors within predefined ranges. This maintains naturalness and spontaneity in the vocalist's live performance, overcoming traditional limitations associated with prerecorded vocal backing tracks.

30 Claims, 36 Drawing Sheets

(52) U.S. Cl.
CPC . *G10H 2210/031* (2013.01); *G10H 2210/375* (2013.01); *G10L 2015/025* (2013.01)

(58) Field of Classification Search
USPC ........................................................... 84/634
See application file for complete search history.

(56) References Cited

U.S. PATENT DOCUMENTS

| | | | | | |
|---|---|---|---|---|---|
| 5,750,912 | A * | 5/1998 | Matsumoto | G10L 21/00 704/E21.001 |
| 5,753,845 | A * | 5/1998 | Nagata | G10H 1/0091 84/630 |
| 5,811,707 | A * | 9/1998 | Kakehashi | H04H 60/04 84/610 |
| 5,876,213 | A * | 3/1999 | Matsumoto | G10H 1/366 84/610 |
| 5,966,687 | A * | 10/1999 | Ojard | G10L 13/033 704/207 |
| 6,336,092 | B1 * | 1/2002 | Gibson | G10H 1/366 704/207 |
| 6,377,917 | B1 * | 4/2002 | Gimenez de los Galanes | G10L 21/04 704/266 |
| 6,836,761 | B1 * | 12/2004 | Kawashima | G10L 13/033 84/610 |
| 7,016,841 | B2 * | 3/2006 | Kenmochi | G10L 13/07 704/266 |
| 7,135,636 | B2 * | 11/2006 | Kemmochi | G10H 7/00 84/622 |
| 7,825,321 | B2 * | 11/2010 | Bloom | G10H 1/366 84/622 |
| 7,974,838 | B1 * | 7/2011 | Lukin | G10L 25/90 704/207 |
| 8,868,411 | B2 * | 10/2014 | Cook | G10L 21/013 84/610 |
| 9,412,390 | B1 * | 8/2016 | Chaudhary | G10L 21/00 |
| 9,754,571 | B2 * | 9/2017 | Salazar | G10L 21/013 |
| 10,540,139 | B1 * | 1/2020 | Janes | H04R 3/04 |
| 10,540,950 | B2 * | 1/2020 | Nurse | G10H 1/386 |
| 10,871,937 | B2 * | 12/2020 | Janes | H04R 3/04 |
| 10,885,894 | B2 * | 1/2021 | Nam | G10L 21/013 |
| 11,183,168 | B2 * | 11/2021 | Yu | G10L 21/007 |
| 11,232,787 | B2 * | 1/2022 | Winsor | G10L 15/02 |
| 11,398,223 | B2 * | 7/2022 | Kim | G10L 15/063 |
| 11,670,270 | B2 * | 6/2023 | Yang | G10H 1/366 84/611 |
| 2003/0140770 | A1 * | 7/2003 | Barry | G10H 1/361 84/610 |
| 2006/0112812 | A1 * | 6/2006 | Venkataraman | G10L 15/26 704/E15.045 |
| 2012/0234158 | A1 * | 9/2012 | Chan | G10L 13/0335 84/622 |
| 2017/0092252 | A1 * | 3/2017 | Lopiccolo | G10H 1/361 |
| 2018/0288467 | A1 * | 10/2018 | Holmberg | H04N 21/242 |
| 2019/0088161 | A1 * | 3/2019 | Humphrey | G06Q 50/20 |
| 2021/0055905 | A1 * | 2/2021 | Moldover | H04N 21/41407 |
| 2021/0191973 | A1 * | 6/2021 | Marchini | G06F 16/686 |
| 2021/0248985 | A1 * | 8/2021 | Yang | G10L 21/013 |
| 2021/0256968 | A1 * | 8/2021 | Winsor | G06F 16/685 |
| 2022/0051448 | A1 * | 2/2022 | Steinwedel | H04N 21/41407 |
| 2023/0082086 | A1 * | 3/2023 | Echeveste | G10H 1/361 84/636 |
| 2023/0351993 | A1 * | 11/2023 | Kinnunen | G10H 1/361 |

FOREIGN PATENT DOCUMENTS

| | | | |
|---|---|---|---|
| EP | 3869495 | A1 | 8/2021 |
| GB | 2422755 | A | 1/2005 |
| JP | 2000267677 | A | 10/2017 |
| WO | 2023227319 | A1 | 11/2023 |

OTHER PUBLICATIONS

Cristina Rottondi, Chris Chafe, Claudio Allocchio, and Augusto Sarti, An overview on networked music performance technologies, IEEE Access, vol. 4, pp. 8823-8843, Dec. 2016, Institute of Electrical and Electronics Engineers, Piscataway, New Jersey.
Patrick Cairns, Helena Daffern, and Gavin Kearney, Parametric Evaluation of Ensemble Vocal Performance Using an Immersive Network Music Performance Audio System, Journal of the Audio Engineering Society, vol. 69, No. 12, pp. 924-933, Dec. 2021, Audio Engineering Society, New York, New York.
Christopher Raphael, Music Plus One and Machine Learning. International Conference on Machine Learning (ICML) 2010, Jun. 2010, pp. 21-28.
Alex Baevski, Henry Zhou, Adelrahman Mohamed, Michael Auli, wav2vec 2.0: A Framework for Self-Supervised Learning of Speech Representations, Facebook AI, NIPS'20: Proceedings of the 34th International Conference on Neural Information Processing Systems Article No. 1044, Dec. 6, 2020, pp. 12449-12460 downloaded from the Internet from https://dl.acm.org/doi/pdf/10.5555/3495724.3496768 on Mar. 7, 2025.
Alex Baevski, Wei-Ning Hsu, Alexis Conneau, Michael Auli, Unsupervised Speech Recognition, NIPS'21: Proceedings of the 35th International Conference on Neural Information Processing Systems Article No. 2131, Dec. 6, 2021, pp. 27826-27839, downloaded from the Internet from https://proceedings.neurips.cc/paper/2021/file/ea159dc9788ffac311592613b7f71fbb-Paper.pdf on Mar. 9, 2025.
Zplane Elastique Pro 3.3.7 Documentation, Sep. 2021, zplane.development GmbH & Co. KG, downloaded from the Internet from https://licensing.zplane.de/uploads/SDK/ELASTIQUE-PRO/V3/manual/elastique_pro_v3_sdk_documentation.pdf on Mar. 13, 2025.
Kaizhi Qian, Yang Zhang, Heiting Gao, Junrui Ni, Cheng-I, Jeff Lai, David Cox, Mark Hasegawa-Johnson, Shiyu Chang, Contentvec: An Improved Self-Supervised Speech Representation by Disentangling Speakers, Proceedings of the 39th International Conference on Machine Learning, Baltimore, Maryland, USA, PMLR 162, 2022, downloaded from the Internet on Mar. 18, 2025 from https://arxiv.org/pdf/2204.09224.
Welcome to Matchmaker's Documentation!, dowloaded from the Internet at https://pymatchmaker.readthedocs.io/en/latest/ on Mar. 20, 2025.

* cited by examiner

124

| 124a | 124b | 124c |
|---|---|---|
| 0.93 | 1.33 | ˈɪts |
| 1.42 | 1.55 | ˈeɪ |
| 1.64 | 2.05 | ˈbju: |
| 2.08 | 2.32 | tə |
| 2.34 | 2.70 | fʊl |
| 2.75 | 2.84 | ˈdeɪ |
| 2.84 | 2.95 | ˈəʊ |

FIG. 4

134

| 134b | 134a |
|---|---|
| 0.90 | $n_1$ $n_2$ $n_3$ $n_4$ $n_5$ $n_6$ $n_7$ $n_8$ ... $n_{299}$ $n_{300}$ |
| 0.92 | $n_1$ $n_2$ $n_3$ $n_4$ $n_5$ $n_6$ $n_7$ $n_8$ ... $n_{299}$ $n_{300}$ |
| 0.94 | $n_1$ $n_2$ $n_3$ $n_4$ $n_5$ $n_6$ $n_7$ $n_8$ ... $n_{299}$ $n_{300}$ |
| 0.96 | $n_1$ $n_2$ $n_3$ $n_4$ $n_5$ $n_6$ $n_7$ $n_8$ ... $n_{299}$ $n_{300}$ |
| 0.98 | $n_1$ $n_2$ $n_3$ $n_4$ $n_5$ $n_6$ $n_7$ $n_8$ ... $n_{299}$ $n_{300}$ |
| 1.00 | $n_1$ $n_2$ $n_3$ $n_4$ $n_5$ $n_6$ $n_7$ $n_8$ ... $n_{299}$ $n_{300}$ |
| 1.02 | $n_1$ $n_2$ $n_3$ $n_4$ $n_5$ $n_6$ $n_7$ $n_8$ ... $n_{299}$ $n_{300}$ |
| 1.04 | $n_1$ $n_2$ $n_3$ $n_4$ $n_5$ $n_6$ $n_7$ $n_8$ ... $n_{299}$ $n_{300}$ |
| 1.06 | $n_1$ $n_2$ $n_3$ $n_4$ $n_5$ $n_6$ $n_7$ $n_8$ ... $n_{299}$ $n_{300}$ |
| 1.08 | $n_1$ $n_2$ $n_3$ $n_4$ $n_5$ $n_6$ $n_7$ $n_8$ ... $n_{299}$ $n_{300}$ |
| 1.10 | $n_1$ $n_2$ $n_3$ $n_4$ $n_5$ $n_6$ $n_7$ $n_8$ ... $n_{299}$ $n_{300}$ |
| 1.12 | $n_1$ $n_2$ $n_3$ $n_4$ $n_5$ $n_6$ $n_7$ $n_8$ ... $n_{299}$ $n_{300}$ |
| 1.14 | $n_1$ $n_2$ $n_3$ $n_4$ $n_5$ $n_6$ $n_7$ $n_8$ ... $n_{299}$ $n_{300}$ |
| 1.16 | $n_1$ $n_2$ $n_3$ $n_4$ $n_5$ $n_6$ $n_7$ $n_8$ ... $n_{299}$ $n_{300}$ |

FIG. 5

144

144b 144a

| | |
|---|---|
| 0.90 | FFT #1 |
| 0.91 | FFT #2 |
| 0.92 | FFT #3 |
| 0.93 | FFT #4 |
| 0.94 | FFT #5 |
| 0.95 | FFT #6 |
| 0.97 | FFT #7 |
| 0.98 | FFT #8 |
| 0.99 | FFT #9 |
| 1.00 | FFT #10 |
| 1.01 | FFT #11 |
| 1.02 | FFT #12 |
| 1.03 | FFT #13 |
| 1.04 | FFT #14 |

FIG. 6

SYSTEMS, DEVICES, AND METHODS FOR DYNAMIC SYNCHRONIZATION OF A PRERECORDED VOCAL BACKING TRACK TO A LIVE VOCAL PERFORMANCE

BACKGROUND

Audience enjoyment of live music often hinges on the quality and consistency of the vocalist's performance. Even seasoned professionals frequently encounter various challenges during live performances. These challenges may include vocal strain from rigorous touring schedules, age-related changes in vocal range and stamina, lifestyle factors impacting vocal health, fatigue from travel and from consecutive performances, and illness adversely impacting vocal quality. Such challenges may significantly diminish a vocalist's overall performance quality, undermining their confidence and detracting from the audience experience.

To address such performance challenges, performing artists may utilize prerecorded vocal backing tracks. A prerecorded vocal backing track is a previously captured recording of a vocalist's performance, intended to support, supplement, or entirely replace segments of their live vocal performance. Typically, such tracks are recorded in controlled settings, such as professional recording studios, to ensure optimal vocal quality. During live performances, a playback engineer manually cues and initiates playback of the prerecorded vocal backing track at precise moments. The front-of-house audio engineer subsequently mixes the prerecorded vocal backing track with the live vocal signal during selected portions of the performance, occasionally substituting the prerecorded track entirely for specific song segments. In scenarios where a prerecorded vocal backing track fully replaces or significantly supplements live vocals, the vocalist often must mime or "lip-sync" their performance so it visually aligns with the prerecorded vocal track.

SUMMARY

The Inventor, through extensive experience in performance technology for major touring acts, has identified significant drawbacks in current prerecorded vocal backing track usage.

First, while the prerecorded vocal backing track is in use, the vocalist's timing is critical. The vocalist needs to carefully mime or mimic the performance and make sure that their lip and mouth movements follow the prerecorded vocal backing track. Second, when the prerecorded vocal backing track is used to replace segments of a vocalist's live singing, unique nuances of their live performance, such as deliberate changes in timing, pitch, vibrato, and emphasis, are lost.

The Inventor's systems, devices, and methods, overcome the timing issues discussed above by dynamically controlling timing of a prerecorded vocal backing track in realtime, so it is time-synchronized to the live vocal performance. They overcome the self-expression issue by identifying prosody factors such as vibrato, accent, stress, and level (loudness or volume) in the live vocal performance. These prosody factors are then applied, within a preset range, to corresponding prosody factors in the prerecorded vocal backing track in realtime.

The prerecorded vocal backing track is preprocessed, before the live vocal performance, to identify, extract, and timestamp vocal elements such as phonemes, vector embeddings, or vocal audio spectra. The system may also identify, extract, and timestamp prosody parameters such as level, vibrato, accent, pitch, and stress.

Unlike music learning and practice systems that perform tempo matching (i.e., detect and match musical beats measured in beats/minute), timestamping vocal elements as described within this disclosure, allows for precision alignment of vocals within a prerecorded vocal backing track in realtime (i.e., approximately 30 milliseconds or less). This allows timestamping, as described in this disclosure, sufficient for miming or lip syncing in a live performance venue.

Before the live performance, the prerecorded vocal backing track along with the timestamped vocal elements that were extracted from the prerecorded vocal backing track, are preloaded into a vocal backing track synchronization unit. During the live vocal performance, the vocal backing track synchronization unit aligns the prerecorded vocal backing track to match the timing of the live vocal performance in realtime. It does so by extracting and identifying vocal elements from the live vocal performance as they occur. It then matches the extracted live stream vocal elements to the timestamped vocal elements. Typically, this extraction, matching, and alignment process may be accomplished using a machine-learning predictive algorithm. With the timestamped vocal elements matched, a dynamic synchronization engine, or algorithm, time compresses or expands the vocal elements within the prerecorded vocal backing track to match the timing of the corresponding vocal elements in the live vocal performance. This entire process may take place in realtime (i.e., typically 30 ms or less). The vocal element identification and extraction software within the vocal backing track synchronization unit, may be pretrained by the playback engineer or by the vocalist, before the live performance to help facilitate vocal element identification.

Vocal element types such as phonemes, vocal audio spectra, and vector embedding may be used alone or in combination with one another. If the system uses multiple vocal element types at the same time, the system may use a confidence weighting system to predict more accurate alignment. This can reduce processing latency while maintaining accurate synchronization and prevent unnecessary correction. A confidence score is a numerical value that reflects the probability that the live vocal performance and the prerecorded vocal backing track are time-synchronized. A confidence score may be dynamically assigned by comparing the time position of a vocal element within the live vocal stream to a corresponding timestamped vocal element extracted from the prerecorded vocal backing track signal. For example, phonemes may use connectionist temporal classification between the two signals to create a confidence score. Vector embedding may use cosine similarity to create a confidence score. Vocal audio spectra may use spectral correlation to create a confidence score. The device takes an average of the confidence scores. The device, would time-stretch or time compress the prerecorded vocal backing track signal in realtime to maintain alignment if the confidence level of the average of the confidence scores falls below a predetermined threshold.

Phoneme and vector embedding identification, matching, and extraction may be carried out using machine learning models such as ContentVec, Wave2Vec 2.0, Whisper, Riva, and HuBERT. Vocal audio spectra may be extracted, for example, using a fast Fourier Transform (FFT) or short-time Fourier transfer (STFT). Additional predictive modeling techniques may be used to enhance alignment accuracy. Examples of these additional predictive models include Kalman filters, state-space modules, reinforced learning, and deep learning neural networks.

Time alignment, or time-synchronization of the prerecorded vocal backing track to the live vocal performance, or live vocal stream, may be carried out using a dynamic time-compression and expansion engine. For example, by software modules such as Zplane Élastique, Dirac Time Stretching, Zynaptiq ZTX, or Audiokinetic Wwise to perform dynamic time warping. Time alignment may alternatively be carried out using neural network-based phoneme sequence modeling, reinforcement learning-based synchronization, or hybrid predictive time warping. For example, the next phoneme timing, without computing a full cosine transform matrix, might be predicted using a neural network-based phoneme sequencing model, a recurrent neural network, or a transformer.

The following is a non-limiting example of how the vocal backing track synchronization unit may dynamically control one or more prosody parameters within the prerecorded vocal backing track. Before the live performance, vector embeddings and prosody factors may be extracted from the prerecorded vocal backing track. During this preprocessing phase, the preprocessing system creates a timestamped and contextual prosody factor map. The map is loaded into the vocal backing track synchronization unit before the live performance. During the live performance, vector embeddings extracted from the vocal stream are continuously loaded into the predictive model in realtime. The system generates short-term predictions, for example, 50-200 milliseconds ahead of the current position. These predictions are passed into the audio manipulation engine for synchronization. The prosody parameters are adjusted within a preset range according to user input controls. This preset range may be adjusted for example, by the live playback engineer (i.e., the engineer responsible for the backing tracks and other effects) or by the front-of-house engineer (the engineer responsible for sending the final mix to the audience). In this example, if the vocalist sings off key, the prerecorded vocal backing track can be adjusted to reflect variation in the singer's pitch, but within a more acceptable and pleasing range. In another example, if the vocalist sings louder or softer, the prerecorded vocal backing track can be adjusted automatically to reflect this variation in the singer's loudness, but within an acceptable range. This preset range may be adjusted for example, by the live playback engineer or by the front-of-house engineer.

The vocal backing track alignment system may include a microphone preamplifier, an analog-to-digital converter, one or more processors, and a tangible medium such as a solid-state drive or SSD, DRAM, hard drive, or other digital storage medium. These devices may be housed together and presented as a standalone device (for example, within a vocal backing track synchronization unit). Alternatively, the components may be presented in separate units.

As an example, the microphone preamplifier within the standalone device may be structured to receive a live vocal performance from a microphone. The analog-to-digital converter may be connected to the microphone preamplifier and may be structured to produce a digital audio signal. The tangible medium may include software routines that instruct one or more of the processors to dynamically control the timing of a prerecorded vocal backing track in realtime. It does so by using vocal elements extracted from the live vocal performance.

The playback engineer may control the standalone device by an interface within the device or by a software interface from a computer or mobile device in communication with the standalone device. Both the live vocal signal and the prerecorded vocal backing track may be sent to the front-of-house audio mixing console. The signals may be sent as a multichannel digital audio signal, for example, via MADI, AES67, ADAT Lightpipe, Dante, or Ravenna. Alternatively, the signals may be sent to the front-of-house mixer as analog audio signals.

The front-of-house mixer also receives audio signals from the other performers such as guitar players, keyboardists, drummers, horns, or acoustic string instruments. The front-of-house engineer mixes the signals and sends the resulting mix to speakers for the audience to hear.

This Summary discusses various examples and concepts. These do not limit the inventive concept. Other features and advantages can be understood from the Detailed Description, figures, and claims.

BRIEF DESCRIPTION OF DRAWINGS

FIGS. 4, 5, and 6 illustrate a conceptual view of a timestamped phoneme table, timestamped multi-dimensional vector embeddings, and timestamped FFT-generated spectral data, respectively.

DETAILED DESCRIPTION

The Detailed Description and claims may use ordinals such as "first," "second," or "third," to differentiate between similarly named parts. These ordinals do not imply order, preference, or importance. Unless otherwise indicated, ordinals do not imply absolute or relative position. This disclosure uses "optional" to describe features or structures that are optional. Not using the word "optional" does not imply a feature or structure is not optional. In this disclosure, "or" is an "inclusive or," unless preceded by a qualifier, such as either, which signals an "exclusive or." As used throughout this disclosure, "comprise," "include," "including," "have," "having," "contain," "containing" or "with" are inclusive, or open ended, and do not exclude unrecited elements. The words "a" or "an" mean "one or more."

This disclosure uses the terms front-of-house engineer or playback engineer as examples of persons typically found in a large-venue live sound production. The term live sound engineer is used to denote a person operating a live sound mixer, or PA mixer, in a general live sound setting. The disclosure uses the term mix engineer to describe a person operating an audio mixing console or a digital audio workstation within a recording studio. The term live broadcast engineer is used to denote a person operating audio equipment during a live television or streaming broadcast. The operation of these systems or devices are not limited to such individuals. Within the meaning of this disclosure, the more general terms "operator" or "equipment operator" equally apply and are equivalent.

The Detailed Description includes the following sections: "Definitions," "Overview," "General Principles and Examples," and "Conclusion and Variations."

Definitions

Lip Syncing: As defined in this disclosure, lip syncing means the act of a live vocal performer miming or mimicking a prerecorded performance so that their lip or mouth movements follow the prerecorded performance.

Vocal Elements: As defined in this disclosure, a vocal element is a representation or descriptor of a vocal (singing) signal, which may be derived directly from it physical/acoustic properties or generated by data driven methods. Examples of physical/acoustic properties include phonemes, frequency spectra, or time-domain signal envelopes. Examples of data driven methods include vector embeddings that may encode acoustic, linguistic, semantic, or other vocal attributes.

Overview

Figure 1:
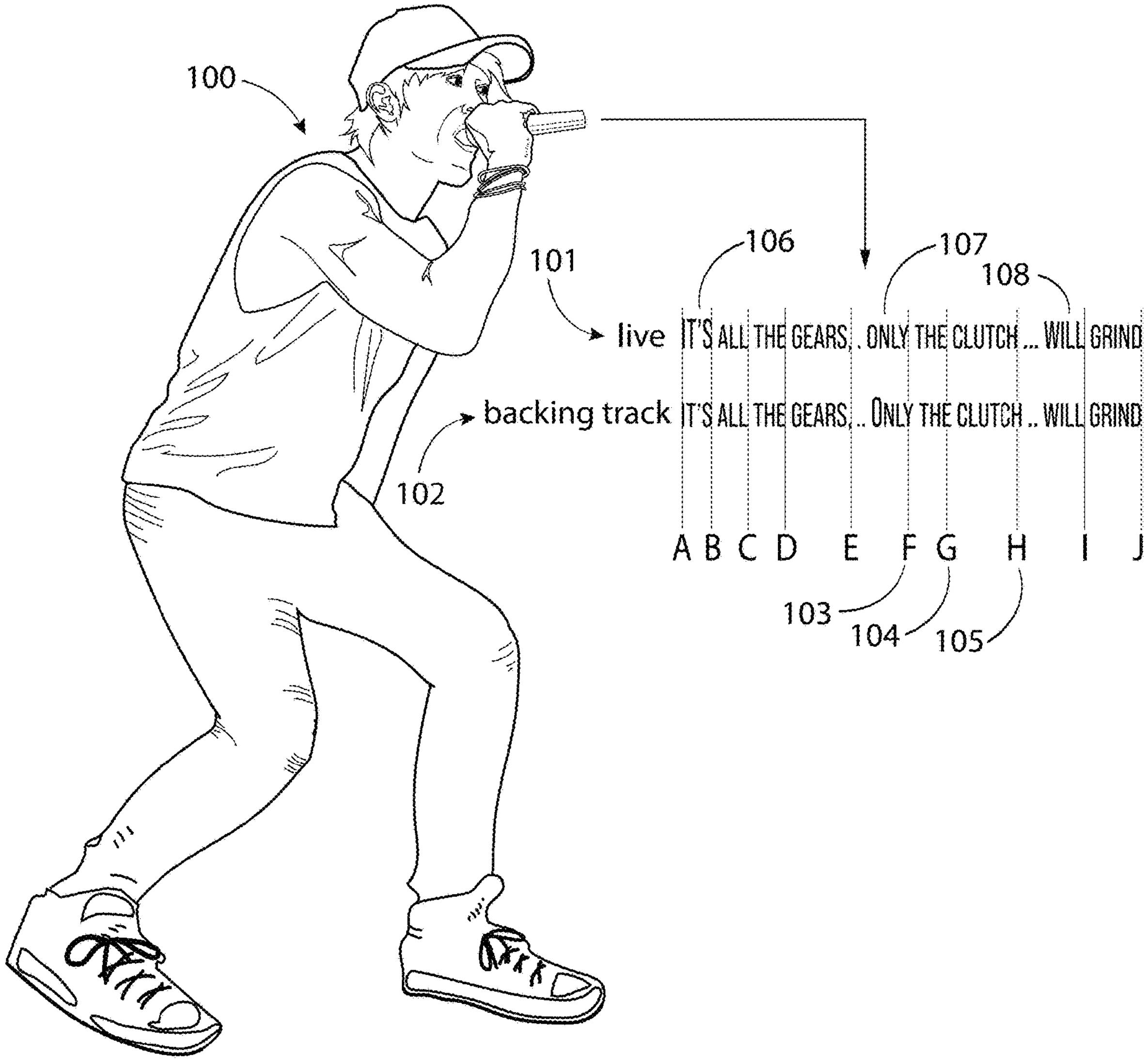
FIG. 1 illustrates, a vocalist singing lyrics with portions that deviate from a prerecorded vocal backing track.

As discussed in the Summary, the Inventor through extensive experience in performance technology for major touring acts, has identified significant drawbacks in current prerecorded vocal backing track usage. The Inventor observed that while prerecorded vocal backing tracks are useful in helping to enhance live vocal performances, they have a number of drawbacks. First, while the prerecorded vocal backing track is in use, the vocalist's timing is critical. The vocalist needs to carefully mime or mimic the performance and make sure that their lip and mouth movements follow the prerecorded vocal backing track. Second, prerecorded vocal backing tracks can remove a degree of individual expression as they do not allow for the vocalist to spontaneously express themselves. Referring to FIG. 1, as an example, say that a vocalist 100 had trouble during a particular performance, because of a scratchy throat, hitting certain notes in the phrase: "It's all the gears, only the clutch will grind." Knowing this, the playback engineer decides to use a portion of a prerecorded vocal backing track 102 to help the vocalist 100 through that particular phrase. In this scenario, the live vocal performance 101 has different timing and different emphasis on some of the words than the prerecorded vocal backing track 102. The timing differences may cause a potentially visible lip-sync discrepancy at position F 103, position G 104, and position H 105. Even if the timing discrepancies were not visible, expressiveness would be lost. This is because the playback engineer chose to use the prerecorded vocal backing track 102 in order to mask the vocalist potentially singing off key. The articulation of the words from the live vocal performance 101, "It's," at position 106, "only," at position 107, and "will" at position 108, would be lost.

Figure 2:
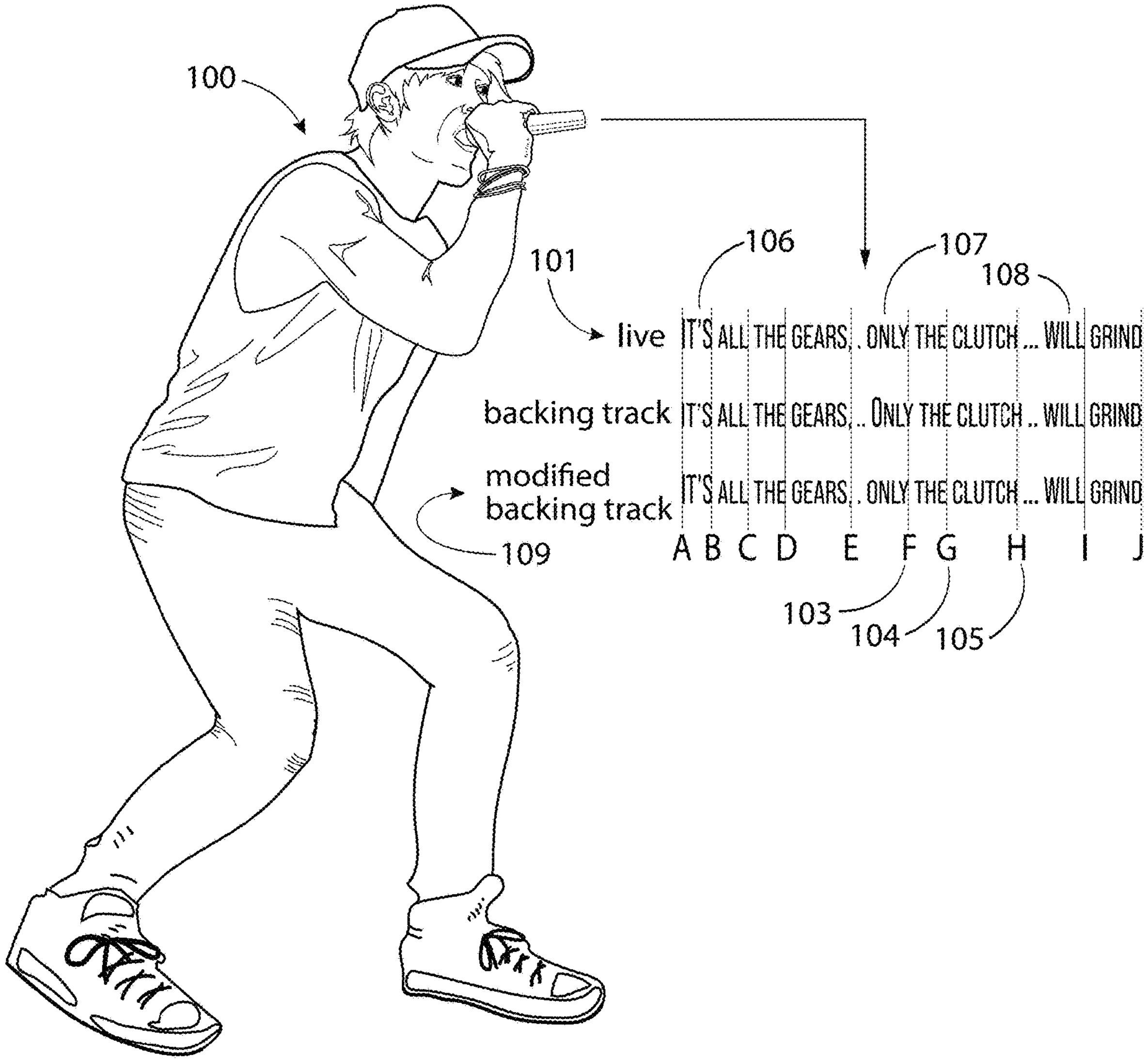
FIG. 2 illustrates, the vocalist signing lyrics where the prerecorded vocal backing track is modified in realtime in response to the vocalist's live vocal performance.

The Inventor developed a device, system, and method for overcoming these potential drawbacks while still retaining the advantages of using a prerecorded vocal backing track 102. The Inventor's system and device uses the live vocal performance 101 to manipulate the timing and prosody of the prerecorded vocal backing track 102. FIG. 2 shows the same hypothetical scenario as FIG. 1, but this time with the addition of a modified backing track 109 processed by the Inventor's system or device. The modified backing track 109 retains the pitch of the prerecorded vocal backing track 102 while retaining the expressiveness of the vocalist's performance. The modified backing track 109 now matches the timing at position F 103, position G 104, and position H 105 of the live vocal performance 101. The modified backing track 109 also matches the emphasis of the live vocal performance 101 at position 106, position 107, and position 108. In this scenario, the audience hears the vocalist 100 singing in key, thanks to the modified backing track 109 being time-synchronized to the live vocal performance 101 with nuances and timing of his live performance.

General Principles and Examples

Figure 3:
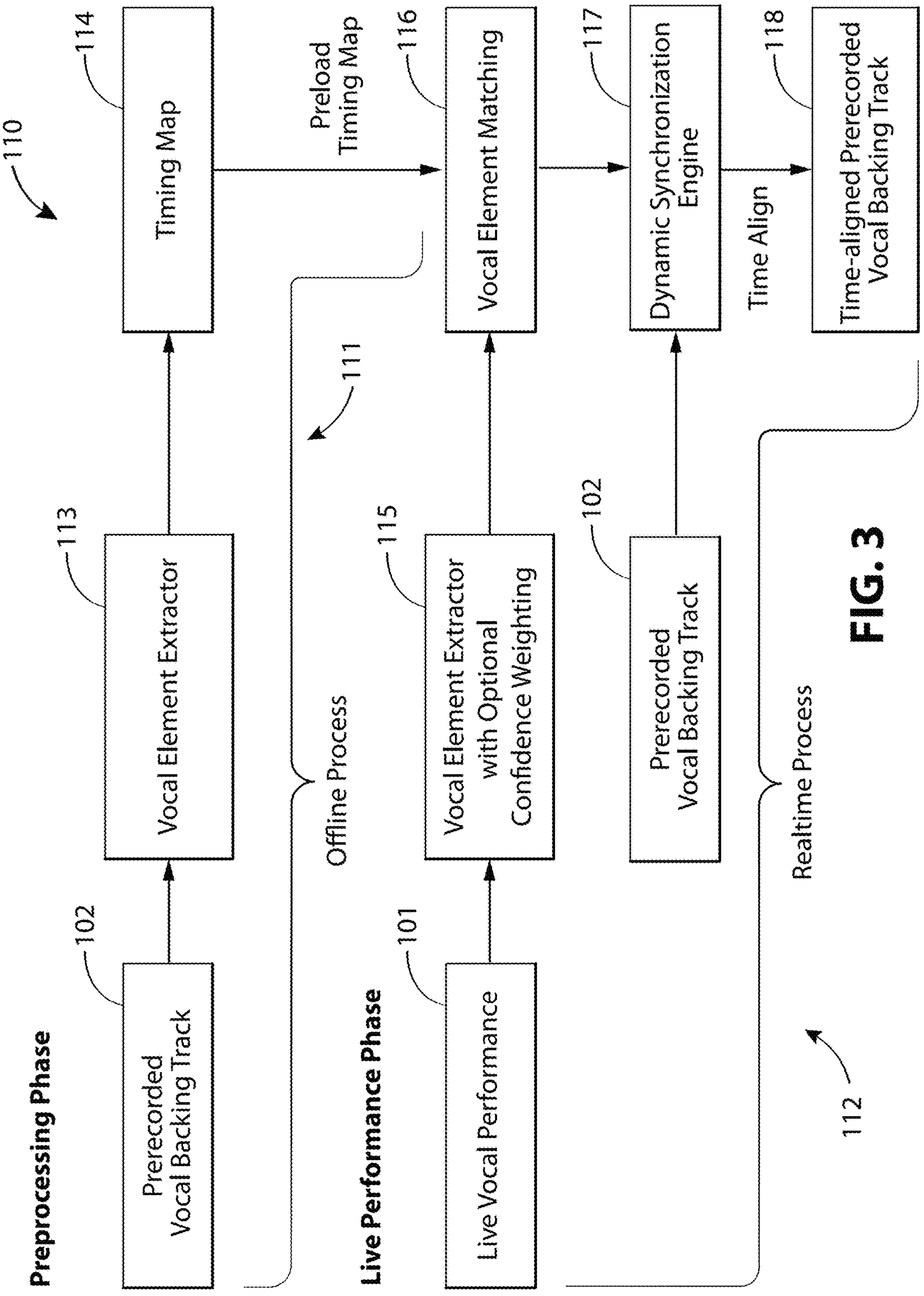
FIG. 3 illustrates a conceptual overview of the preprocessing phase and live performance phase of the vocal element extraction and synchronization system.

The Inventor's system, device, and method, overcome the timing issues discussed above, by dynamically controlling the timing of a prerecorded vocal backing track in realtime, using vocal elements, such as phonemes, vector embeddings, or vocal audio spectra, extracted from a live vocal performance. The device and system may optionally dynamically control one or more prosody parameters within the prerecorded vocal backing track. FIG. 3 illustrates a conceptual overview of a vocal element extraction and synchronization system 110. The process is separated into a preprocessing phase 111 and a live performance phase 112. The preprocessing phase extracts vocal elements, such as phonemes, vector embeddings, feature vectors, or audio spectra, from the prerecorded vocal backing track 102. The system then time stamps the extracted vocal elements, and stores the timestamped vocal elements in a vocal element timing map 114. During the live performance phase 112, the vocal element timing map 114 acts as a "blueprint" to aid the system to dynamically match vocal elements extracted from the live vocal performance 101 with corresponding timestamped vocal elements extracted during the preprocessing phase 111.

One of the challenges faced by the Inventor was how to extract vocal elements, such as phonemes, vector embeddings, and vocal audio spectra. Then match these vocal elements to corresponding vocal elements in the backing track. And then take the matched vocal elements and adjust the timing in the vocal backing track in realtime so that any processing delays are not perceptible. The threshold of perception for processing delay is typically about 30 milliseconds or less, with less delay being better. For the purpose of this disclosure we will refer to a delay of approximately 30 milliseconds or less as "realtime." The Inventor discovered that the he could reduce processing delays by preprocessing the prerecorded vocal backing track 102 as described above, offline, before the live vocal performance. Preprocessing the prerecorded vocal backing track 102 has several advantages. First, the prerecorded vocal backing track 102 can be processed more accurately then would be possible during the live vocal performance 101 because there is not a realtime processing constraint. Second, the additional overhead of identifying and timestamping vocal elements in the prerecorded vocal backing track 102 in realtime during the live vocal performance 101 is eliminated. This allows the live performance algorithm to focus on identifying the vocal elements in the live vocal performance and matching these to timestamped vocal elements preidentified within the prerecorded vocal backing track.

During the preprocessing phase 111, the prerecorded vocal backing track 102 may be analyzed by a vocal element extractor 113. The vocal element extractor 113 identifies and extracts individual vocal elements and creates corresponding time stamps for each vocal element. The timestamped vocal elements are stored then in a vocal element timing map 114. How the time stamp is characterized, depends on the type of vocal element, for example, phonemes, vector embeddings, or vocal audio spectra. FIG. 4 illustrates an example of a phoneme timing map 124, which stores the start position **124*a*, the stop position 124*b*, of each of the phonemes 124*c*. In this example, the sung phrase "it's a beautiful day" is stored as phonemes 124*c*, each with a start position 124*a* and a stop position 124*b*. FIG. 5, for example, shows a vector embeddings timing map 134, with a vector embeddings with three hundred dimensions (i.e., three hundred values) taken every ten 10 milliseconds. For each timestamped vector embeddings 134*a* is a time 134*b*. For illustrative purposes, the numerical value of each dimension within the vector embeddings is represented by the letter "n" with a corresponding subscript. FIG. 6, shows an example of the vocal audio spectra timing map 144, with vocal audio spectra taken every ten 10 milliseconds. For each timestamped vocal audio spectra 144*a* is a time 144*b***, representing the time which the vocal audio spectra was taken.

Referring to FIG. 3, before the live vocal performance 101, the vocal element timing map 114 and the prerecorded vocal backing track 102 are preloaded into the device that performs the live vocal element extraction and alignment. During the live performance phase 112, the vocal element extraction unit 115 identifies and extracts vocal elements from the live vocal performance 101. The vocal element matcher 116 compares the vocal elements extracted from the live vocal performance 101 with the vocal element timing map 114 created during the preprocessing phase 111. The vocal element matcher 116 may use predictive algorithms to match vocal elements extracted from the live vocal performance to the timestamped vocal elements within the vocal element timing map 114. Based on the time prediction from the vocal element matcher 116, the dynamic synchronization engine 117 may dynamically time-stretch or compress the prerecorded vocal backing track 102 to match the timing of the live vocal performance. This results in a dynamically controlled prerecorded vocal backing track 118 is time-synchronized to the live vocal performance 101. This process of identifying the vocal elements from the live vocal performance 101, matching the vocal elements to the timestamped vocal elements within the vocal element timing map 114, and adjusting the timing of the prerecorded vocal backing track 102, occurs in realtime.

Figure 7:
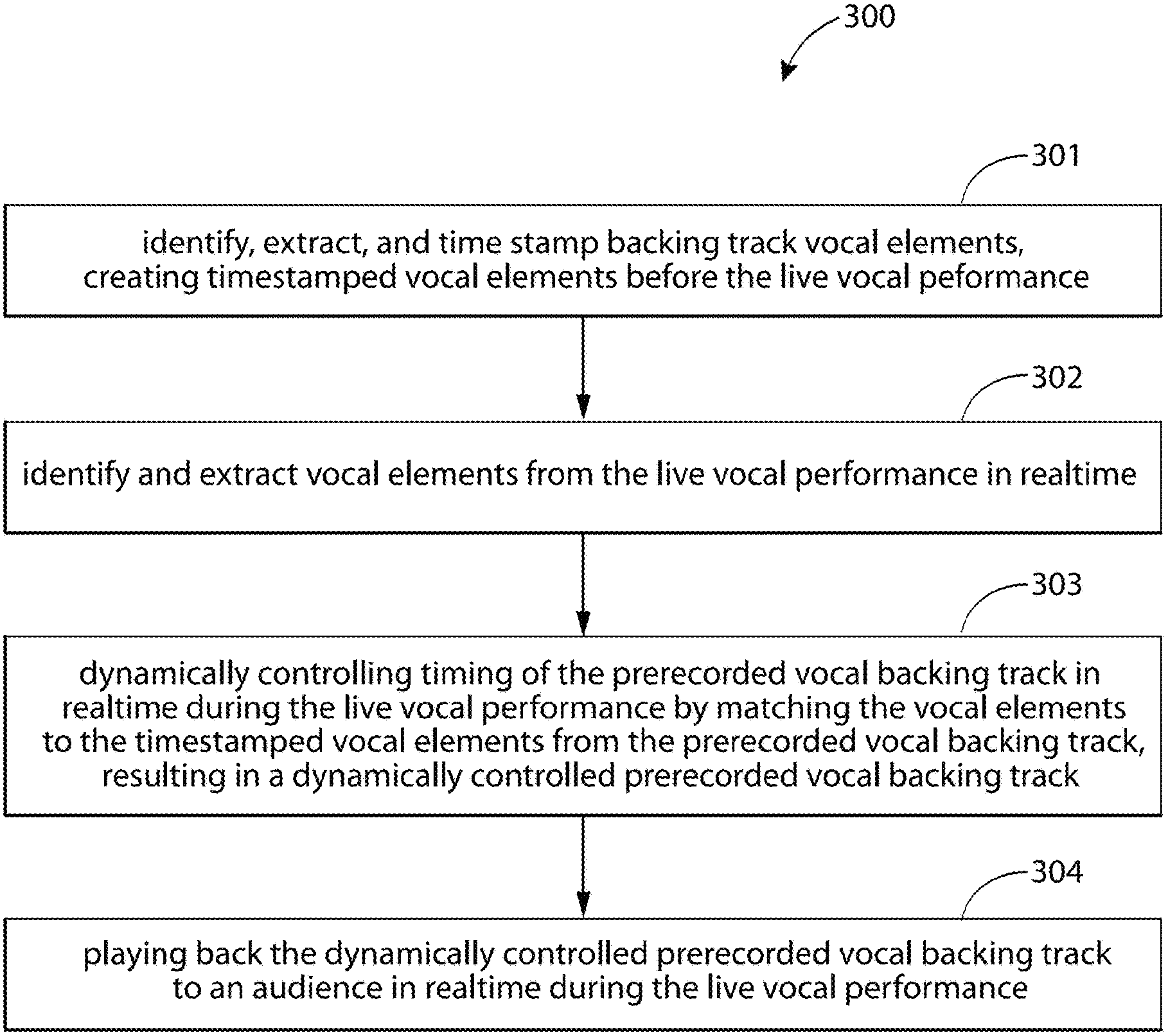
FIG. 7 illustrates a flow chart outlining a process associated with the conceptual overview of FIG. 3.

An example of the general process 300 is illustrated in FIG. 7. In step 301 vocal elements are identified, extracted, and time stamped from the prerecorded vocal backing track, to create corresponding timestamped vocal elements. This typically occurs before the live vocal performance. The process of identifying, extracting, and time stamping backing track vocal elements from the prerecorded vocal backing track may be an offline process and does not need to be done in realtime.

In step 302, vocal elements are identified and extracted in realtime from the live vocal performance. In step 303, the timing of the prerecorded vocal backing track is dynamically controlled (for example, dynamically time compressed or time stretched) during the live vocal performance in real-time. This may be accomplished by matching vocal elements extracted from the live vocal performance to the time-stamped vocal elements extracted from the prerecorded vocal backing track. The time compression and expansion of the prerecorded vocal backing track may be based on timing differences between the vocal elements extracted from the live vocal performance and corresponding timestamped vocal elements extracted from the prerecorded vocal backing track. The result is a dynamically controlled prerecorded vocal backing track that is time-synchronized to the live vocal performance in realtime. In step 304, the resulting dynamically controlled prerecorded vocal backing track is played back to the audience in realtime during the live vocal performance in synch with the vocalist's singing. The result is a dynamically controlled prerecorded vocal backing track that captures the vocalist's unique timing during the live vocal performance. The vocalist sings naturally and spontaneously without needing to mime or mimic the prerecorded vocal backing track.

Figure 8:
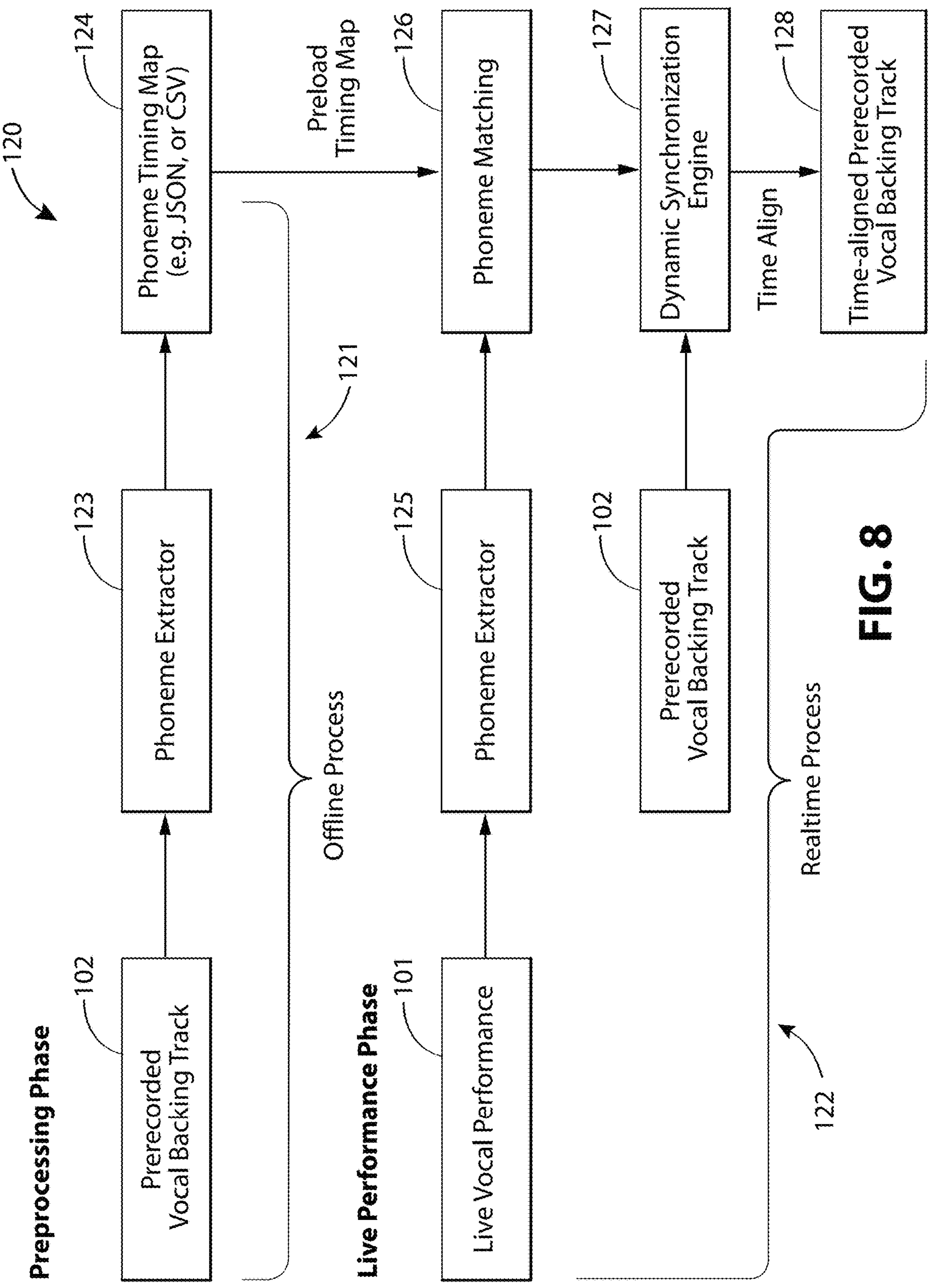
FIG. 8 illustrates a conceptual overview of the system of FIG. 3 using phoneme extraction and synchronization.
Figure 9:
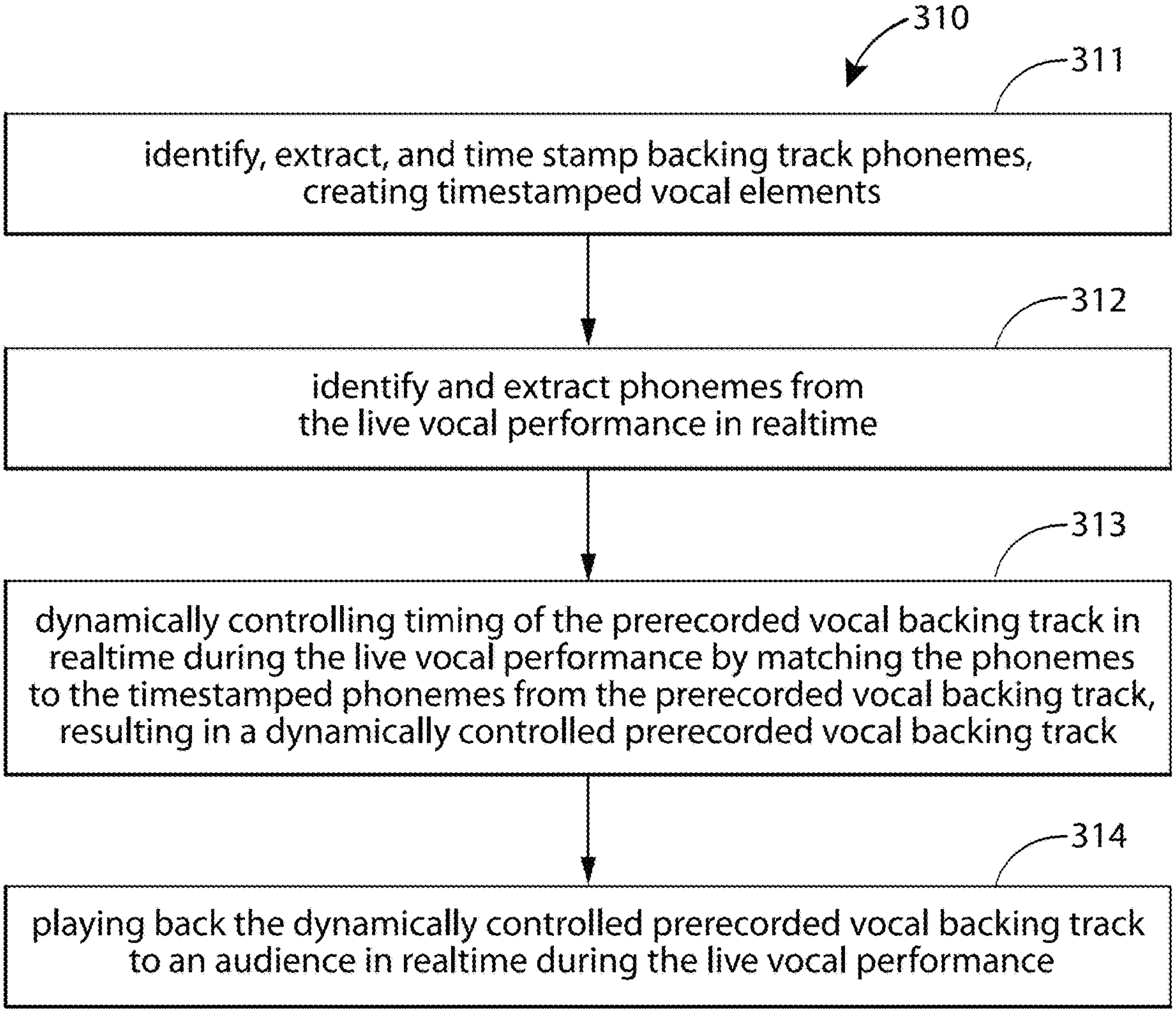
FIG. 9 illustrates a flow chart outlining a process associated with the conceptual overview of FIG. 8 which uses phoneme extraction and synchronization.

FIG. 8, shows a vocal element extraction and synchronization system 120 where the vocal elements include phonemes. FIG. 9 illustrates an example of a process 310 using phonemes for preprocessing the prerecorded vocal backing track and for the live vocal processing phase. In FIGS. 8 and 9, steps refer to FIG. 9, and called out elements refer to FIG. 8. In step 311, phonemes are identified, extracted, and time stamped from the prerecorded vocal backing track, before the live vocal performance to create timestamped phonemes. During the preprocessing phase 121, the phoneme extractor 123, identifies and extracts phonemes from the prerecorded vocal backing track 102. The extracted phonemes may be stored with their corresponding start and finish positions in a phoneme timing map 124, as previously described. The phoneme timing map 124 may be stored in a data interchange format that uses human-readable text, such as Java script object notation (JSON) or comma separated value (CSV). In step 312, phonemes are identified and extracted in realtime from the live vocal performance. During the live performance phase 122, the live phoneme extraction unit 125 identifies and extracts phonemes from the live vocal performance 101. In step 313, the timing of the prerecorded vocal backing track is dynamically controlled (for example, using time compression or expansion) during the live vocal performance in realtime. It does so by matching phonemes identified and extracted from the live vocal performance to corresponding timestamped phonemes from the prerecorded vocal backing track. The phoneme matcher 126 compares the phonemes extracted from the live vocal performance 101 with the timestamped phonemes within the phoneme timing map 124 created during the preprocessing phase 121. The phoneme matcher 126 may use predictive algorithms to match phonemes extracted from the live vocal performance to the timestamped phonemes within the phoneme timing map 124. Examples of machine-learning models that may be suitable to identify, extract, and match phonemes include ContentVec, Wave2Vec 2.0, Whisper, Riva, or HUBERT. The dynamic synchronization engine 127 may dynamically time-stretch or compress the prerecorded vocal backing track 102 to match the timing of the live vocal performance 101. The time compression and expansion of the prerecorded vocal backing track may be based on timing differences between the phonemes extracted from the live vocal performance and corresponding matched timestamped phonemes from the prerecorded vocal backing track. This results in a dynamically controlled prerecorded vocal backing track 128 that is time-synchronized to the live vocal performance 101. In step 314, the resulting dynamically controlled prerecorded vocal backing track is played back to the audience in realtime during the live vocal performance. This process of identifying phonemes from the live vocal performance 101, matching the phonemes to the time-stamped phonemes within the phoneme timing map 124, and adjusting the timing of the prerecorded vocal backing track 102, occurs in realtime.

Figure 10:
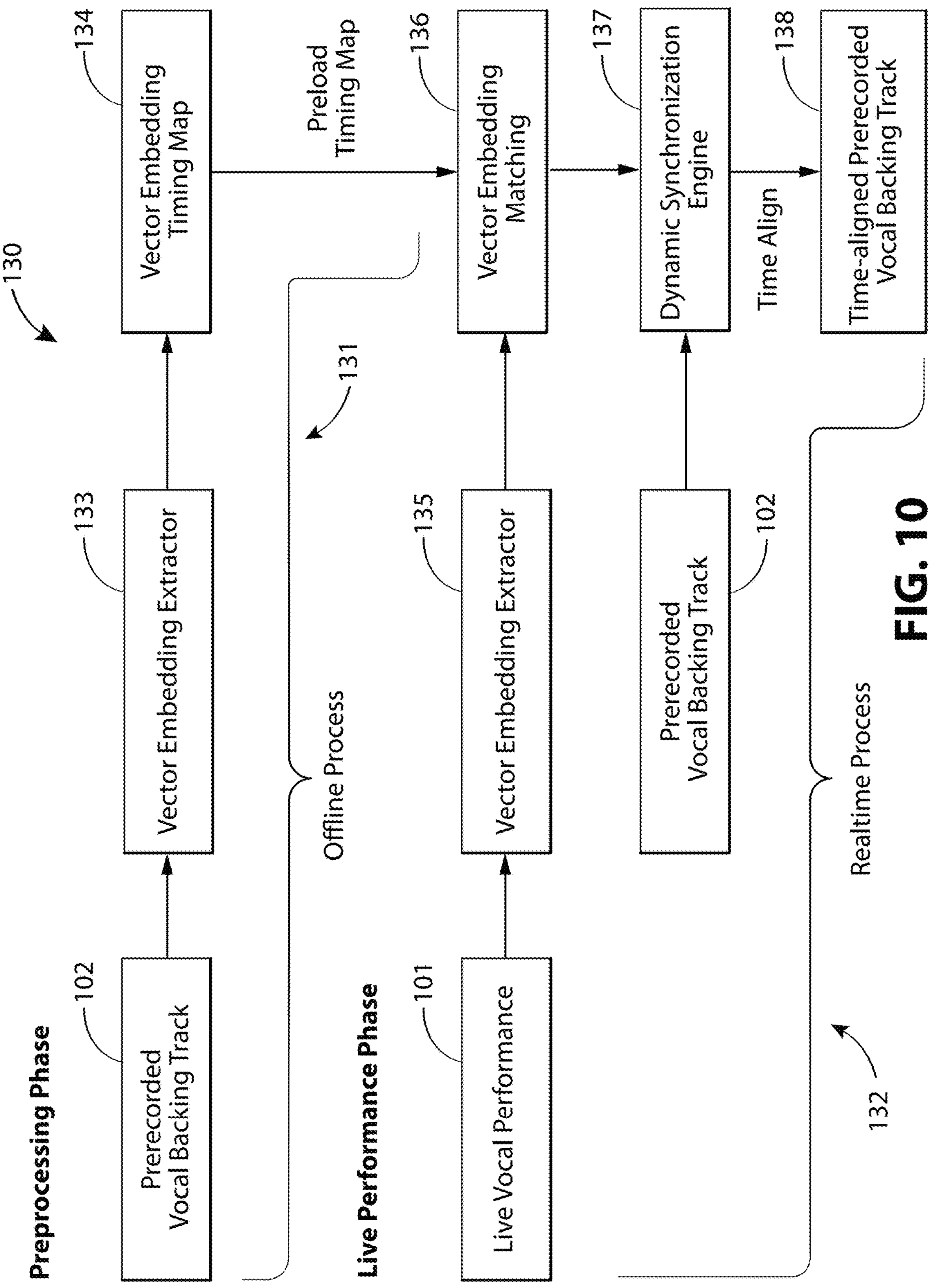
FIG. 10 illustrates a conceptual overview of the system of FIG. 3 using vector embedding and synchronization.
Figure 11:
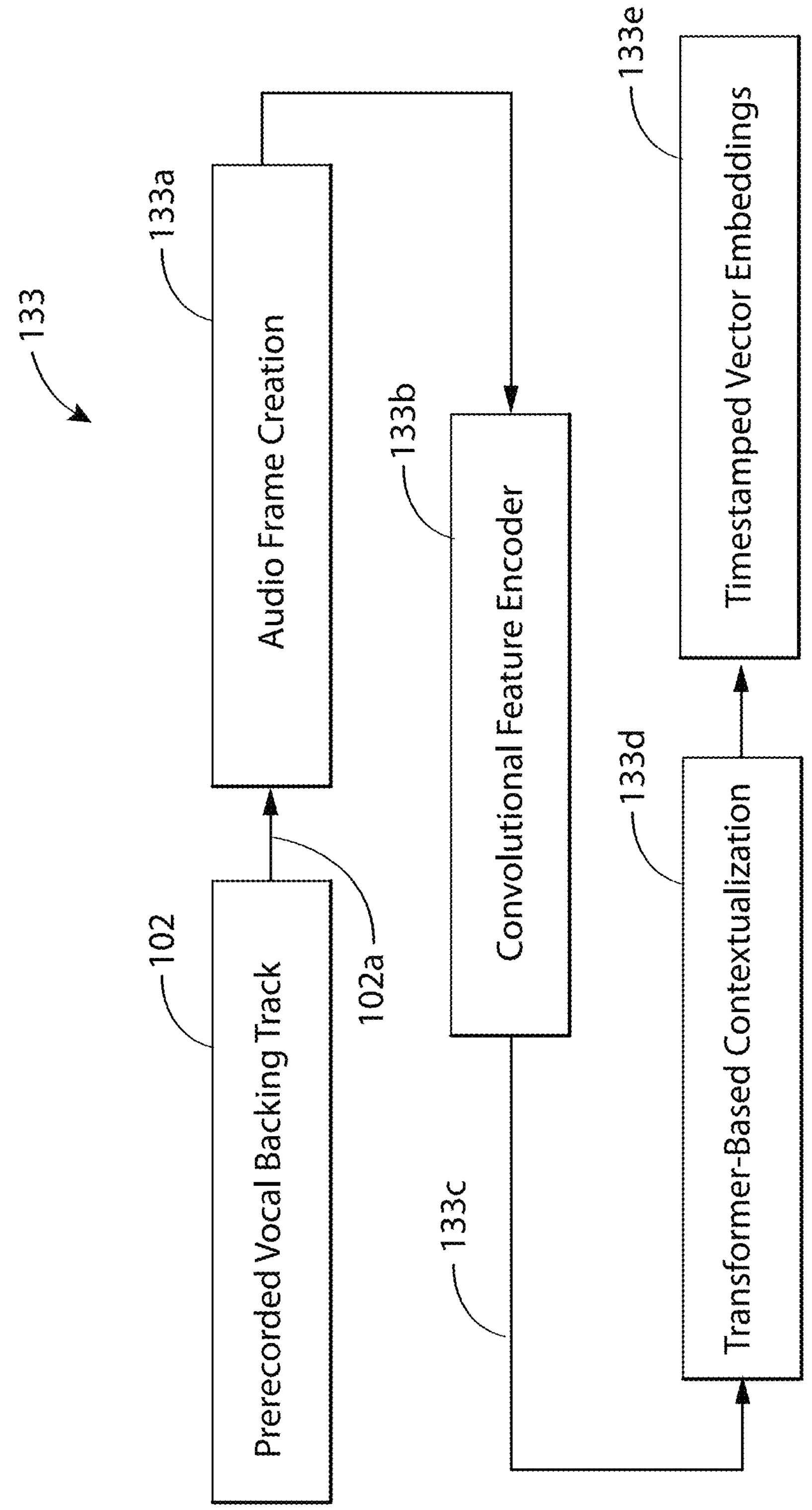
FIG. 11 illustrates internal preprocessing steps to generate timestamped vector embeddings from the prerecorded vocal backing track where: raw audio is segmented into overlapping frames, processed by a convolutional encoder to extract acoustic features, and then contextualized by a transformer neural network, resulting in precise, timestamped multi-dimensional vector embeddings.
Figure 13:
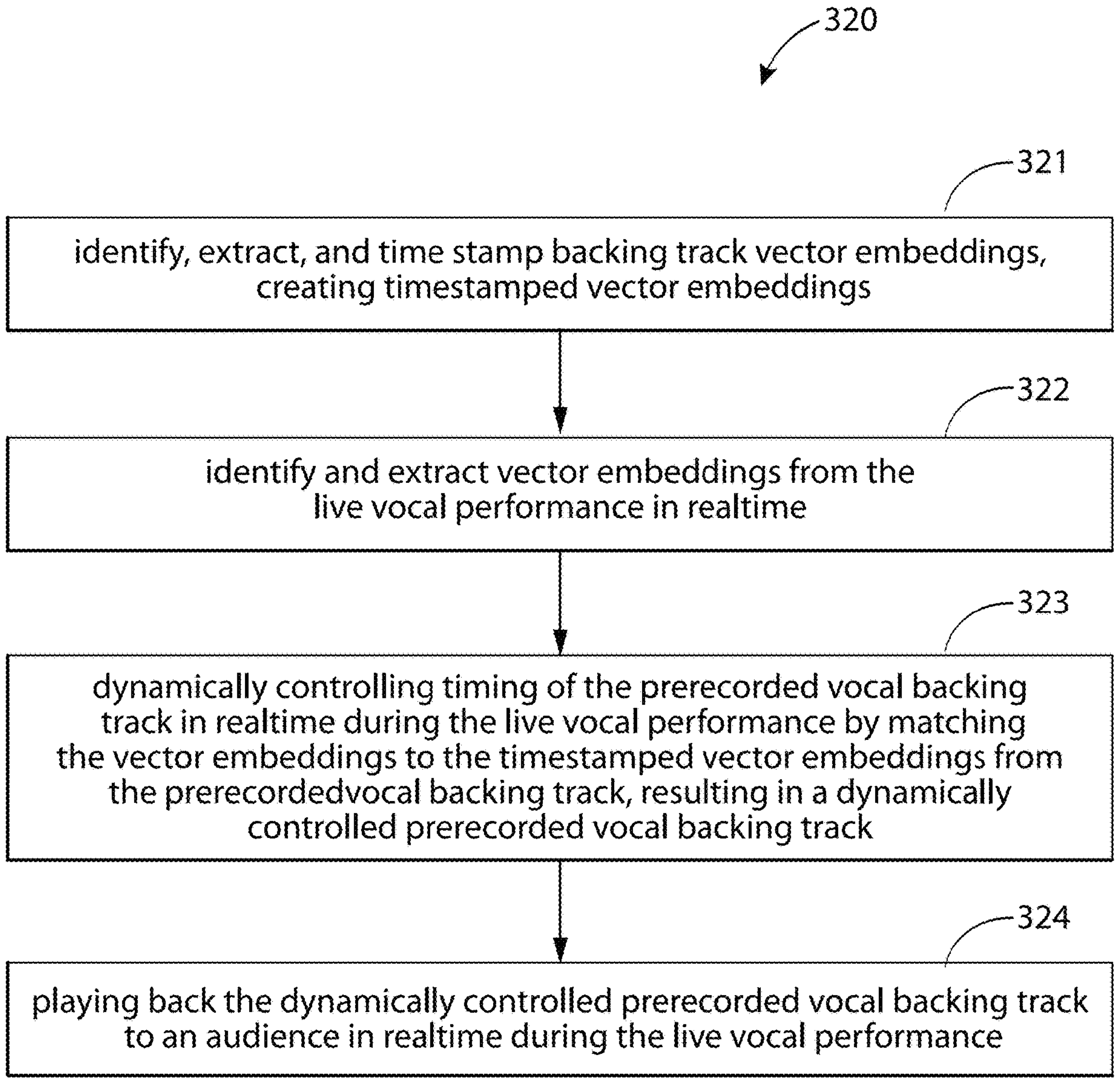
FIG. 13 illustrates a flow chart outlining a process associated with the conceptual overview of FIG. 10 which uses vector embedding and synchronization.

FIG. 10, shows a vocal element extraction and synchronization system 130, where the vocal elements are vector embeddings. FIG. 13 illustrates an example of a process 320 using vector embeddings for preprocessing the prerecorded vocal backing track, and for the live vocal processing phrase. In FIGS. 10 and 13, steps refer to FIG. 13, and called out elements refer to FIG. 10. In step 321, vector embeddings are identified, extracted, and time stamped from the prerecorded vocal backing track, before the live vocal performance to create timestamped vector embeddings. During the preprocessing phase 131, the vector embeddings extractor 133, identifies and extracts vector embeddings from the prerecorded vocal backing track 102. FIG. 11 shows an example of how this process within the vector embeddings extractor 133 might work.

Referring to FIG. 11, the raw audio waveforms of the prerecorded vocal backing track output signal 102*a* is divided into overlapping frames by audio frame creation module 133*a*, for example 25 millisecond frames, with 20 millisecond strides. The resulting output is processed by a convolutional feature encoder 133*b*. The convolutional feature encoder extracts low-level vocal features such as pitch, timbre, and harmonic structures. It also learns phoneme-specific patterns such as formants and articulation, to differentiate between similar sounds. The extracted low-level features 133*c* are passed through a transformer model 133*d*, which models long-term dependences in singing patterns and learns contextual phoneme transitions. This results in better temporal resolution. Each frame from the transformer model 133*d* is converted into a timestamped multi-dimensional vector embeddings 133*e*. In this example, each time stamp is 20 milliseconds apart because the 25 millisecond frames start every 20 milliseconds. The resulting time-stamped vector embeddings may be stored in a timing map, such as the vector embeddings timing map 134 of FIGS. 5 and 10. Referring to FIG. 5, the vector embeddings are 20 ms apart.

Referring to FIGS. 10 and 13, during the live performance phase 132, in step 322, vector embeddings are identified and extracted in realtime from the live vocal performance. The live vector embeddings extraction unit 135 identifies and extracts vector embeddings from the live vocal performance 101. In step 323, the timing of the prerecorded vocal backing track is dynamically controlled (for example, dynamically time compressed or stretched) during the live vocal performance in realtime. It may accomplish this by matching vector embeddings identified and extracted from the live vocal performance 101 to the timestamped vector embeddings from the prerecorded vocal backing track 102. The vector embeddings matcher 136 compares the vector embeddings extracted from the live vocal performance 101 with the timestamped vector embeddings within the vector embeddings timing map 134 created during the preprocessing phase 131. The vector embeddings matcher 136 may use predictive algorithms to match vector embeddings extracted from the live vocal performance to the timestamped vector embeddings within the vector embeddings timing map 134. The dynamic synchronization engine 137 may dynamically time-stretch or compress the prerecorded vocal backing track 102 to match the timing of the live vocal performance 101. Time compression and expansion of the prerecorded vocal backing track 102 is based on timing differences between the vector embeddings extracted from the live vocal performance 101 and corresponding timestamped vector embeddings from the prerecorded vocal backing track 102. This results in a dynamically-aligned prerecorded vocal backing track 138 that is time-synchronized to the live vocal performance 101. In step 324, the resulting dynamically-aligned prerecorded vocal backing track 138 is played back to the audience in realtime during the live vocal performance 101. This process of identifying the vector embeddings from the live vocal performance 101, matching the vector embeddings to the timestamped vector embeddings within the vector embeddings timing map 134, and adjusting the timing of the prerecorded vocal backing track 102 occurs in real-time.

Figure 12:
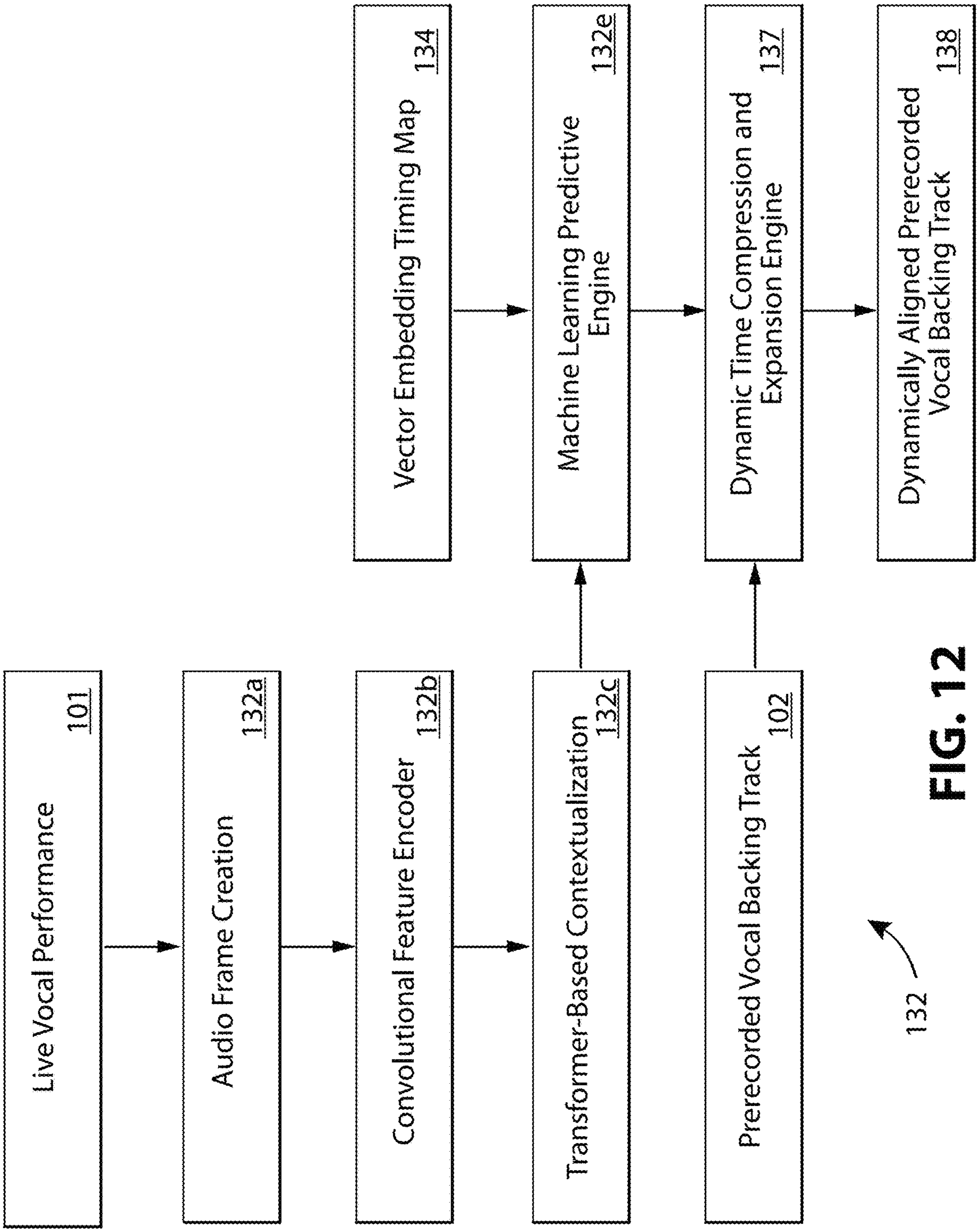
FIG. 12 illustrates the live performance phase, detailing how live vocal audio is segmented into overlapping frames, processed via convolutional feature extraction, contextualized using a transformer neural network, and matched in real-time to prerecorded vector embeddings, resulting in the predictive engine dynamically aligns the prerecorded backing track to the live performance.

FIG. 12 illustrates an example of the live performance phase 132 in more detail. The signal from the live vocal performance 101 is divided into overlapping frames by an audio frame creation module 132*a*. The resulting output is processed by a convolutional feature encoder 132*b*. The output of the convolutional feature encoder 132*b* is processed by a transformer model 132*c*. The audio frame creation module 132*a*, the convolutional feature encoder 132*b*, and the transformer model 132*c*, are as described for audio frame creation module 133*a*, convolutional feature encoder 133*b*, and transformer model 133*d* of FIG. 11, respectively.

Referring to FIG. 12, the machine-learning predictive engine 132*e* compares and matches the timestamped vector embeddings from the vector embeddings timing map 134 to the vector embeddings from the live vocal performance. The machine-learning predictive engine 132*e* instructs the dynamic synchronization engine 137 to time compress or expand the prerecorded vocal backing track 102, producing a dynamically-aligned prerecorded vocal backing track 138.

Figure 14:
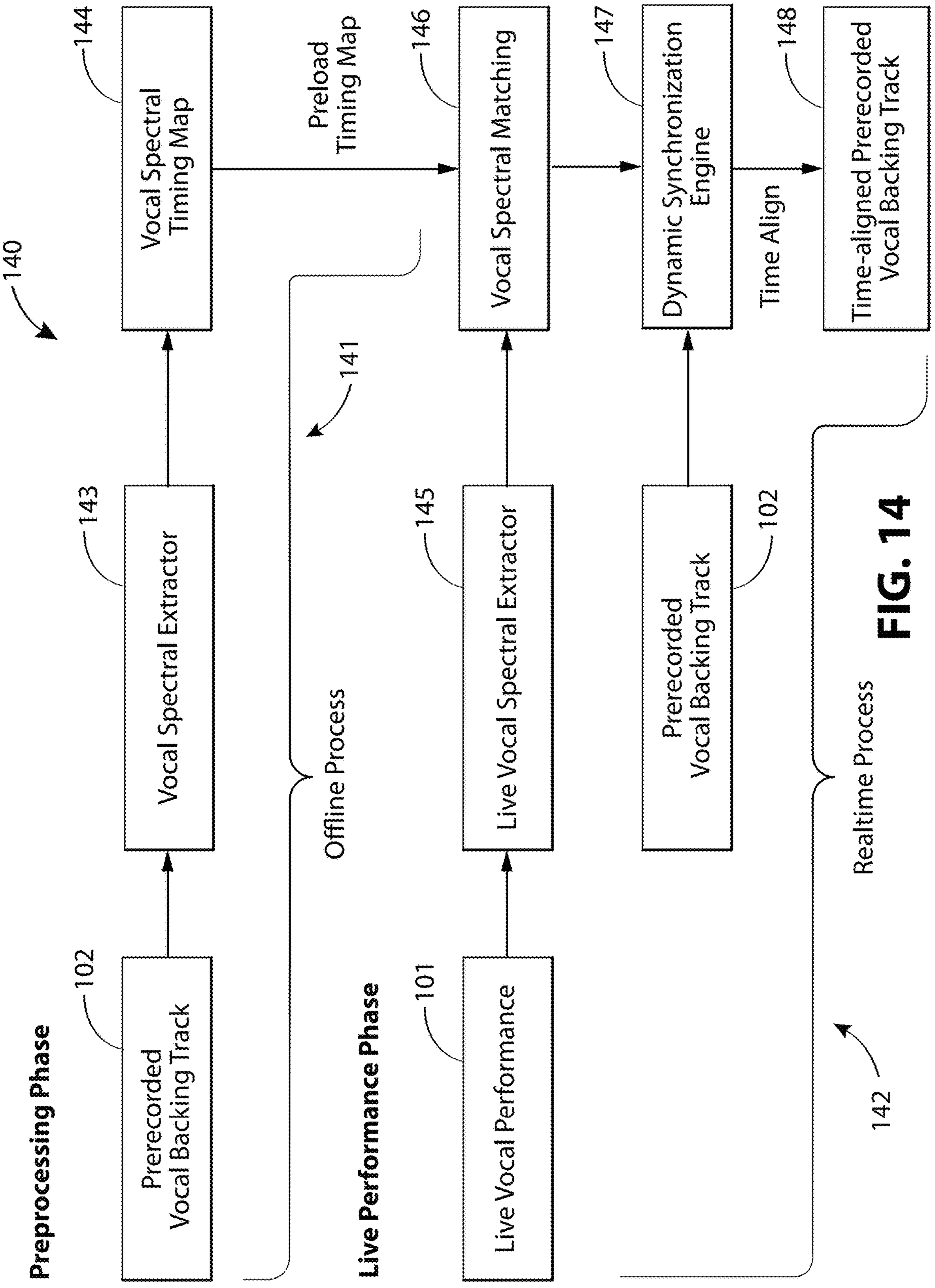
FIG. 14 illustrates a conceptual overview of the system of FIG. 3 using vocal audio spectral extraction and synchronization.
Figure 15:
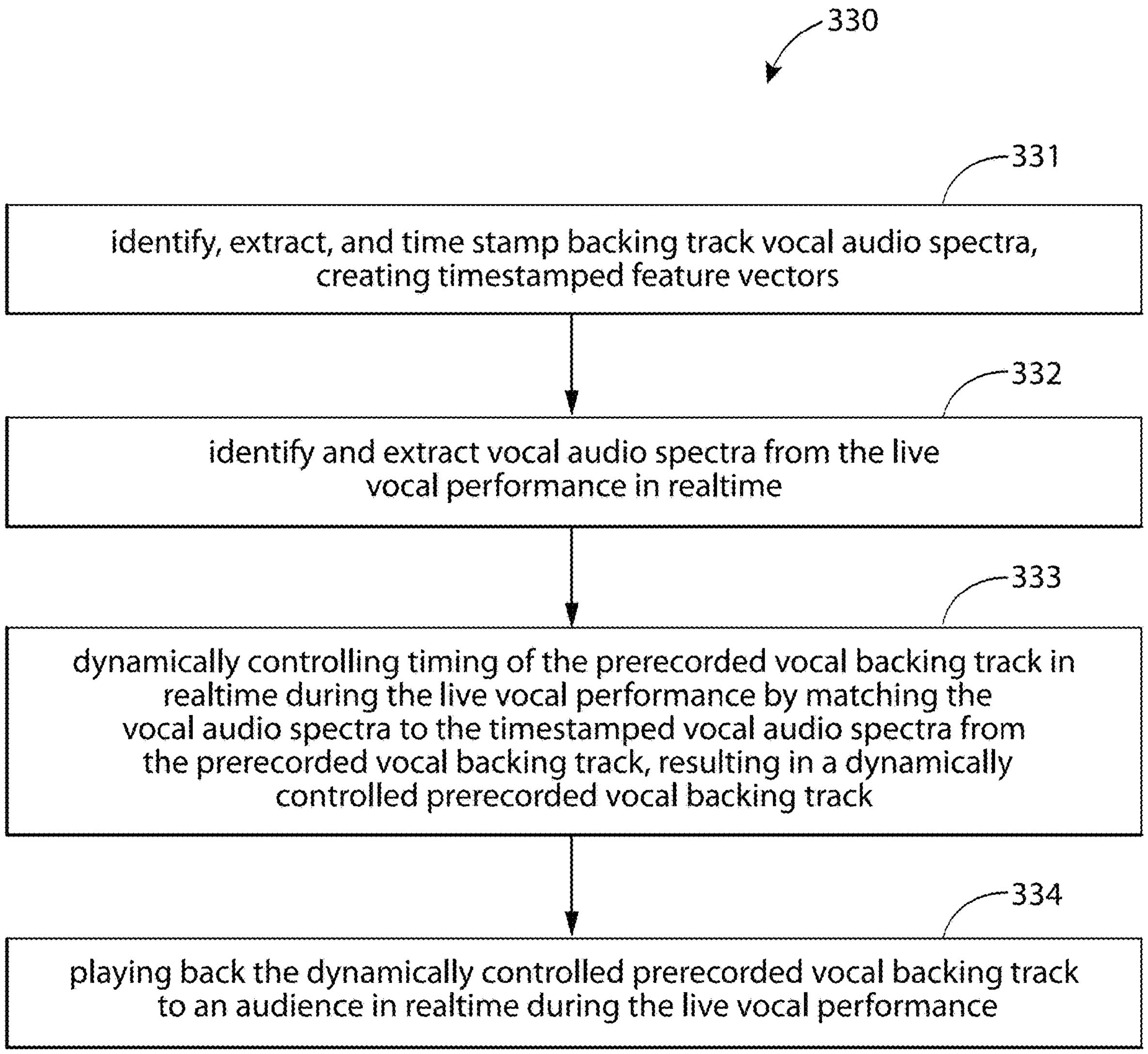
FIG. 15 illustrates a flow chart outlining a process associated with the conceptual overview of FIG. 14 which uses vocal audio spectral matching and synchronization.

FIG. 14 shows a vocal element extraction and synchronization system 140 where the vocal elements are audio spectra. FIG. 15 illustrates an example of a process 330 using vocal audio spectra for preprocessing the prerecorded vocal backing track and for the live vocal processing phase. In FIGS. 14 and 15, steps refer to FIG. 15, and called out elements refer to FIG. 14. In step 331, vocal audio spectra are identified, extracted, and time stamped from the prerecorded vocal backing track 102, before the live vocal performance 101, to create corresponding timestamped vocal audio spectra. The process of identifying, extracting and time stamping vocal audio spectra from the prerecorded vocal backing track 102 can take place offline. During the preprocessing phase 141, the vocal audio spectra extractor 143, takes vocal audio spectra, from the prerecorded vocal backing track 102. The vocal audio spectra may be taken periodically, for example, by using FFT or alternatively, an STFT. The periodically sampled vocal audio spectra are stored with their corresponding timing in a vocal audio spectra timing map 144. An example of such a timing map is shown in FIG. 6.

Referring again to FIGS. 14 and 15, in step 332, vocal audio spectra are identified and extracted in realtime from the live vocal performance. During the live performance phase 142, the vocal audio spectra extraction unit 145 identifies and extracts vocal elements from the live vocal performance 101. The vocal audio spectral matcher 146 compares the vocal audio spectra extracted from the live vocal performance 101 with the timestamped vocal audio spectra within the vocal audio spectra timing map 144.

In step 333, the timing of the prerecorded vocal backing track 102 is dynamically controlled (for example, dynamically time compressed or stretched) during the live vocal performance 101 in realtime. This may be accomplished by matching vocal audio spectra identified and extracted from the live vocal performance 101 to the timestamped vocal audio spectra from the prerecorded vocal backing track 102. The vocal audio spectral matcher 146 may use predictive algorithms to match vocal audio spectra extracted from the live vocal performance 101 to the timestamped vocal audio spectra within the vocal audio spectra timing map 144. The dynamic synchronization engine 147 may dynamically time-stretch or compress the prerecorded vocal backing track 102 to match the timing of the live vocal performance 101. This results in a dynamically controlled prerecorded vocal backing track 148 that is time-synchronized to the live vocal performance 101. Time compression and expansion of the prerecorded vocal backing track 102 may be based on timing differences between the vocal audio spectra extracted from the live vocal performance 101 and corresponding matched timestamped vocal audio spectra from the prerecorded vocal backing track 102. In step 334, the dynamically controlled prerecorded vocal backing track 148 that results, is played back to the audience in realtime during the live vocal performance 101. This process of identifying vocal audio spectra from the live vocal performance 101, matching the vocal audio spectra to the timestamped vocal audio spectra, and adjusting the timing of the prerecorded vocal backing track 102 occurs in realtime.

The alignment accuracy is based in part by how often a new FFT (or STFT) is performed. The frequency granularity, or bin width, depends on the audio sample rate (e.g., 48 kHz, 96 kHz, or 192 kHz) divided by the sample length of the FFT. For this reason, it may be desirable to have a series of FFTs spaced apart according to alignment accuracy but partially overlapping to allow for better frequency granularity. For example, an FFT taken every 10 milliseconds, like FIG. 6, and with a sample length of 100-milliseconds would yield an alignment accuracy of 10 milliseconds with 10 Hz resolution.

Vocal element types such as phonemes, vocal audio spectra, and vector embedding may be used alone or in combination with one another. For example, phonemes could be used in combination with vocal audio spectra. Vocal audio spectra could be used in combination with vector embeddings. Vector embeddings could be used in combination with phonemes. If the system uses multiple vocal element types at the same time, the system may use a confidence weighting system to predict more accurate alignment. Confidence weighting is typically used in a system that uses a single vocal element type for dynamic synchronization of the prerecorded vocal backing track. The other vocal element types would not be used for dynamic synchronization, but to help enhance the timing accuracy. Alternatively, two or more vocal element types may be used in combination for dynamic synchronization with or without confidence weighting.

Figure 16:
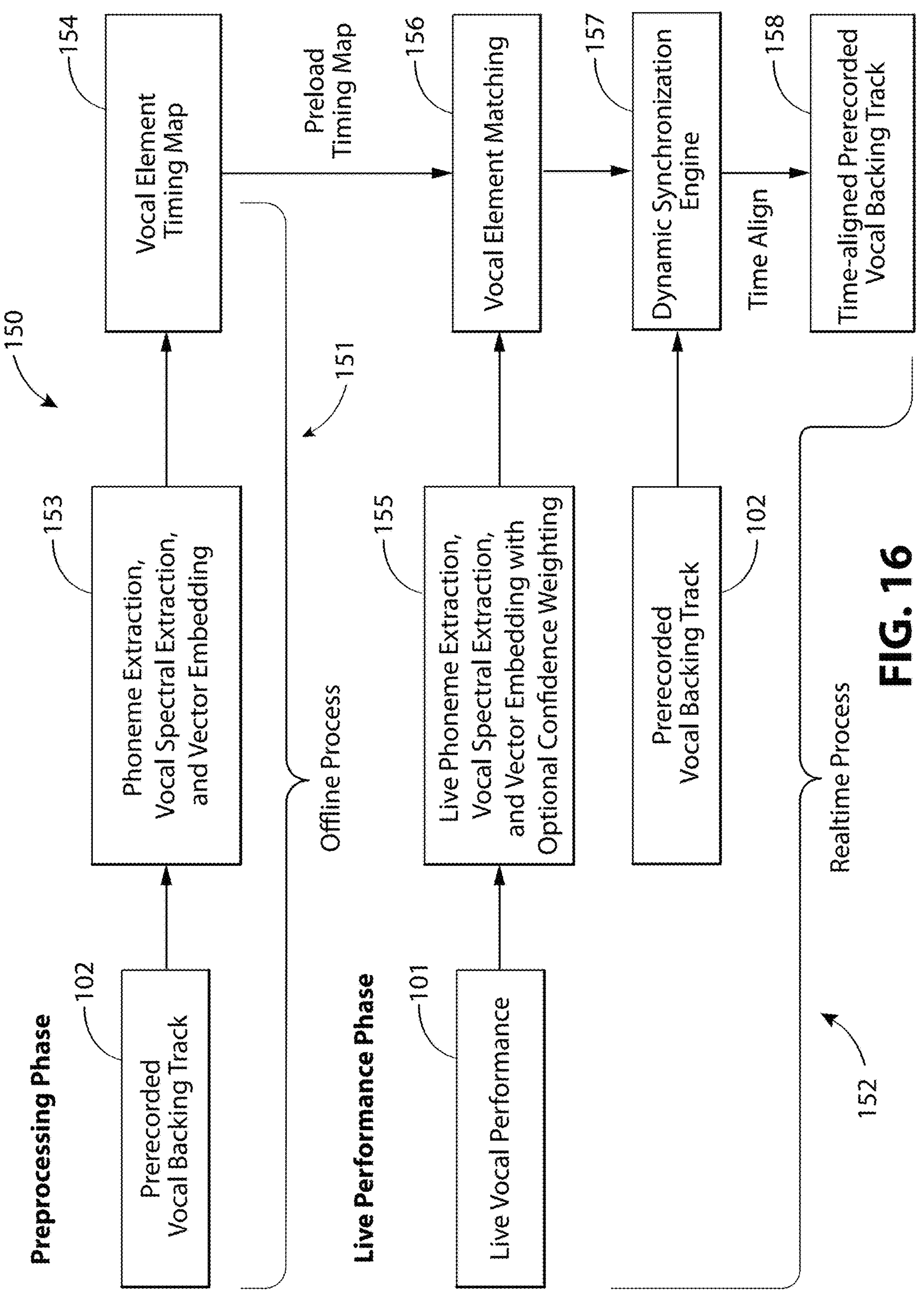
FIG. 16 illustrates a conceptual overview of the system of FIG. 3 that uses a combination of phoneme extraction, vocal audio spectral extraction, and vector embedding with optional confidence weighting.

FIG. 16 illustrates a vocal element extraction and synchronization system 150 that uses a combination of phoneme extraction, vocal audio spectra extraction, and vector embedding. It optionally uses confidence weighting. The discussion for FIGS. 16 and 17 that follow gives an example of how to use multiple vocal element types with confidence weighting to enhance the timing accuracy of one vocal element used for dynamic synchronization. In this instance, the vocal element used for dynamic synchronization is phonemes, with vector embeddings and vocal audio spectra used to obtain confidence weighting to enhance the timing accuracy of the phonemes. The same principles described for FIGS. 16 and 17, can be applied to other combinations of vocal element types where one vocal element is used for dynamic synchronization and the other, or others, are used to obtain confidence weighting.

Figure 17:
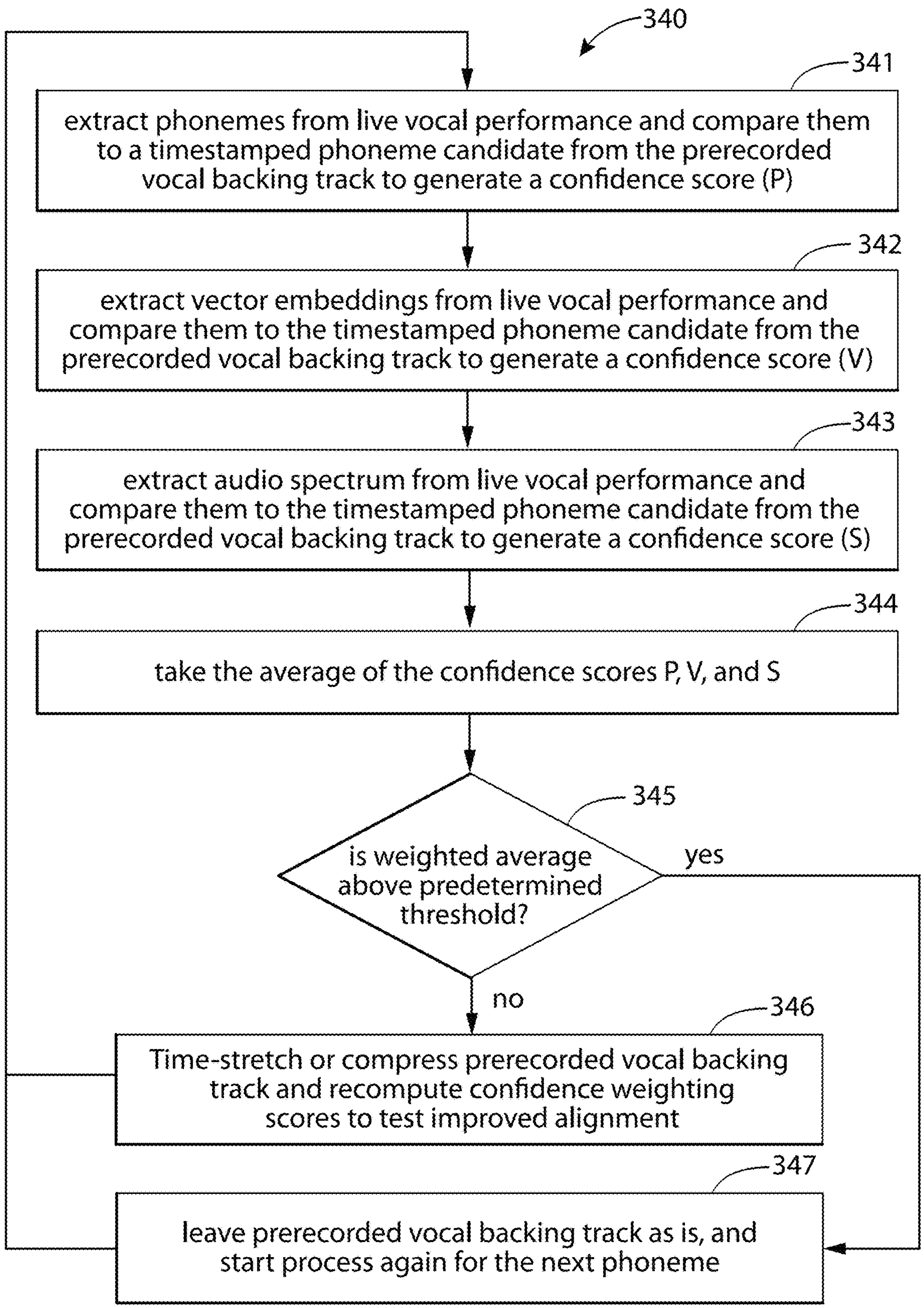
FIG. 17 is a flow chart illustrating the process of confidence weighting using multiple vocal element types: phonemes, vector embeddings, and audio spectra.

Referring to FIG. 16, during the preprocessing phase 151, the vocal element extractor 153 identifies and extracts phonemes, vocal audio spectra, and vector embeddings, as previously described. After the vocal element timing map 154 is complete and before the live vocal performance 101, the vocal element timing map 154 and the prerecorded vocal backing track 102 are loaded into the device that performs the live vocal element extraction and alignment. During the live performance phase 152, the vocal element extraction unit 155 identifies and extracts phonemes, vector embeddings, and vocal audio spectra from the live vocal performance 101. FIG. 17 illustrates an example of a confidence score process 340. When referring to FIGS. 16 and 17 together, steps refer to FIG. 17 and called out elements refer to FIG. 16. Referring to FIGS. 16 and 17, in step 341, an extracted phoneme from the live vocal performance 101 is compared to a timestamped phoneme from the prerecorded vocal backing track 102 to obtain a confidence score (P). The system may use a connectionist temporal classification to determine the probability that the phoneme positions match. Connectionist temporal classification is a neural network-based sequence alignment method.

In step 342, vector embeddings are extracted from the live vocal performance 101 and compared with the timestamped phoneme candidate from the prerecorded vocal backing track 102 to obtain a confidence score (V). A confidence weight can be assigned to a vector embeddings, for example, based on whether its phoneme embedding to nearby phonemes is consistent. For example, the phoneme with the vector embeddings created from the live vocal performance 101 can be compared with the phoneme candidate from the prerecorded vocal backing track 102 using cosine similarity.

In step 343, audio spectra are extracted from the live vocal performance 101 and compared with the timestamped phoneme candidate from the prerecorded vocal backing track 102 to obtain a confidence score (S). The harmonic structure of live vocal stream may be analyzed for stability. If the overtones are consistent over time, the confidence level is higher. As an example, the system analyzes harmonic alignment between the FFT taken from the live vocal performance 101 and the phoneme candidate from prerecorded vocal backing track 102. In step 344, the system takes the average of the confidence scores P, V, and S.

In step 345, if the average is below the predetermined confidence threshold, then in step 346, the vocal element matcher 156, directs the dynamic synchronization engine 157 to time compress or time-stretch the prerecorded vocal backing track 102 for the tested phoneme. The time compression or time stretching is based on timing differences between the vocal elements. The process loops back to step 341 where it may optionally recompute the confidence weight to get a more accurate score before advancing to the next phoneme. In step 345, if the average is above the predetermined confidence threshold, then in step 347, vocal element matcher 156 does not direct the dynamic synchronization engine 157 to change the timing of the prerecorded vocal backing track 102 for the tested phoneme. The process advances to the next phoneme and is repeated until the end of the synchronized vocal portion. The result is a dynamically controlled prerecorded vocal backing track 158 that is time-synchronized to the live vocal performance 101.

Figure 18:
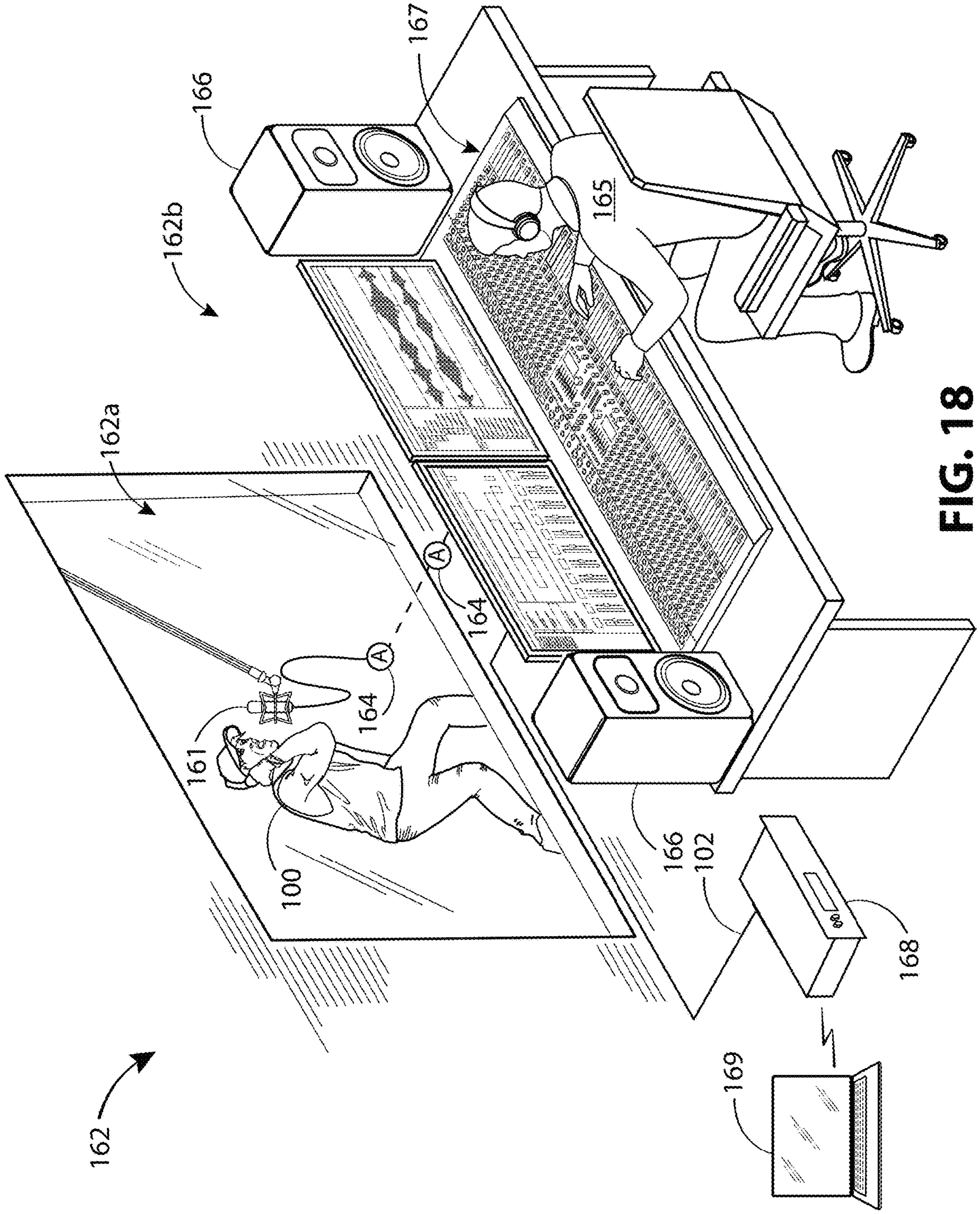
FIG. 18 illustrates a typical environment for recording the prerecorded vocal backing track.

The prerecorded vocal backing track is typically recorded in a controlled environment such as a recording studio, sound stage, or rehearsal studio. The prerecorded vocal backing track could even be recorded in the performance venue without an audience, before the live performance. FIG. 18 illustrates, as an example, the prerecorded vocal backing track 102 being recorded in a recording studio 162. The vocalist 100 sings into a microphone 161 inside the studio portion 162*a* of the recording studio 162. Inside the control room 162*b* of the recording studio 162, the microphone signal 164 (also indicated by the circled letter A), is routed to a microphone preamplifier and analog-to-digital converter. The analog-to-digital converter and the microphone preamplifier can be within the digital audio workstation 167. They can also be within a digital mixing console, within a standalone unit, or even within the microphone itself. The mix engineer 165 records the prerecorded vocal backing track 102 into a digital audio workstation 167. The mix engineer 165, monitors the performance through monitor speakers 166. The mix engineer 165 sends the resultant prerecorded vocal backing track 102 from the digital audio workstation 167 to the vocal element extraction unit 168. This could be a digital audio signal such as AES67 or MADI, an analog signal, or a digital computer protocol signal such as Ethernet or Wi-Fi. The vocal element extraction unit 168 can be controlled via front panel controls, an external computer 169, or via the digital audio workstation 167.

Figure 19:
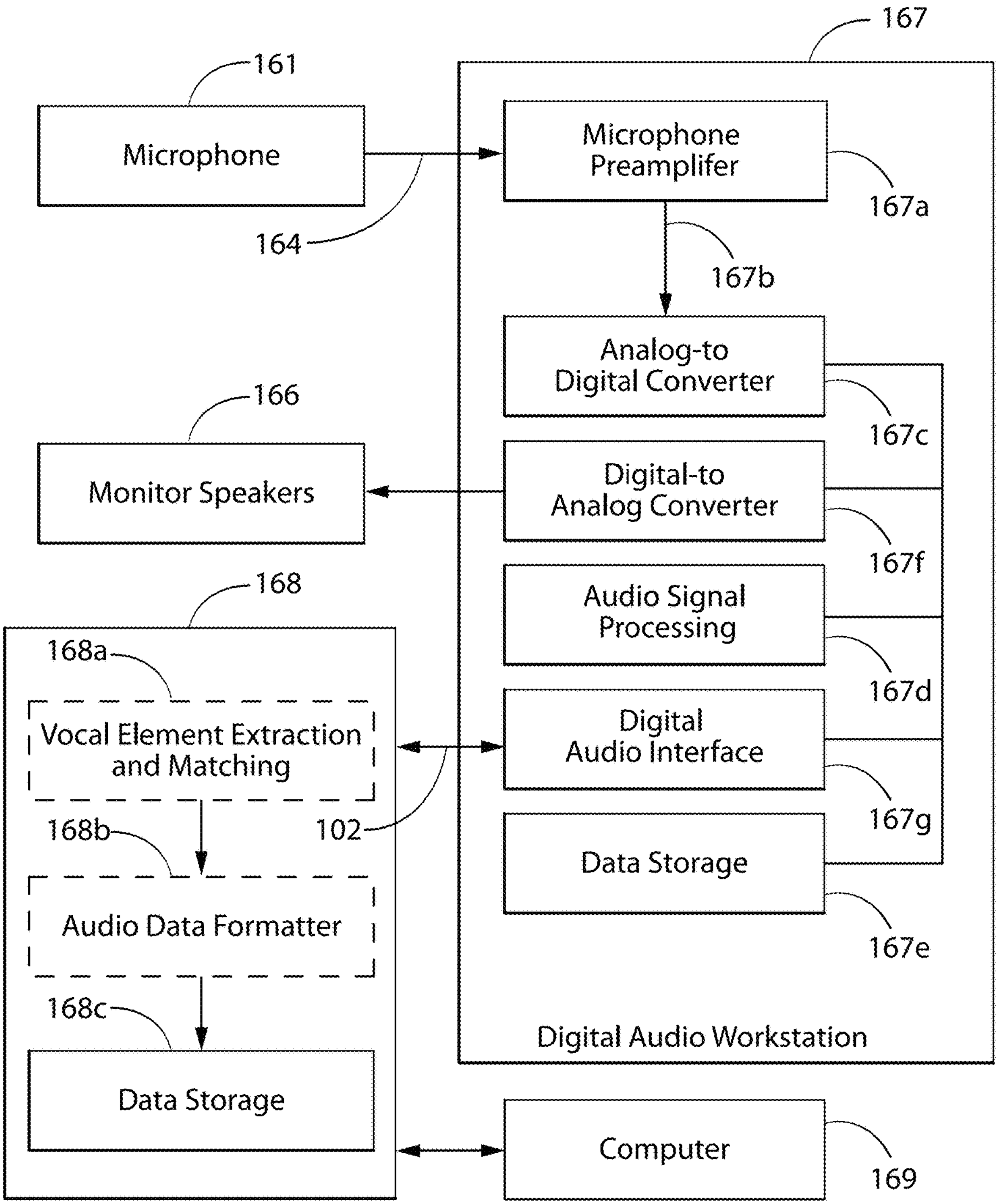
FIG. 19 shows a simplified block diagram that approximately corresponds to the use case of FIG. 18.

FIG. 19 shows one example of a block diagram of the preprocessing phase equipment and corresponds to the equipment setup of FIG. 18. As the vocalist sings into the microphone 161, the microphone signal 164 that results, is amplified by the microphone preamplifier 167*a*. The amplified microphone signal 167*b* is converted to a digital stream by the analog-to-digital converter 167*c*. The recording engineer may optionally perform audio signal processing to enhance the digitized vocal signal. Audio signal processing 167*d* may include frequency equalization, reverb, level compression, or other effects that may be available within the digital audio workstation 167. The digitized vocal signal is recorded on a data storage device 167*e*, such as a solid-state drive or SSD, resulting in a prerecorded vocal backing track 102. The recording engineer may monitor the recording process through monitor speakers 166. A digital-to-analog converter 167*f* converts the digitized audio signal to an analog signal which may be received by the monitor speakers 166. In this example, the monitor speakers 166 are assumed to be self-powered (i.e., include built-in amplifiers). For passive or unamplified monitor speakers, the digital audio workstation 167 may feed an audio amplifier. The audio amplifier would then feed an amplified audio signal to passive monitor speakers.

The recording engineer may post-process the prerecorded vocal backing track 102 using the vocal element extraction unit 168. The digital audio workstation 167, as illustrated, transmits the prerecorded vocal backing track 102 to the vocal element extraction unit 168 by the digital audio interface 167*g*. Alternatively, the prerecorded vocal backing track may be sent by a computer protocol such as Ethernet or Wi-Fi. If the vocal element extraction unit 168 is capable of receiving analog signals, the digital audio workstation 167 may optionally send the prerecorded vocal backing track as an analog signal using the digital-to-analog converter 167*f*.

The vocal element extraction unit 168 may include a vocal element extractor 168*a*. The vocal element extractor 168*a* analyzes the prerecorded vocal backing track 102 identifying and extracting vocal elements such as phonemes, vector embeddings, or vocal audio spectra. For example, the vocal element extractor 168*a* may break down the prerecorded vocal backing track 102 into phonemes and create corresponding time stamps for each phoneme. The phonemes may be identified and extracted using a transfer-based neural network, such as ContentVec, Wave2vec 2.0, or HuBERT. ContentVec and Wave2vec 2.0 may use semi-supervised machine-learning to identify the phonemes. The model may be trained to recognize phonemes on a large set of speech or vocal input, followed by a smaller set specific to the vocalist. As the phonemes, or other vocal elements, are extracted they are timestamped, i.e., their position in time (i.e. temporal position) is noted, as previously discussed.

Once the vocal elements are extracted, the audio data formatter 168*b* takes the timestamped vocal elements and creates a data file or timing map that stores each vocal element along with position in time. The resulting data file along with the prerecorded vocal backing track 102 can be stored within a data storage device 168*c*, such as a solid-state drive or SSD, within the vocal element extraction unit 168. The timestamped vocal elements data file along with the prerecorded vocal backing track 102 may also be transmitted back to the data storage device 167*e* in the digital audio workstation 167.

The vocal element extraction unit 168 may be controlled by a front panel graphical user interface (GUI) or tactile controls (for example, switches and rotary knobs), by the GUI within the digital audio workstation 167 or by an external computer 169.

Figure 20:
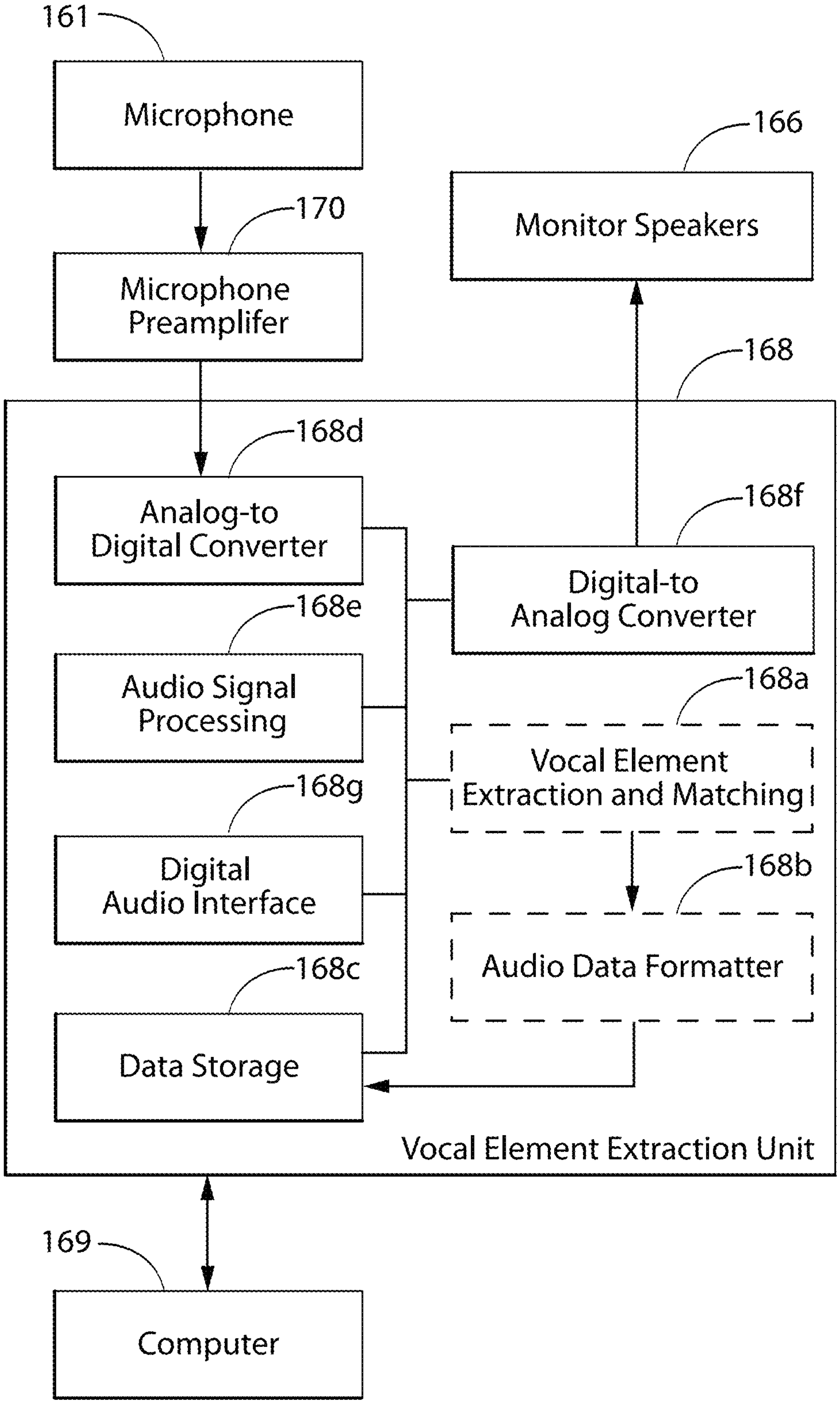
FIG. 20 shows a simplified block diagram that is an alternative structure for recording and preprocessing the prerecorded vocal backing track.

FIG. 20 shows an alternative block diagram for equipment suitable for the preprocessing phase. Referring to FIG. 20, in this example, rather than using a digital audio workstation, the microphone 161 may feed the vocal element extraction unit 168 via a microphone preamplifier 170. The resultant output of the vocal element extraction unit 168 may be monitored using monitor speakers 166. In this example, the vocal element extractor 168*a*, the analog-to-digital converter 168*d*, audio signal processing 168*e*, digital-to-analog converter 168*f*, digital audio interface 168*g*, audio data formatter 168*b*, and data storage device 168*c* are all housed within the vocal element extraction unit 168. The vocal element extraction unit 168 may include a GUI or may optionally use an external computer 169 as control and display. The analog-to-digital converter 168*d* receives the output of the microphone preamplifier 170. The output of the digital-to-analog converter 168*f* feeds the monitor speakers 166. All of the other blocks within the vocal element extraction unit 168 function as previously described. The vocal element extraction unit 168 may optionally include the microphone preamplifier 170, eliminating the need for an external microphone preamplifier. Equalization, level compression, and other vocal processing, may also optionally be included within the vocal element extraction unit 168. The vocal element extraction unit 168 may optionally receive signals from a digital microphone or a microphone with a digital interface via the digital audio interface 168*g*. The vocal element extraction unit 168 may optionally feed self-powered speakers that include a digital audio interface, via digital audio interface 168*g*.

In the preprocessing phase, the vocal element extractor 168*a* does not need to extract and time stamp the vocal elements in realtime. Because of this, the vocal element extractor 113 may optionally run within a desktop computer, laptop computer, or mobile device to run non-realtime deep learning model software in a production environment. An example of such a computer is a MacBook Pro M4 by Apple, which includes neural engine processing. In this scenario, typically, the microphone and monitor speakers might connect to the computer via a digital audio conversion device (i.e., with analog-to-digital and digital-to-analog conversion) with a microphone preamplifier and line-level outputs.

Figure 21:
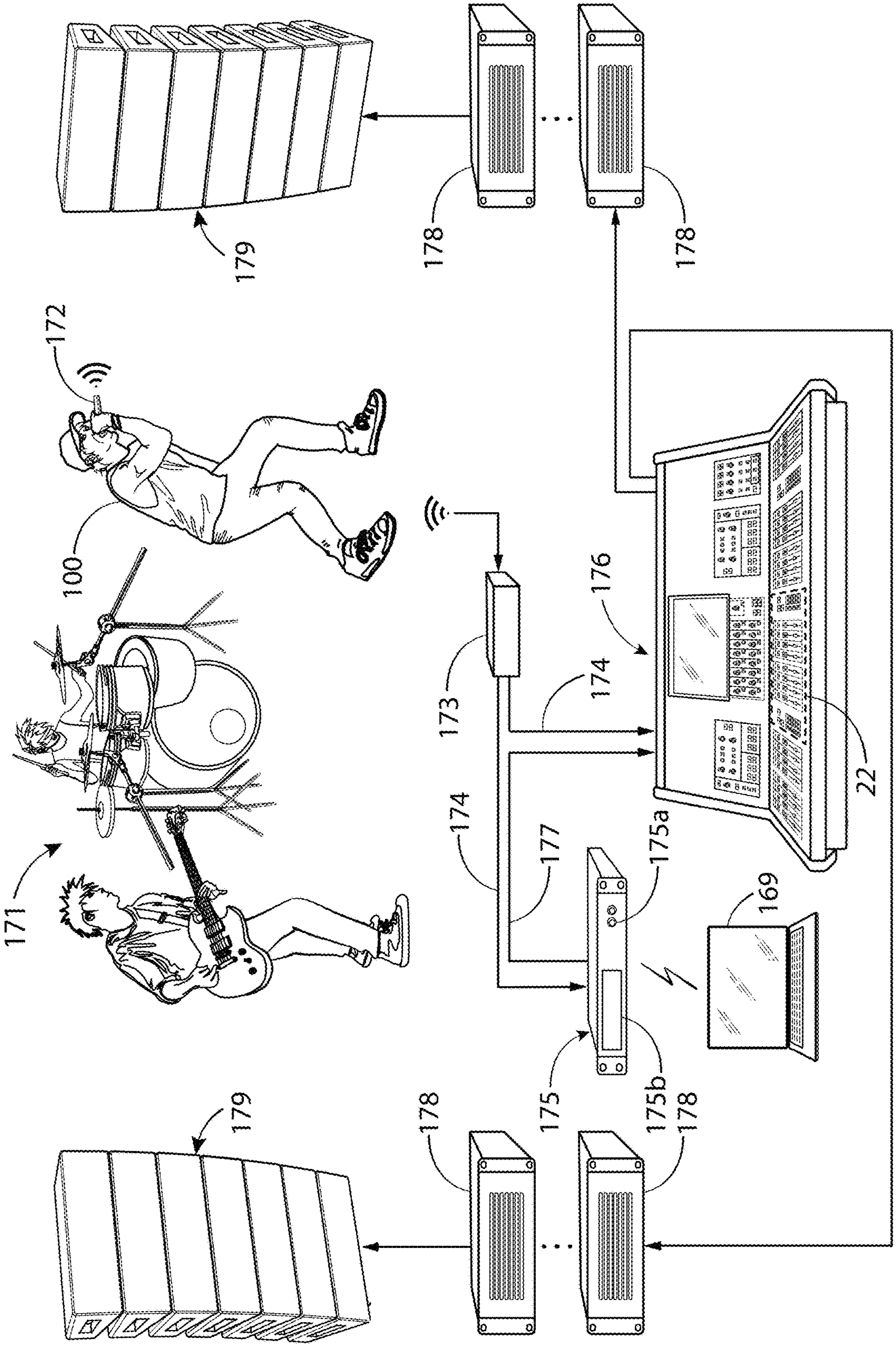
FIG. 21 illustrates a simplified typical setup for a touring band using the vocal backing track synchronization unit during a live performance.

FIG. 21 illustrates a typical live use case. In this example, it shows a configuration that could be used in a large venue. FIG. 21 shows a band 171 playing during a live performance. The vocalist 100 sings into a microphone 172. The vocalist's live performance may be transmitted to a signal splitter 173 where the live vocal signal 174 is routed to a vocal backing track synchronization unit 175 and to a front-of-house mixer 176. In this example, the front-of-house mixer 176 is a digital live sound mixer, but it could also be an analog live sound mixer. Alternatively, the live vocal signal 174 may be routed directly to the front-of-house mixer 176 and looped through to the vocal backing track synchronization unit 175. As a third alternative, live vocal signal 174 may be routed directly to the vocal backing track synchronization unit 175 and looped through digitally to the front-of-house mixer 176. The vocal backing track synchronization unit 175 may be the vocal element extraction unit 168 used in the preprocessing phase, or may be a different unit that is optimized for live performance and synchronization. The vocal backing track synchronization unit 175 identifies and extracts vocal elements, such as phonemes, vector embeddings, and vocal audio spectra from the live vocal performance, compares them to the timing map created during the preprocessing phase; typically, by using a predictive algorithm. As a result, the vocal backing track synchronization unit 175 time stretches or compresses the prerecorded vocal backing track to match the timing of the live vocal performance. The vocal backing track synchronization unit 175 may be controlled by the playback engineer using front panel controls 175*a* or a front panel display 175*b*. The front panel controls 175*a* and the front panel display 175*b* are optional. The playback engineer may also control the vocal backing track synchronization unit 175 using an external computer 169. As discussed, this process occurs in realtime. The time-synchronized vocal backing track 177 that results, is routed to the front-of-house mixer 176. In this example, it would be routed as a digital audio signal, using digital audio transfer protocol, such as AES/EBU, MADI, AES67, Ravenna, or Dante.

Figure 22:
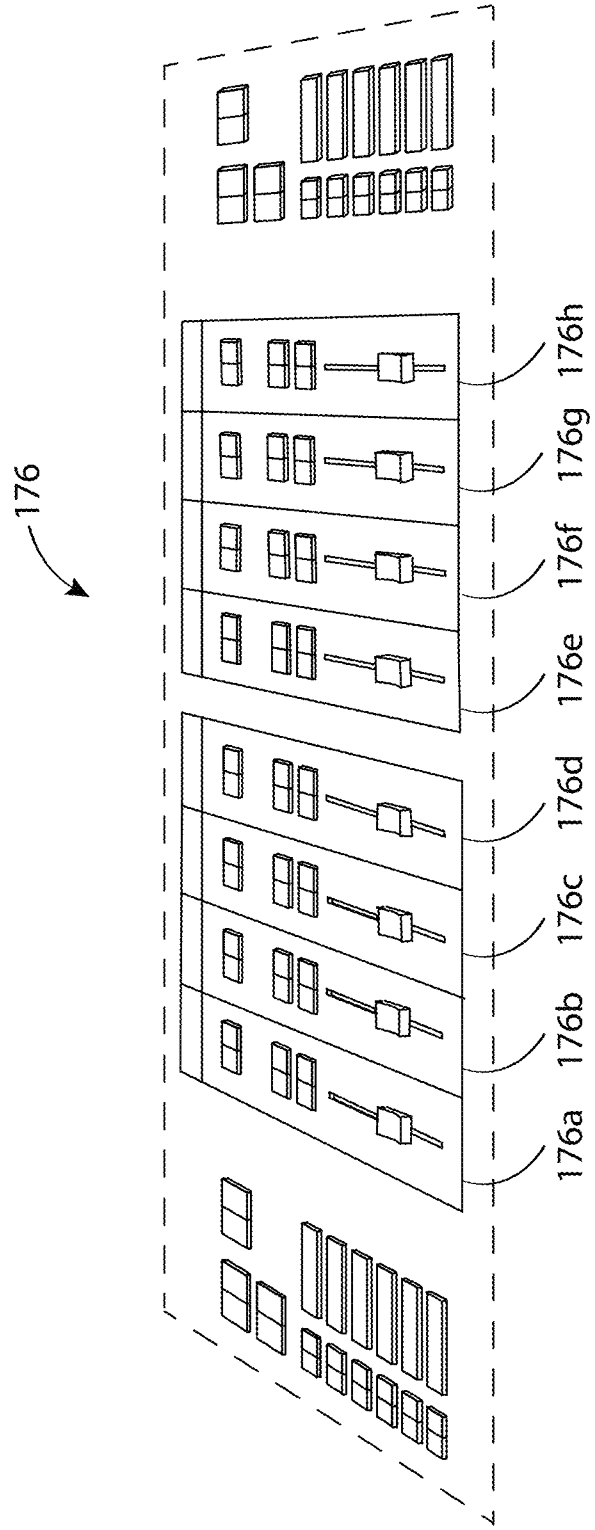
FIG. 22 illustrates an enlarged portion of the front-of-house mixer from FIG. 21.

FIG. 22 shows an enlarged portion of the front-of-house mixer 176 of FIG. 21, called out in FIG. 21 by reference designator 22 and surrounded by dashed lines. Continuing to refer to FIG. 22, in this example, the time-synchronized vocal backing track is routed to mixer channel 176*a* and the live vocal signal is routed to mixer channel 176*b*. This allows the front-of-house mix engineer to choose between using the time-synchronized vocal backing track or the live vocal signal. In addition, other signals such as the guitar or drums are routed to other mixer channels. For example, the guitar can be routed to mixer channel 176*c*, while the drums can be routed to mixer channels 176*d*, 176*e*, 176*f*, 176*g*, 176*h*. Referring to FIG. 21, the audience hears the resulting mix routed to audio amplifiers 178 and speakers 179.

The vocal backing track synchronization unit 175 may optionally capture performance-specific nuances or prosody, and adjust the prerecorded vocal backing track to reflect these nuances. Prosody nuances can include, but are not limited to, pitch, vibrato, intonation, stress, and loudness (intensity). For example, if the vocalist sings softly, the vocal backing track synchronization unit 175 may optionally capture this and adjust the signal level and signal envelope of the corresponding vocal elements in the prerecorded vocal backing track to reflect this.

Figure 23:
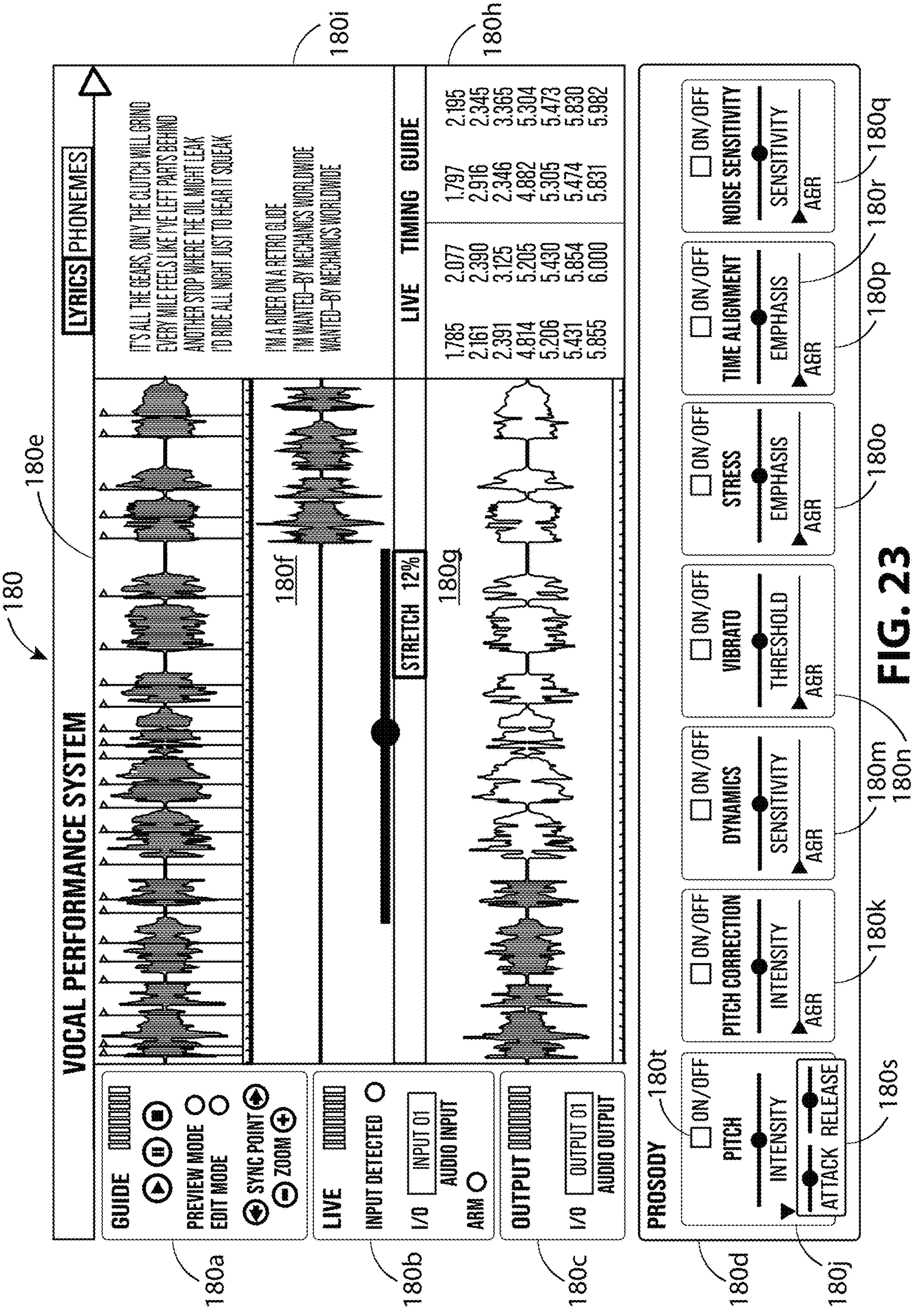
FIGS. 23 and 24 show a typical control interface for the phoneme extraction unit as it might be displayed on an external computer, with FIG. 23 displaying lyrics in English, and FIG. 24 displaying lyrics in phonemes using the International Phonetic Alphabet or IPA.
Figure 24:
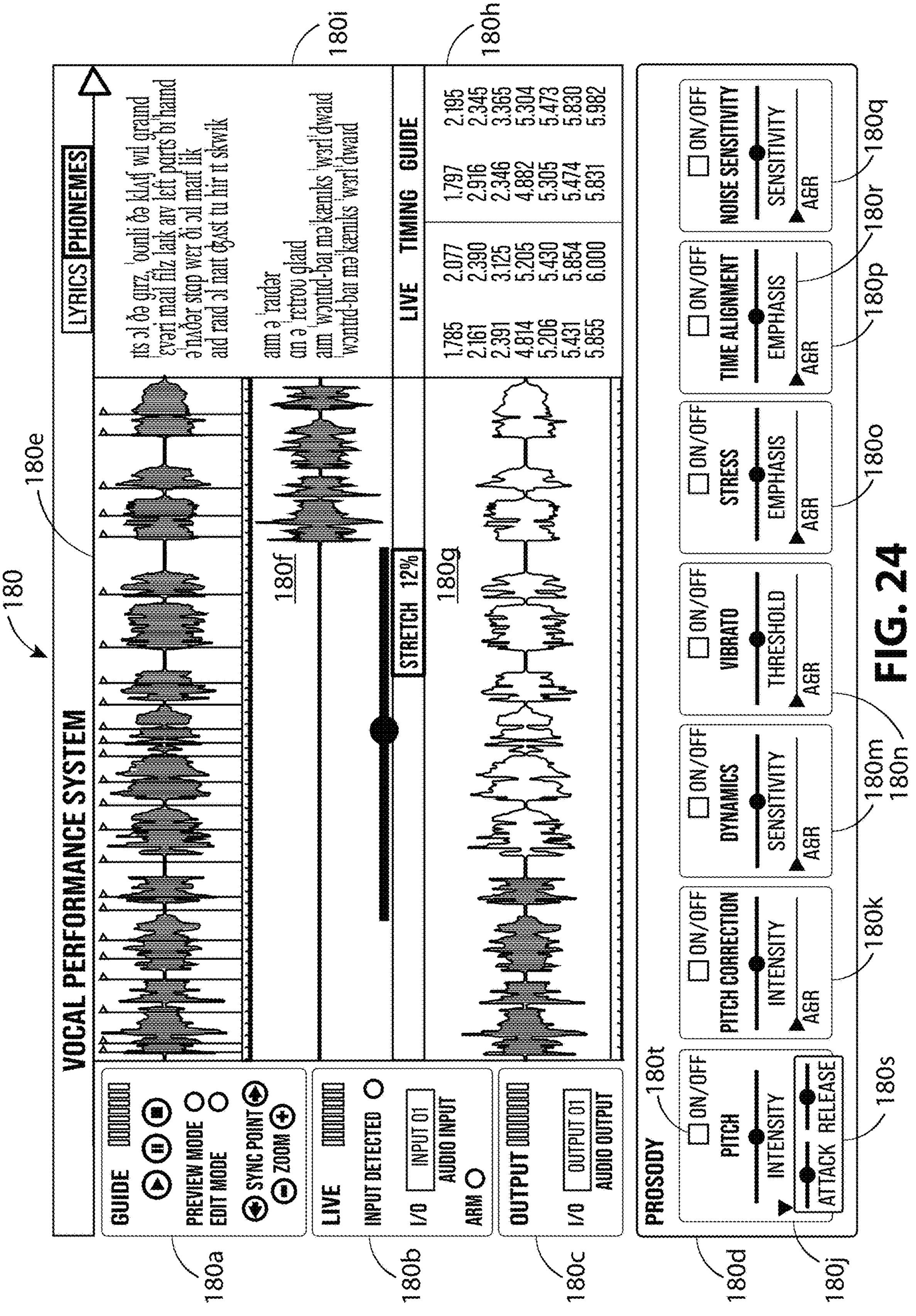

FIGS. 23 and 24 show a user control interface 180 for the vocal backing track synchronization unit 175 of FIG. 21 that may control both time alignment and prosody factors. The user control interface, as illustrated, is an example of what might be displayed on the external computer 169 of FIG. 21. In FIGS. 23 and 24, the user control interface 180 may include a backing track control section 180*a*, live input monitoring 180*b*, output monitoring 180*c*, prosody control section 180*d*, and a visual waveform display of the live vocal waveform 180*e*, the guide track wave 180*f*, and edited guide track waveform 180*g*. The user control interface 180 may also include timing display 180*h* that shows live vs. guide track timing for each phoneme. The user control interface 180 may also include a lyric-phoneme display 180*i*. FIG. 23 shows the lyric-phoneme display 180*i* displaying lyrics. FIG. 24 shows the lyric-phoneme display 180*i* displaying the phonemes that correspond to the lyrics. The phonemes are shown displayed using the International Phonetic Alphabet (IPA) for the English language.

The prosody control section 180*d* may control the systems sensitivity to various prosody factors as well as time alignment sensitivity. As an example, prosody control section 180*d* in FIGS. 23 and 24 include the following sections: pitch sensitivity section 180*j*, pitch correction section 180*k*, dynamics sensitivity section 180*m*, vibrato section 180*n*, stress section 1800, time alignment section 180*p*, and noise sensitivity section 180*q*. Each of these sections includes a primary control, an attack-release control, and an on-off switch. The attack-release control determines the speed at which the prerecorded vocal backing track responds to the onset (attack) and ending (release) of any deviation in the live vocal performance as compared to the prerecorded vocal backing track. As illustrated in the example of FIGS. 23 and 24, in the resting position the attack-release control may appear as an arrow and horizontal line with the designation A&R. As an example, the attack-release control 180*r* for the time alignment section 180*p* is shown in its resting position. When the attack-release control is being adjusted, it may appear as a drop-down, and displays the attack and release controls. For example, the attack-release control 180*s* is shown in its ready-to-adjust position. The on-off switch switches the system control of that prosody factor on or off. An example of on-off switch is on-off switch 180*t* for the pitch sensitivity section 180*j*. The primary controls will be described in more detail in the following paragraphs.

The intensity control of the pitch sensitivity section 180*j*, adjusts how finely the prerecorded vocal backing track responds to changes in pitch from the live vocal performance. Lower sensitivity ignores minor pitch fluctuations and focuses on more substantial pitch movements. Higher sensitivity captures subtle pitch changes.

The intensity control of the pitch correction section 180*k*, governs how strongly pitch correction is applied. The dynamics sensitivity section 180*m* controls how the prerecorded vocal backing track responds to changes in volume or loudness from the live vocal performance. A low setting of the sensitivity control reacts to only significant loudness changes while a high setting reacts even to slight variations.

The vibrato section 180*n* controls how the prerecorded vocal backing track responds to vibrato in the live vocal performance. The threshold control adjusts the sensitivity to the vibrato's rate (speed) and depth (amount of pitch variation).

The stress section 1800 controls the emphasis of accented phonemes or stressed syllables. The emphasis slider sets how strongly the prerecorded vocal backing track is adjusted in response to accented phonemes in the live vocal performance.

The time alignment section 180*p* adjusts how the prerecorded vocal backing track responds to timing mismatches between the live vocal performance and the prerecorded vocal backing track. The emphasis control adjusts how aggressively the prerecorded vocal backing track is time-synchronized to match the live vocal performance. With the emphasis slider centered, the prerecorded vocal backing track is adjusted to match the timing of the live vocal performance. With the slider to the left, the prerecorded vocal backing track is shifted earlier than the live vocal performance, to create a "laid-back" feel. With the slider to the right of center, the prerecorded vocal backing track is shifted forward to create a "pushed" feel or to compensate for latency.

The noise sensitivity section 180*q* determines how strictly the system filters out background noise, such as the vocalist's breathing. Low sensitivity is more tolerant of ambient noise and may occasionally misrepresent this as part of the live vocal performance. High sensitivity aggressively filters noise but at the risk at filtering vocal nuances.

Figure 25:
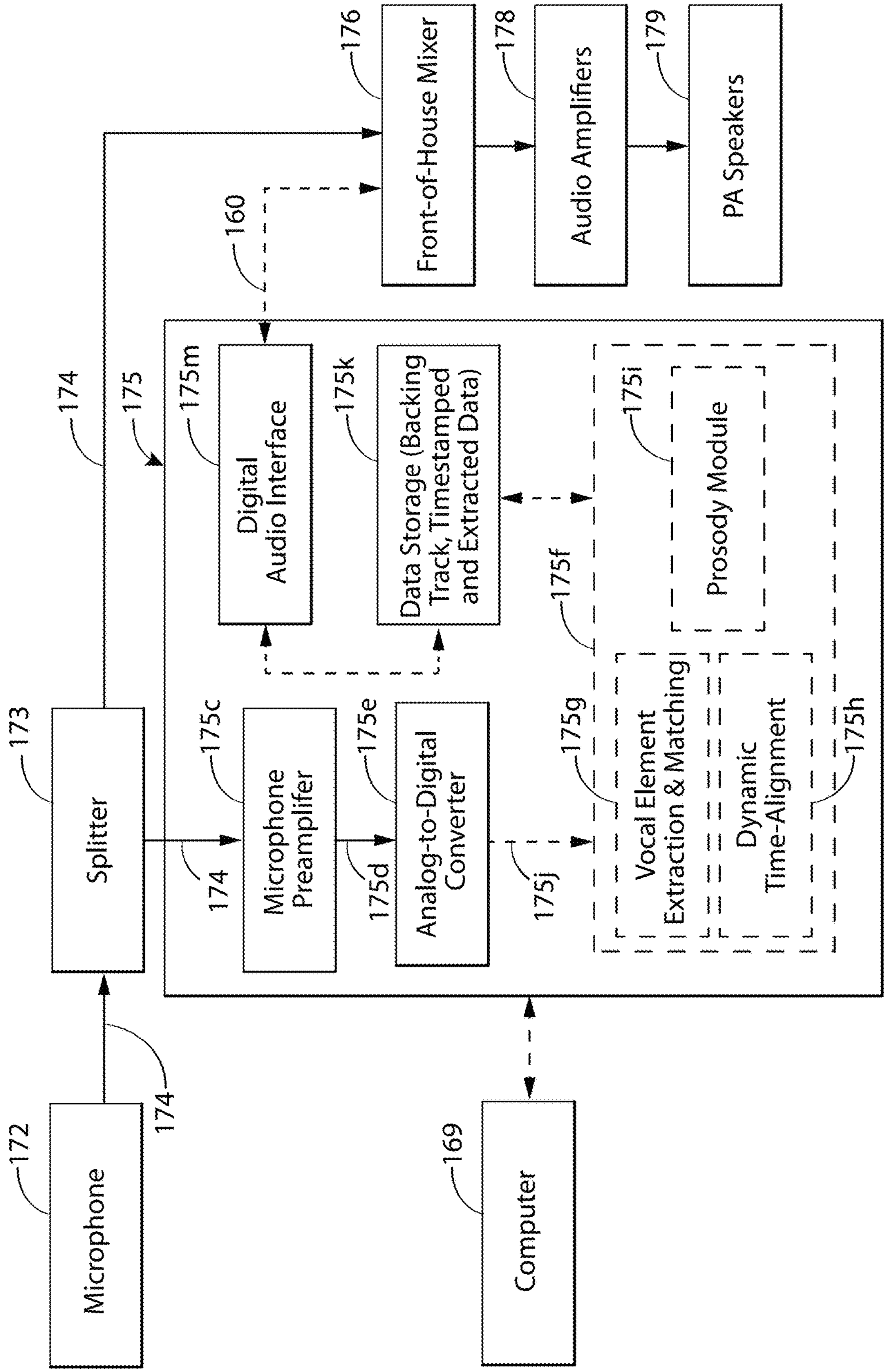
FIG. 25 illustrates a simplified block diagram that approximately corresponds to FIG. 21.

FIG. 25 shows a professional live use case block diagram that approximately corresponds to FIG. 21. For clarity, conceptual blocks within FIG. 25 are shown in wider-spaced dashed lines. Digital signal paths are shown in narrower-spaced dashed lines. Referring to FIG. 25, the live vocal signal 174 from the microphone 172, may optionally feed a signal splitter 173. The signal splitter 173 splits the live vocal signal 174 with one branch of the live vocal signal 174 feeding the vocal backing track synchronization unit 175, and the other branch feeding an input channel of the front-of-house mixer 176. In this example, the front-of-house mixer 176 may be a digital live sound mixer suitable for major touring acts playing in large venues. Examples of front-of-house mixers include, but are not limited to, Solid State Logic (SSL) L500 Plus, DigiCo SD7, Soundcraft Vi3000, or Yamaha Rivage PM5. The live vocal signal 174 feeding the front-of-house mixer 176, would typically pass through a microphone preamplifier followed by analog-to-digital converters within the front-of-house mixer 176. The live vocal signal 174 entering the vocal backing track synchronization unit 175 may feed a microphone preamplifier 175*c*. The amplified microphone signal 175*d* that results, would feed an analog-to-digital converter 175*e*. The digitized output 175*j* of the analog-to-digital converter 175*e* enters a vocal element processing module 175*f*.

The vocal element processing module 175*f* identifies and extracts vocal elements, such as phonemes, vector embeddings, or vocal audio spectra, and their time positions from the live vocal performance. It then matches these vocal elements to corresponding vocal elements extracted from the prerecorded vocal backing track. It adjusts the timing of the vocal elements within the prerecorded vocal backing track to match the timing of corresponding vocal elements in the live vocal performance. The vocal element processing module 175*f* may include one or more modules, or processes, to accomplish this. For example, it may include a vocal element extraction-matching module 175*g* and a dynamic time alignment module 175*h*. The vocal element extraction-matching module 175*g* identifies and extracts vocal elements such as phonemes, vector embeddings, or vocal audio spectra, and their temporal positions from the live vocal performance. It matches these to corresponding time-stamped vocal elements extracted from the prerecorded vocal backing track. As previously discussed, the prerecorded vocal backing track, along with the time stamped vocal element file, or files, generated during the preprocessing phase, may be stored within a data storage device **175*k* within the vocal backing track synchronization unit 175**. This device may be a hard drive, a solid-state drive or SSD, or may be memory, such as DRAM or ECC RAM.

The dynamic time alignment module **175*h* dynamically time-aligns the prerecorded vocal backing track to match the timing of the vocal elements extracted from the live vocal performance. The dynamic time alignment module 175*h*** may accomplish this, by temporally compressing or expanding vocal elements in the prerecorded vocal backing track that are matched with the vocal elements extracted from the live vocal performance. This time compression and expansion may be facilitated by software modules such as Zplane Élastique, Dirac Time Stretching, Zynaptiq ZTX, or Audiokinetic Wwise.

The vocal element processing module **175*f* may also identify prosody factors from the live vocal performance and use these to manipulate prosody factors in the prerecorded vocal backing track. The prosody factors extracted from the prerecorded vocal backing track, may be preloaded, and stored in data storage device 175*k* along with the extracted vocal element timing table. The extent and range of how the prosody factors are applied to the prerecorded vocal backing track can be controlled by a user interface, to be modified within a preset range. An example of a user interface that limits the dynamic control of the prerecorded vocal backing track to within preset ranges is the prosody control section 180*d* of FIGS. 23 and 24**.

Continuing to refer to FIG. 25, the user interface may reside internally within the vocal backing track synchronization unit 175 or within an external device, such as external computer 169. The vocal element processing module **175*f* may include, for example, one or more of a prosody module 175*i* that performs prosody analysis on the raw audio from the live vocal performance. A neural network model may be used to detect pitch, vibrato, amplitude, or other prosody factors in parallel with the vocal element extraction process. This will be discussed in more detail for FIGS. 27 and 28**.

Continuing to refer to FIG. 25, the resulting time-synchronized, and optionally prosody-adjusted, prerecorded vocal backing track, may be transmitted to the front-of-house mixer 176 via a digital audio interface **175*m* as digital signal 160. This may optionally be routed to the front-of-house mixer 176 as an analog signal via an optional digital-to-analog converter (not shown). As previously discussed, the live vocal signal and adjusted prerecorded vocal backing track may be routed through separate mixer channels. The front-of-house engineer may then choose to send the live vocal signal or the adjusted vocal backing track, or a mixture of both, to the audience via the audio amplifiers 178 and speakers 179**.

Figure 26:
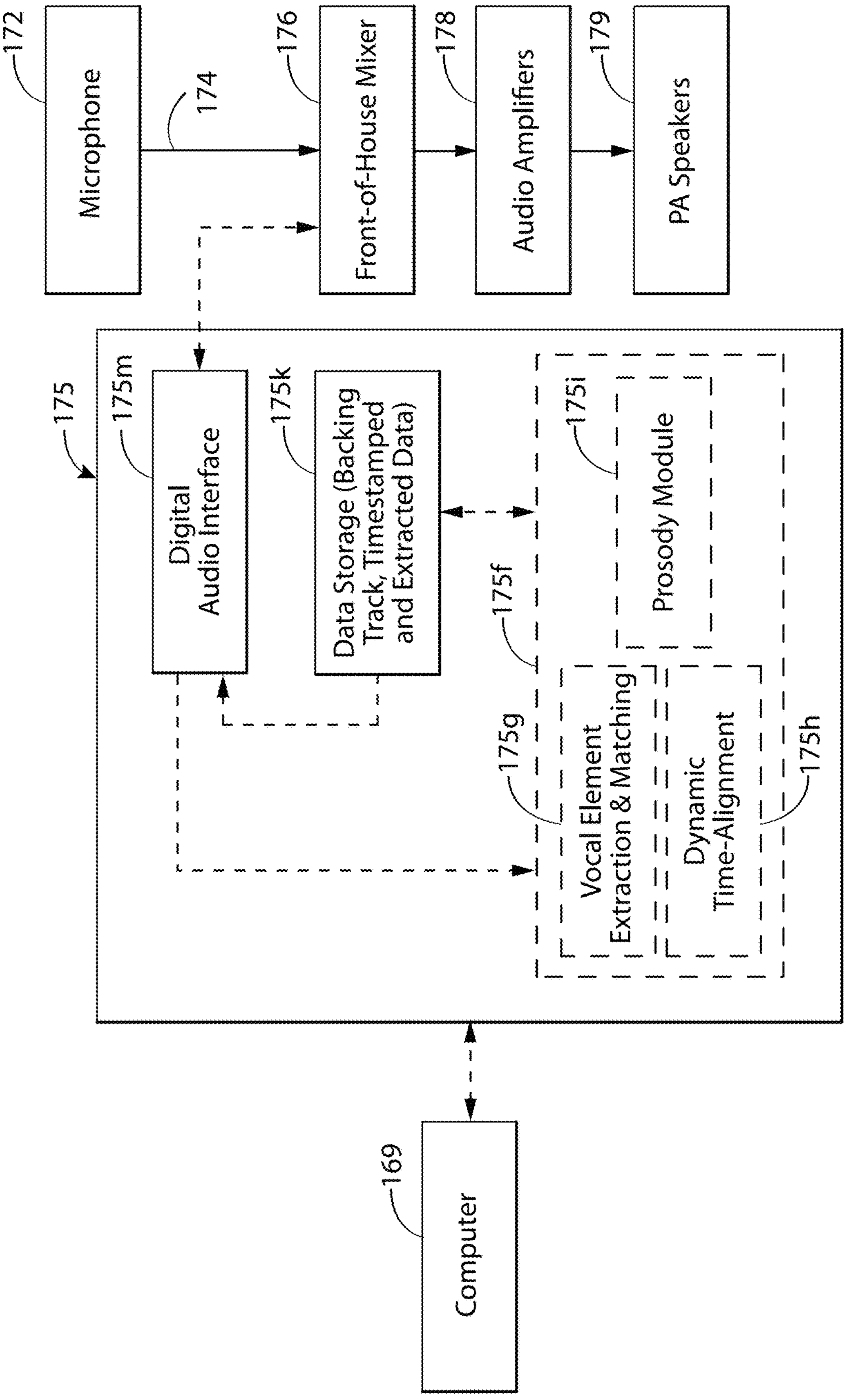
FIG. 26 illustrates an alternative simplified block diagram for a touring band using the vocal backing track synchronization unit during a live performance.

FIG. 26 shows an alternative professional live use case block diagram. For clarity, conceptual blocks within FIG. 25 are shown in wider-spaced dashed lines. Digital signal paths are shown in narrower-spaced dashed lines. In this example, the live vocal signal 174 from the microphone 172 feeds the front-of-house mixer 176. As in the previous example, the front-of-house mixer 176 may be a digital mixer. A microphone preamplifier within the front-of-house mixer, or optionally before the front-of-house mixer, amplifies the microphone signal. The resulting amplified microphone signal feeds an analog-to-digital converter where it is converted to a digital signal that represents the live vocal signal. The resulting digitized live vocal signal may be transmitted to the vocal backing track synchronization unit 175 via a multichannel digital audio interface such as MADI or AES67. The vocal backing track synchronization unit 175 may receive the digitized live vocal signal via a digital audio interface **175*m*. The digital audio interface 175*m* may transmit the digitized live vocal signal to the vocal element processing module 175*f*. The vocal element processing module 175*f* may include a vocal element extraction-matching module 175*g*, dynamic time alignment module 175*h*, and prosody module 175*i*, and data storage device 175*k* that may be structured and function as described for FIG. 25. Continuing to refer to FIG. 26, the resulting time-synchronized, and optionally prosody-adjusted, prerecorded vocal backing track may be streamed from data storage device 175*k*, or from system memory, to the front-of-house mixer 176 via a digital audio interface 175*m*. Alternatively, the signal may be sent to the front-of-house mixer 176 as an analog signal via an optional digital-to-analog converter (not shown). The front-of-house mixer 176 sends the time-synchronized prerecorded vocal backing track to the audio amplifiers 178 and speakers 179. The vocal backing track synchronization unit 175 may be optionally controlled by an external computer 169**.

Figure 27:
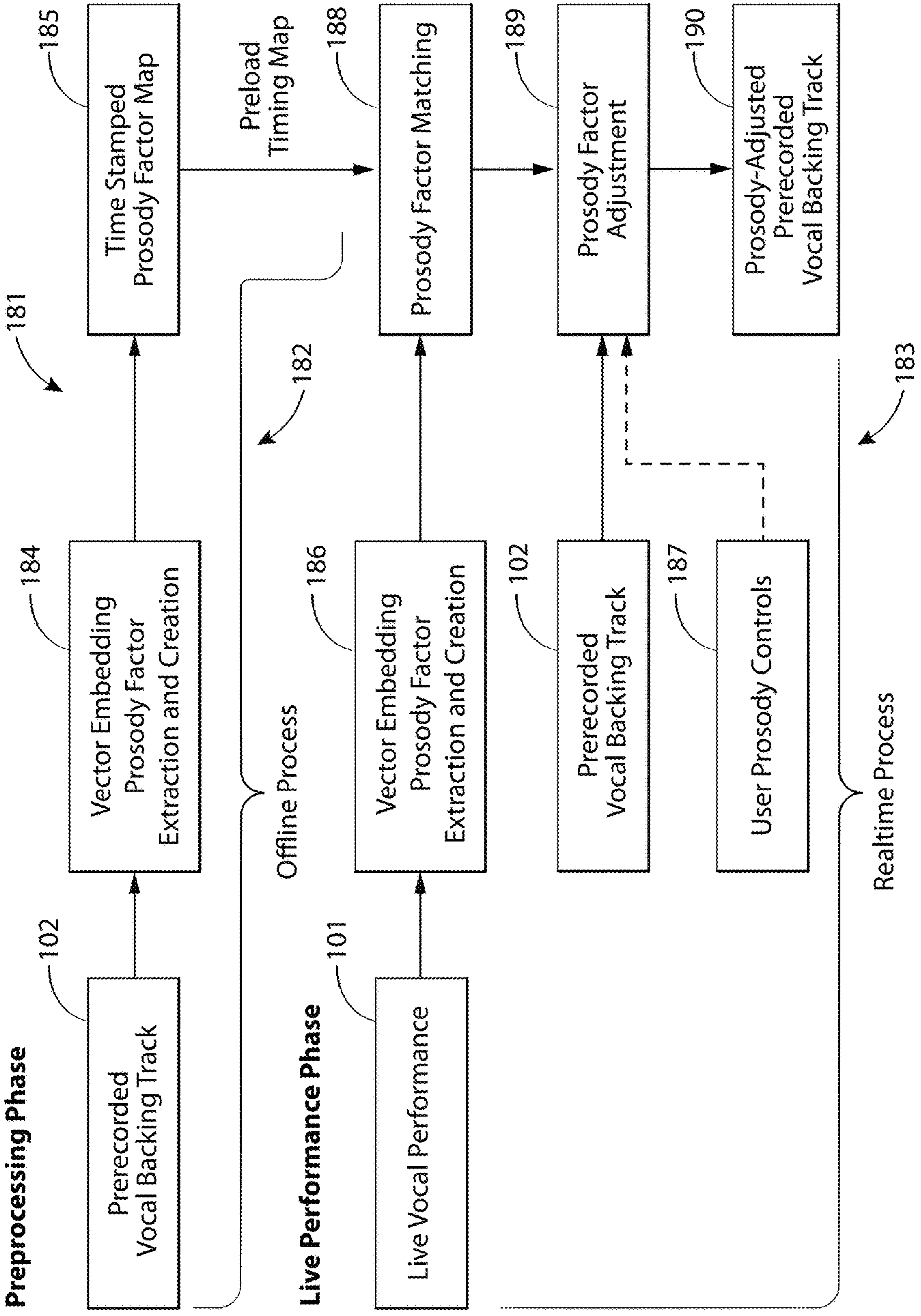
FIG. 27 illustrates a conceptual overview of the preprocessing phase and live performance phase for creating a prosody factor-adjusted prerecorded vocal backing track.
Figure 28:
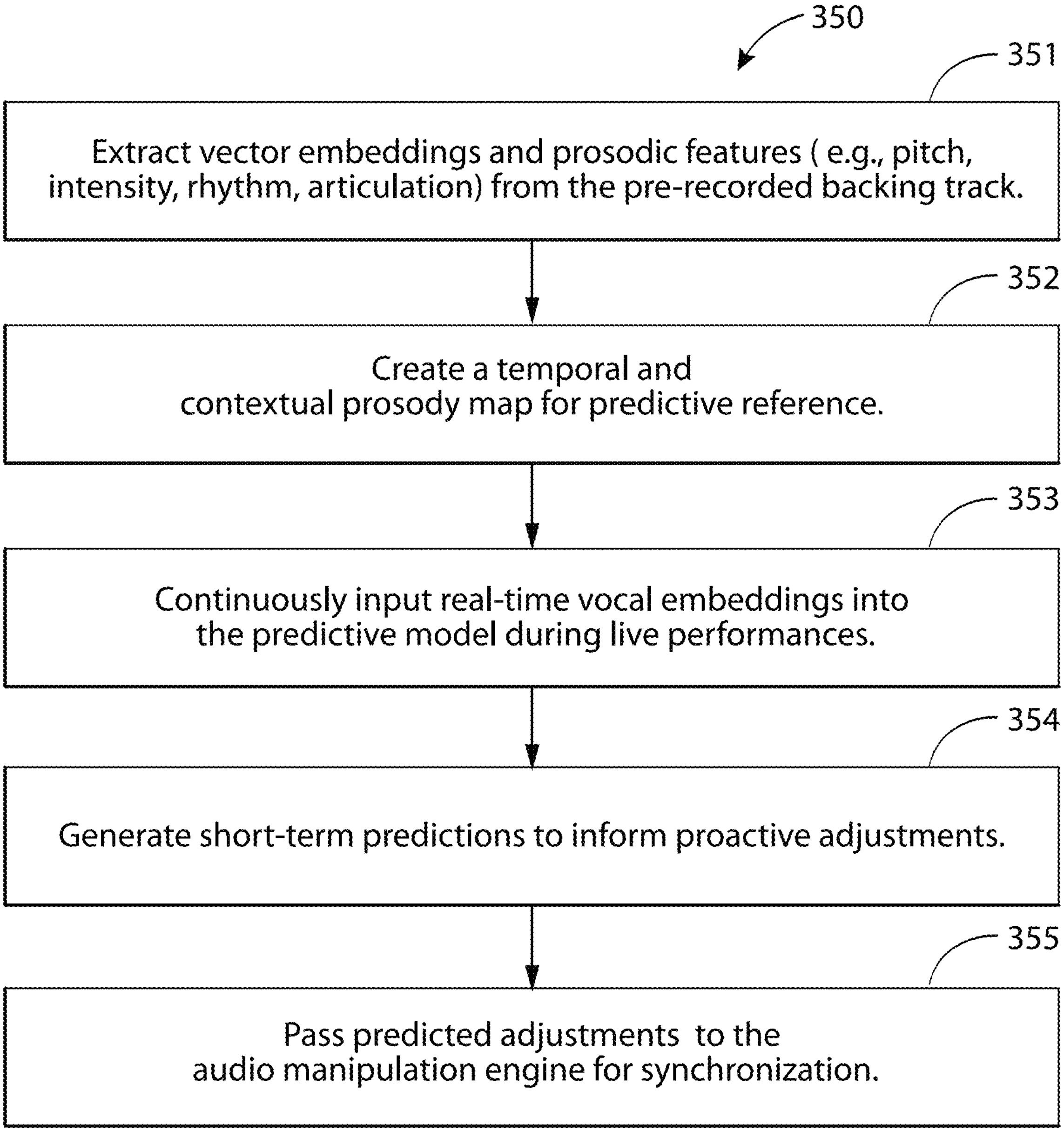
FIG. 28 illustrates a flow chart outlining a process associated with the conceptual overview of FIG. 27.

FIG. 27 illustrates a conceptual overview 181 of the preprocessing phase 182 and live performance phase 183 for creating a prosody-adjusted prerecorded vocal backing track 190. FIG. 28 illustrates a flow chart 350 outlining a process associated with the conceptual overview of FIG. 27. In the description below, functional blocks or structural elements refer to FIG. 27. Steps refer to FIG. 28. Referring to FIGS. 27 and 28, in step 351, in the preprocessing phase 182, before the live performance, vector embeddings and prosody factors, such as pitch, vibrato, dynamics (volume), and stress, may be extracted from the prerecorded vocal backing track 102 using the prosody extraction engine 184. Referring to step 352, the prosody extraction engine 184 creates a timestamped/contextual prosody-factor map 185. The timestamped/contextual prosody-factor map 185 is preloaded before the live performance.

In step 353, during the live performance phase 183, vocal embeddings are extracted using the prosody extraction engine 186 from the live vocal performance 101 in realtime. The resultant vector embeddings are continuously loaded into the predictive model in prosody factor matcher 188, in realtime. In step 354, the prosody factor matcher 188 generates short-term predictions, for example, 50-200 milliseconds ahead, to inform proactive prosody parameter adjustments. In step 355, these predictions are passed into the prosody factor adjuster 189, that synchronize and adjust the prosody factors of the prerecorded vocal backing track 102 to match the live vocal performance 101. The result, is prosody-adjusted prerecorded vocal backing track 190. The prosody parameters are adjusted within a preset range according to user input controls 187. The preset range affects the extent of which the prosody factor adjuster 189 adjusts various prosody factors in the prerecorded vocal backing track 102. This preset range may be adjusted for example, by the live playback engineer or by the front-of-house engineer. In this example, if the vocalist sings off key, the backing track can be adjusted to reflect variation in the singer's pitch, but within a more acceptable and pleasing range. As another example, the vocalist may opt to put more or less emphasis on a particular part, singing louder or softer. In this example, loudness, or dynamic parameters (attack and release of the signal envelope) of the prerecorded vocal backing track can be adjusted according to a preset range. This preset range may be adjusted for example, by the live playback engineer or by the front-of-house engineer.

Figure 29:
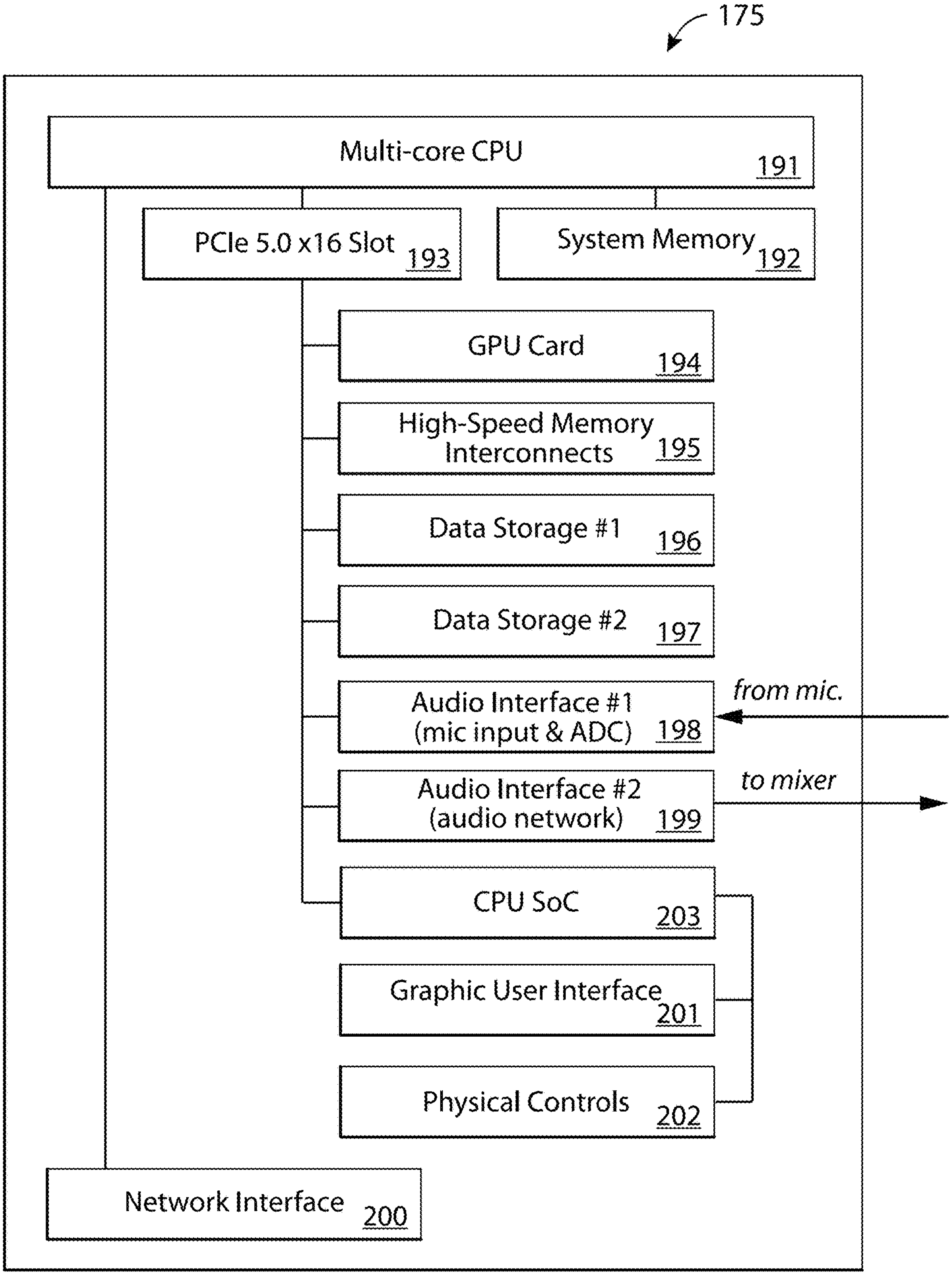
FIGS. 29 and 30 illustrate examples of hardware implementation of the vocal backing track synchronization unit, with FIG. 30 illustrating a hardware-specific example of FIG. 29.
Figure 30:
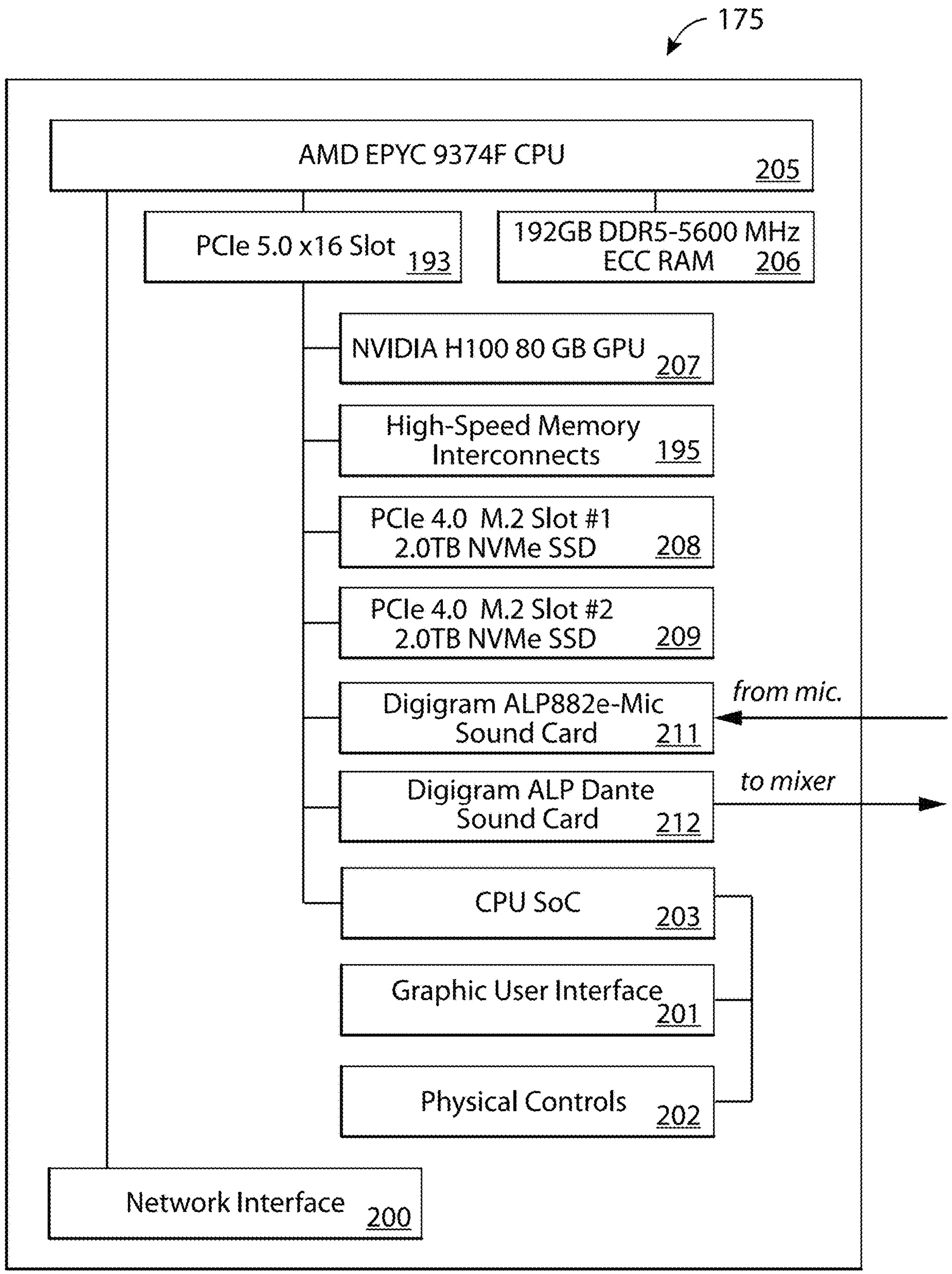

FIGS. 29 and 30 illustrate non-limiting examples of a hardware implementation of the vocal backing track synchronization unit 175. FIG. 30 illustrates a hardware-specific example of FIG. 29. This hardware implementation is designed to ensure that the phoneme identification, extraction, matching, and time-synchronization of the live vocal performance to the prerecorded vocal backing track takes place in realtime. Referring to FIG. 29, the vocal backing track synchronization unit 175 may include a multi-core CPU 191, system memory 192 tied to the multi-core CPU 191, and slots for peripherals, such as a PCI slots 193. The PCI slots 193, may connect to a Graphics Processing Unit (GPU), GPU 194, high-speed memory interconnects 195, general data storage 196, and general data storage 197. The general data storage 196 and general data storage 197 is illustrated in as a solid-state drive or SSD. Analog and digital audio signals may enter and exit the system via an audio interface or multiple audio interfaces, for example, audio interface 198 and audio interface 199. The audio interface 198 and audio interface 199 may be in the form of PCI cards that communicate with the multi-core CPU 191 via the PCI slots 193. In this example, audio interface 198 includes microphone and line-level inputs, and analog-to-digital converters. Audio interface 199, as illustrated, includes audio network interface such as AES67 or MADI. The vocal backing track synchronization unit 175 may include a network interface 200, such as USB, Bluetooth, Wi-Fi, or Ethernet, for communication with external peripheral devices, such as an external computer. The network interface typically communicates directly with the multi-core CPU 191. The vocal backing track synchronization unit 175 may also include a built-in graphic user interface 201 and physical controls 202, which are both optional. The built-in graphic user interface 201 and physical controls 202 may be connected to an optional system-on-a-chip, such as SoC CPU 203. The SoC CPU 203 may reside on the motherboard or be on a PCI card. The built-in graphic user interface 201 may be, for example, an LCD display, OLED display, or other graphic display suitable for the environment found in a professional live sound venue. The built-in graphic user interface 201 may be a simple display or a touchscreen. The physical controls 202 can be knobs connected to encoders or potentiometers. They may also include push buttons or toggles. The physical controls may optionally include haptic feedback.

The multi-core CPU 191 should be capable of performing the vocal element identification, extraction, matching, and time-synchronization, as previously described. The analog-to-digital converter within the audio interface 198 should have conversion latency sufficiently low enough as to not impact the overall performance of the system. Similarly, the general data storage 196 and general data storage 197 should have read/write and throughput speeds as to not impact the system performance and maintain system latency to real-time.

FIG. 30 illustrates an example of a specific hardware implementation of the vocal backing track synchronization unit 175 of FIG. 29 with an example of suitable hardware components. Referring to FIG. 30, an example of a multi-core CPU capable of this is the AMD EPYC-9374F CPU 205. The AMD EPYC-9374F is optimized for machine-learning algorithms. Other possible multi-core CPUs suitable for these tasks may include versions of the AMD Threadripper, or the Intel Xeon Gold 6448Y. The system memory 206 is illustrated as 192 GB DDR5 5600 MHZ ECC RAM, which should have sufficient speed and size to stream and extract the phonemes from the live vocal stream and stream and time-align the prerecorded vocal backing track. It should also have sufficient speed and size to preform prosody analysis on the live vocal stream, and dynamically control one or more prosody parameters of the prerecorded vocal backing track.

The GPU card 207 is illustrated as a NVIDA H100 80 GB GPU. The general data storage 208 and general data storage 209 are illustrated as 2 TB NVMe solid-state drives. The size and performance of these solid-state drives, or SSDs, should be sufficient to store the prerecorded vocal backing track, store software such as ContentVec or Wave2Vec 2.0 for the vocal element identification, extraction, and matching, store software such as Zplane Élastique for time-compression expansion, and store the operating system, such as Ubuntu Linux. They also have sufficient speed to operate in the demanding professional environment of live sound venues. The audio interface 211 and the audio interface 212 are illustrated as a Digigram ALP882e-Mic sound card, and a Digigram ALP Dante Sound card, respectively. The Digigram ALP882e-Mic includes features suitable for a professional live audio environment, such as balanced analog microphone inputs with digitally adjustable microphone gain. It also includes other features suitable for professional live venue applications such as analog-to-digital and digital-to-analog conversion at 24 bits and 192 kHz, and PCM data formats up to 32-bit floating point. The Digigram ALP Dante sound card is a network audio card and includes support for AES67 and AES3 protocols. The PCI slots 193, high-speed memory interconnects 195, network interface 200, built-in graphic user interface 201, physical controls 202, and the SoC CPU 203, may be as discussed for FIG. 29.

Figure 31:
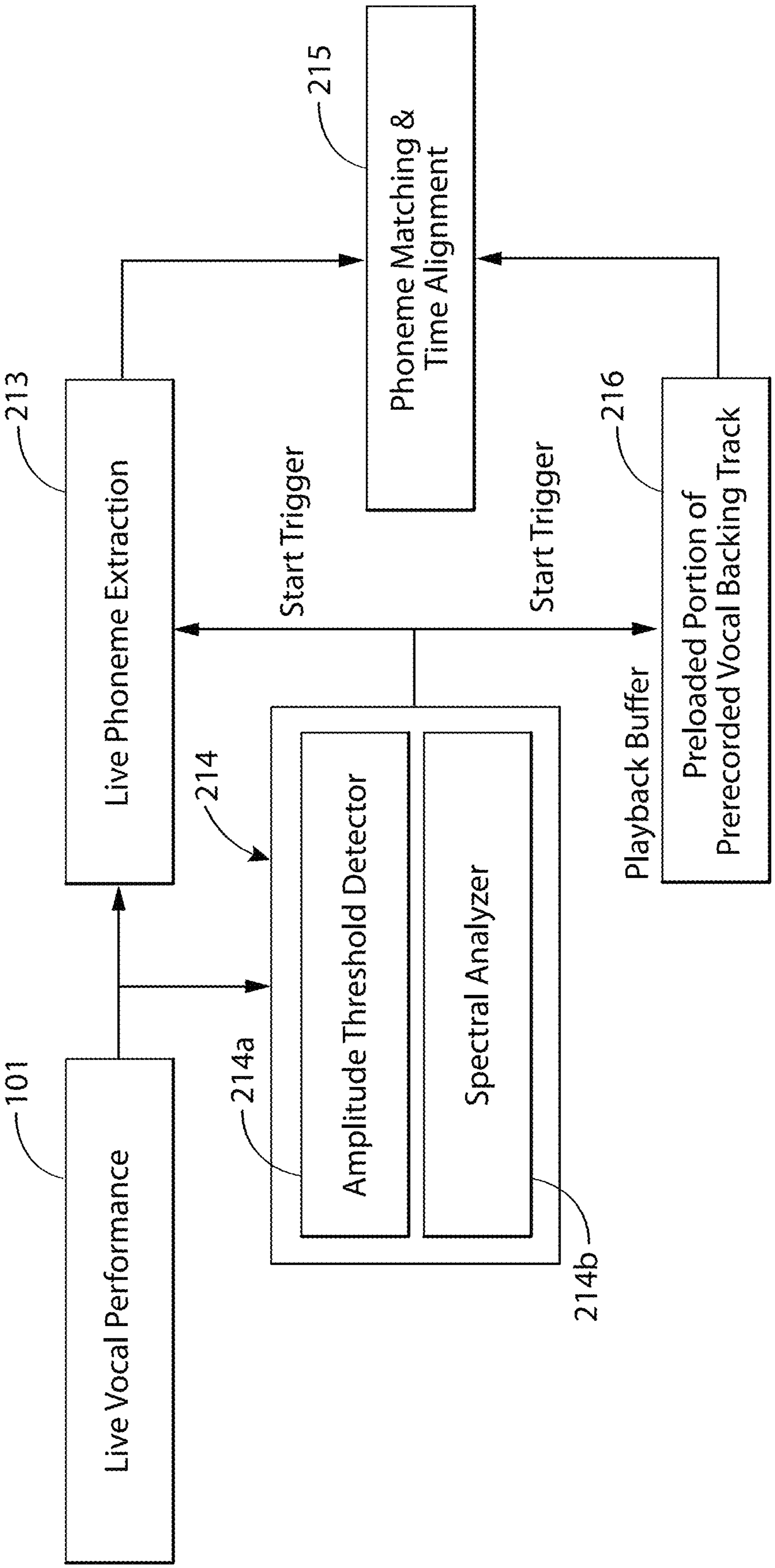
FIG. 31 illustrates a block diagram of a mechanism for accelerating the vocal element extraction process from the live vocal performance by detecting the start of the live vocal stream that modifies the prerecorded vocal backing track.

The Inventor noted, that there are situations where it is known in advance, which songs, and portions of songs, in the prerecorded vocal backing track might be used, to enhance or replace a live vocal performance. The Inventor discovered that he might be able to leverage this knowledge to reduce latency during the vocal element and matching process. FIG. 31 illustrates a block diagram that leverages this advanced knowledge to accelerate vocal element extraction and matching process. The mechanism detects the start point of the live vocal performance for a given section. Since what is being sung during that section is already known, the start point detector can be used to trigger the start of the prerecorded vocal backing track. The processing burden of vocal element detection and matching is reduced because the prerecorded vocal backing track is approximately prealigned with the live vocal performance. This reduces latency, because it reduces the initial overhead of the vocal element identification and extraction process. In the example in FIG. 31, the vocal elements may include phonemes. In this case, the phoneme identifier and extractor can work from a smaller subset of phonemes. This subset of phonemes is much smaller than the entire syllabary of phonemes and therefore reduces processing burden.

Referring to FIG. 31, the live vocal performance 101 is monitored by the start point detector 214. The start point detector 214 sends a start trigger signal to the phoneme extractor 213, to begin phoneme identification and extraction. The start trigger signal is also sent to the playback buffer 216, where the corresponding portion of the prerecorded vocal backing track is stored. This playback buffer may be stored in flash memory or a solid-state drive, but is typically stored in working memory or system memory, such as ECC RAM. The phoneme matching and time alignment module 215 temporally aligns the playback buffer 216 to the phoneme extractor 213. The initial alignment is much faster because the live vocal performance and prerecorded vocal backing track are already partially aligned from the start.

FIG. 31 illustrates two mechanisms for detecting the start point. These include amplitude detection and spectral detection. The start point detector 214 includes both an amplitude threshold detector 214*a* and a spectral analyzer 214*b*. The amplitude threshold detector 214*a* and a spectral analyzer 214*b*, may be used either alone or in combination.

Figure 32:
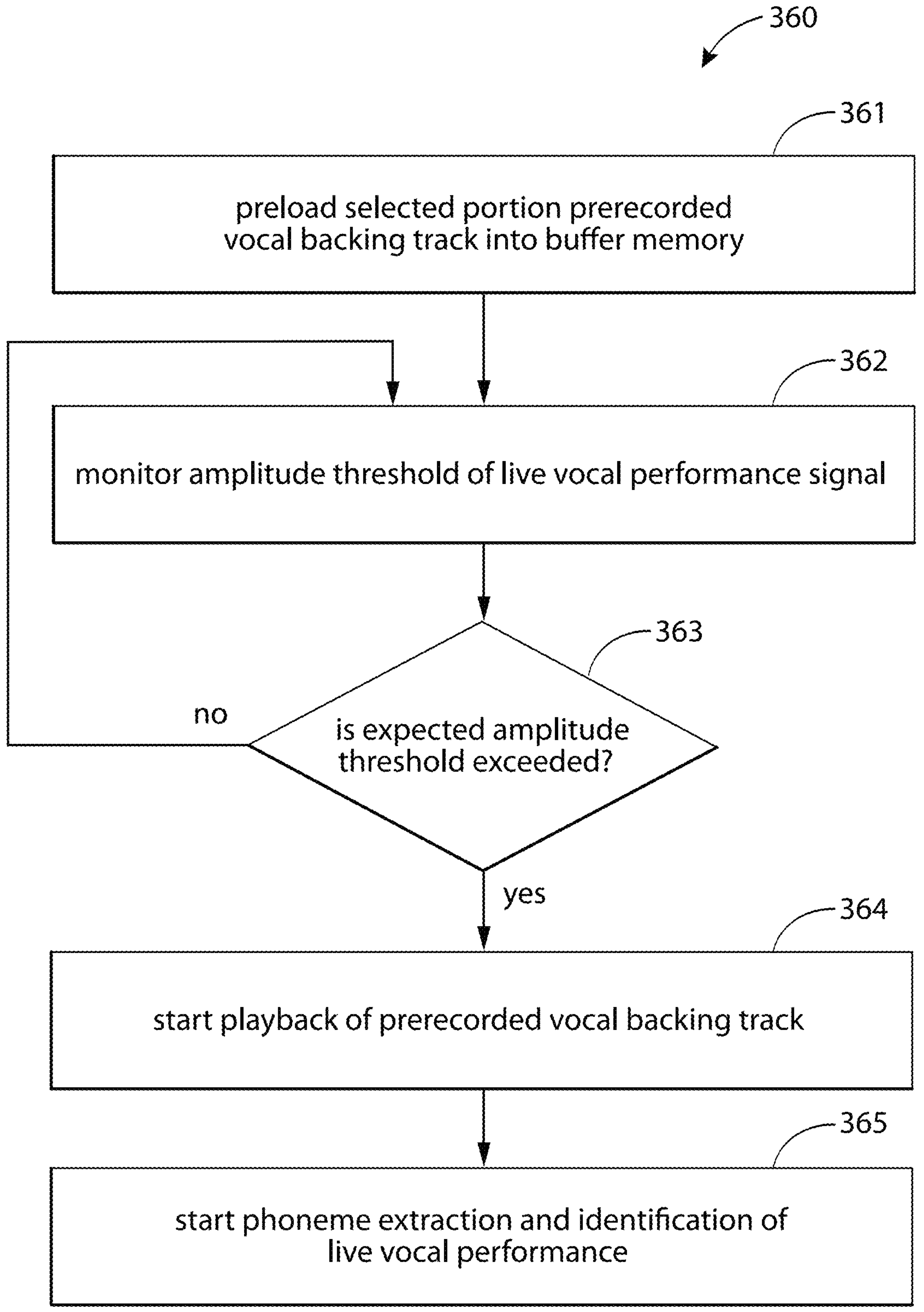
FIG. 32 illustrates a flow chart showing typical steps for detecting the start of the live vocal stream by using amplitude threshold analysis.
Figure 33:
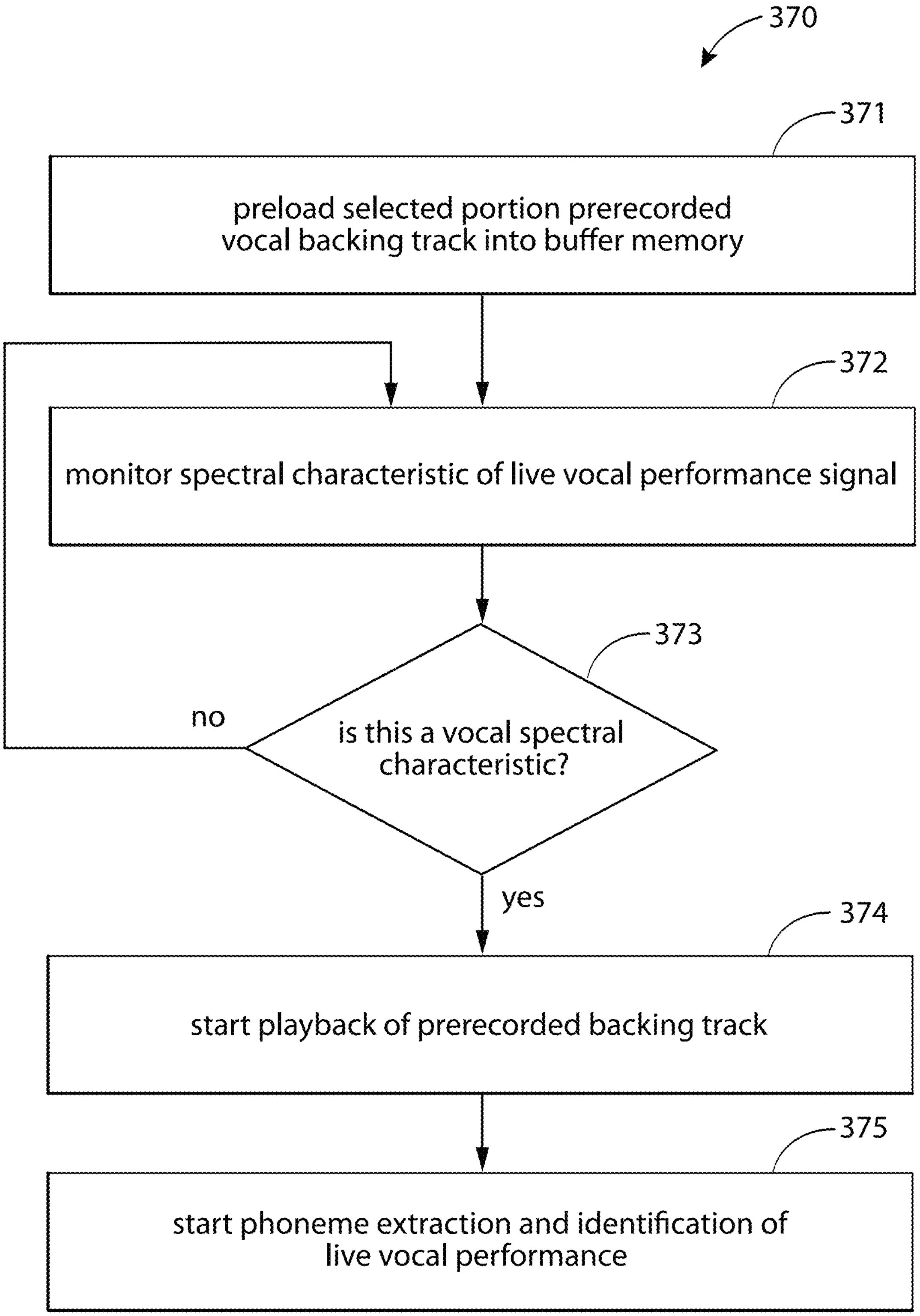
FIG. 33 illustrates a flow chart showing typical steps for detecting the start of the live vocal stream by analyzing the spectral characteristics of the live vocal performance.

FIG. 32 illustrates a flow chart 360, which shows typical steps for detecting the start of the live vocal stream, by using amplitude threshold analysis. FIG. 33 illustrates a flow chart 370, with typical steps for detecting the start of the live vocal stream, by analyzing the spectral characteristics of the live vocal performance. Referring to FIG. 32, in step 361, a selected portion of the prerecorded vocal backing track is preloaded into a playback buffer. As previously described, this playback buffer is typically system memory, or working memory, such as DRAM or ECC RAM. In step 362, the amplitude of the live vocal performance is monitored until it surpasses a preset amplitude. The amplitude is chosen of what would be typical of the relative start note amplitude for the expected vocal performance. A typical amplitude threshold used to detect the onset of a live vocal stream is approximately −30 dBFS, which is sufficiently above typical ambient noise floors (usually around −45 dBFS to −60 dBFS). This ensures reliable triggering upon actual vocal entry while minimizing false detections due to background noise or minor signal fluctuations. In step 363, if the amplitude threshold is not exceeded, the monitoring process is continued. If amplitude threshold is exceeded, then in step 364, the system starts playback of the prerecorded vocal backing track. In step 365, the system will simultaneously start the phoneme extraction and identification process.

One of the challenges with using a threshold detector is possible sensitivity to background noise or noise spikes. This can be reduced by using frequency limiting filters (for example a lowpass filter), but this does not eliminate the problem. FIG. 33 uses spectral analysis to detect the start of the live vocal performance. While the example is given for phonemes, it could also apply to vector embeddings. Referring to FIG. 33, in step 371, a selected portion of the prerecorded vocal backing track is preloaded into a playback buffer, as was described for FIG. 32. In step 372, the spectral content of the live vocal performance signal is monitored until it matches the range of spectral content expected from a human voice. Typical spectral criteria for detecting vocal onset include identifying stable harmonic spectral peaks within the fundamental vocal frequency range of approximately 80-1,000 Hz, with harmonic overtones exhibiting at least a 10-15 dB peak-to-floor energy contrast. Additionally, spectral stability of this harmonic structure over at least 30-50 milliseconds ensures reliable vocal onset detection, minimizing false positives from transient noise. In step 373, if the spectral content is not within the spectral range of a human voice, the monitoring process continues. If the spectral content is within the spectral range of a human voice, then in step 374, the system starts playback of the prerecorded vocal backing track. In step 375, the system will simultaneously start the phoneme extraction and identification process. The spectral content can be derived using an FFT, which has relatively low-latency. However, an FFT is not as fast as amplitude threshold detection. A hybrid approach may overcome the disadvantages of both.

Figure 34:
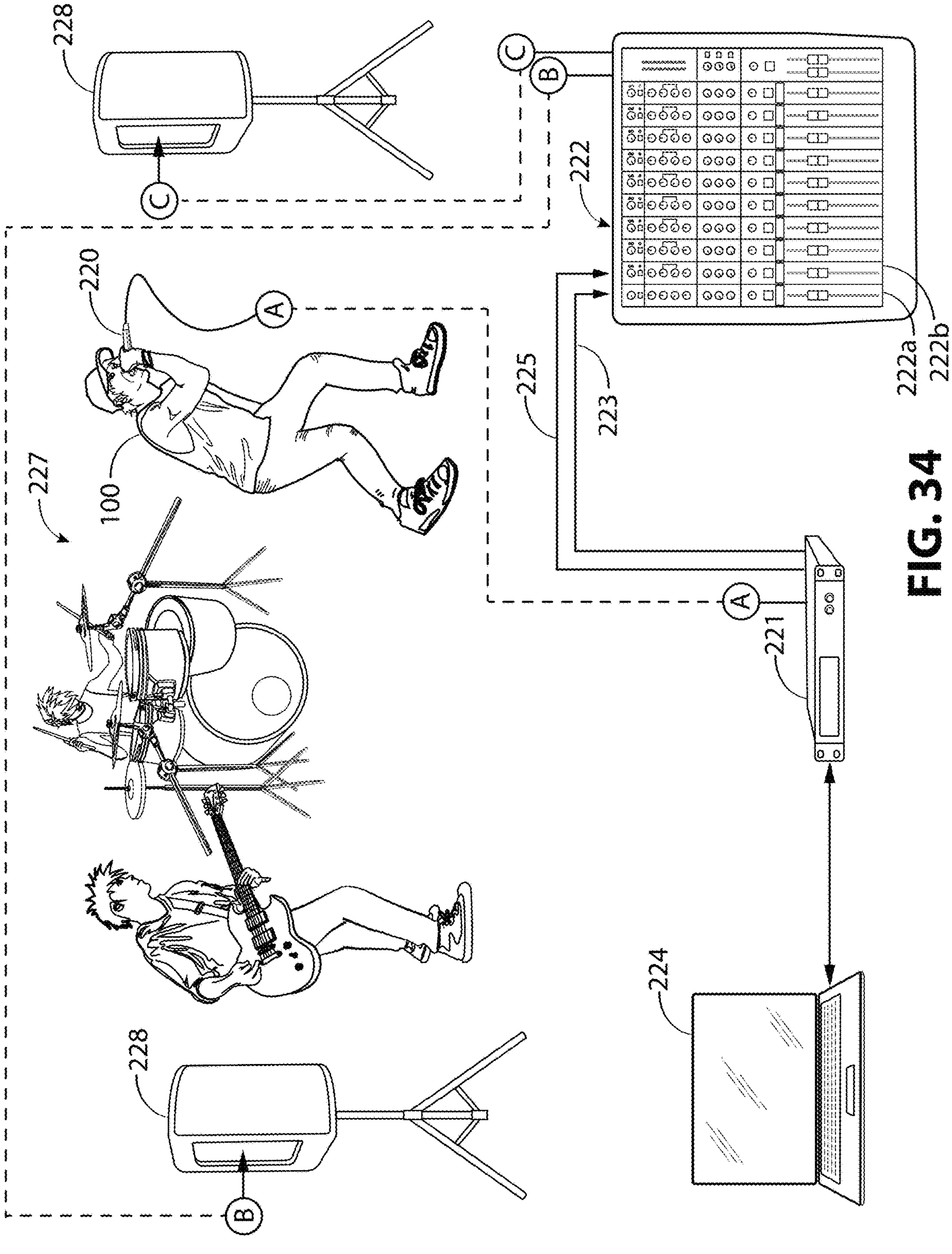
FIG. 34 illustrates an alternative live use case.

Using the start point detector as described for FIGS. 31-33, may reduce processor overhead sufficiently to allow the vocal element extraction and synchronization system 110 to be used in less critical situations where cost is an important consideration. Examples of less critical situations might include prosumer use, parties, or small live venues. FIG. 34 illustrates a typical small venue live use case. In FIG. 34, the vocalist 100 sings into a microphone 220. The vocalist's live performance may be transmitted to a microphone preamplifier converter 221, which includes one or more microphone preamplifiers and analog-to-digital converters. The live vocal signal is also sent from the microphone preamplifier converter 221 to a live sound mixer 222. In FIG. 34, the live sound mixer 222 is illustrated as an analog mixer. In this example, the microphone preamplifier may send an amplified live vocal signal 223 to a line-level input within channel 222*a* of the live sound mixer 222. The microphone preamplifier converter 221 sends a digitalized version of the live vocal signal to an external computer 224. This may be sent by computer protocol such as Ethernet, or USB3. The external computer 224 preforms the start point detection, phoneme extraction of the live vocal performance, and time alignment of the prerecorded vocal backing track to the live vocal performance. The resulting time-synchronized backing track is sent to the microphone preamplifier converter 221 where it is converted to an analog signal via a digital-to-analog converter. The time-synchronized backing track signal 225 is sent to a line-level input within mixer channel 222*b* of the live sound mixer 222. Signals from the other band members, also feed the live sound mixer 222. The live sound engineer could feed the performance of all the band members 227 to the mixer output, which feeds the PA speakers 228. This may include the live vocal performance signal, the time-synchronized back track signal, or a mixture of the two. In this example, it is assumed that either the live sound mixer 222 or the PA speakers 228 have built-in amplifiers. Letters "B" and "C," within circles, represent the signal connection between the live sound mixer 222 and PA speakers 228. Letter "A" within a circle represents the signal connection between the microphone 220 and the microphone preamplifier converter 221. The vocal element extraction-synchronization software 229 is stored on a tangible medium, such as DRAM, solid-state drive, or hard drive. The tangible medium includes instructions that direct at least one processor within the external computer 224 to identify, extract, and match the vocal elements from the live vocal performance to the prerecorded vocal backing track. The instructions also direct the processor or processors, to time-synchronize the prerecorded vocal backing track to the live vocal performance in realtime. The computer may include one or more processors, or one or more multi-core processors capable of performing this task. For example, the Apple M4 Pro, M4 Max, or M4 Ultra may be capable of performing this function, especially if coupled with the start detection routine discussed in FIGS. 31-33.

Figure 35:
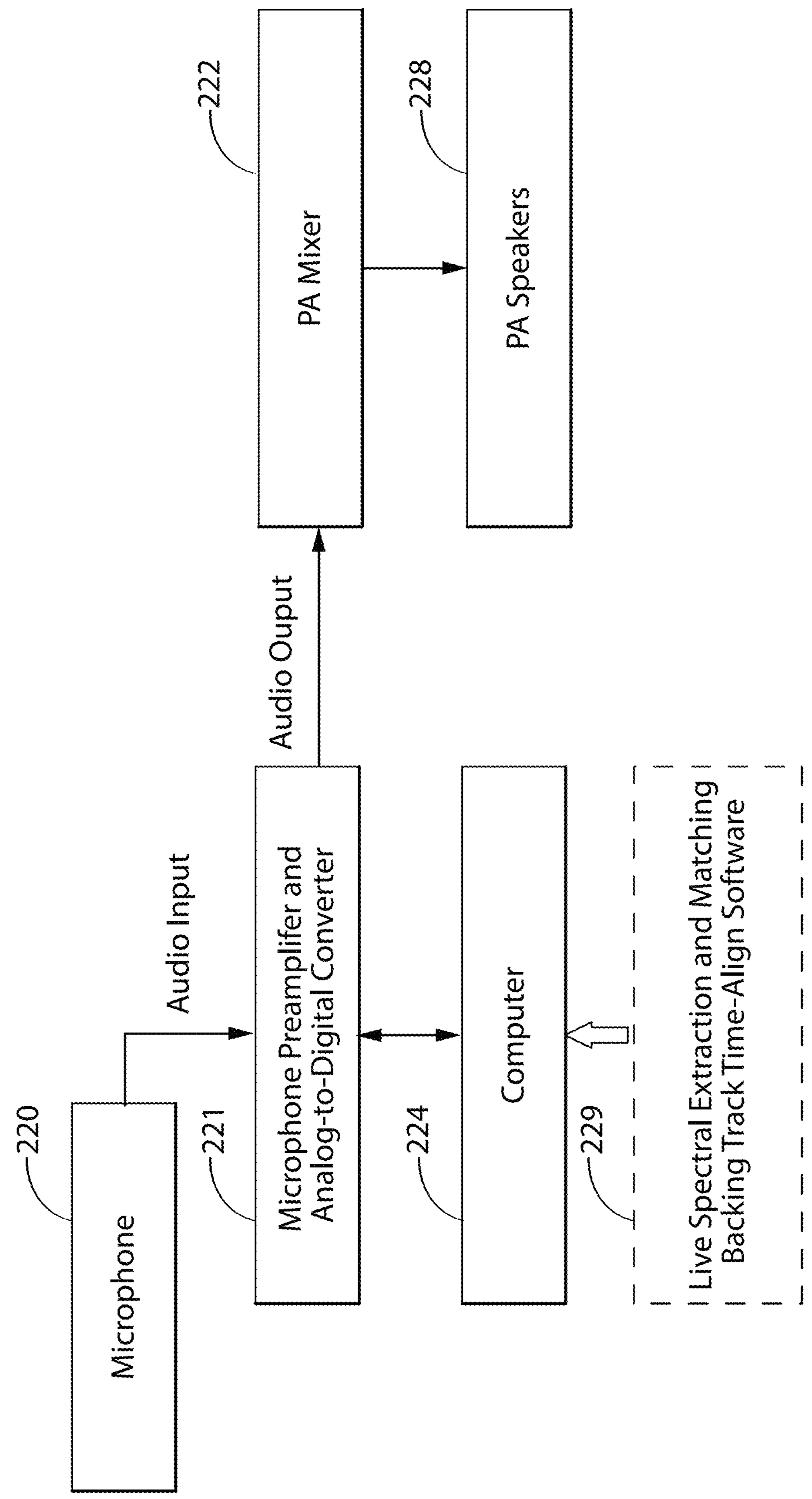
FIG. 35 illustrates a block diagram of the alternative live use case of FIG. 34.
Figure 36:
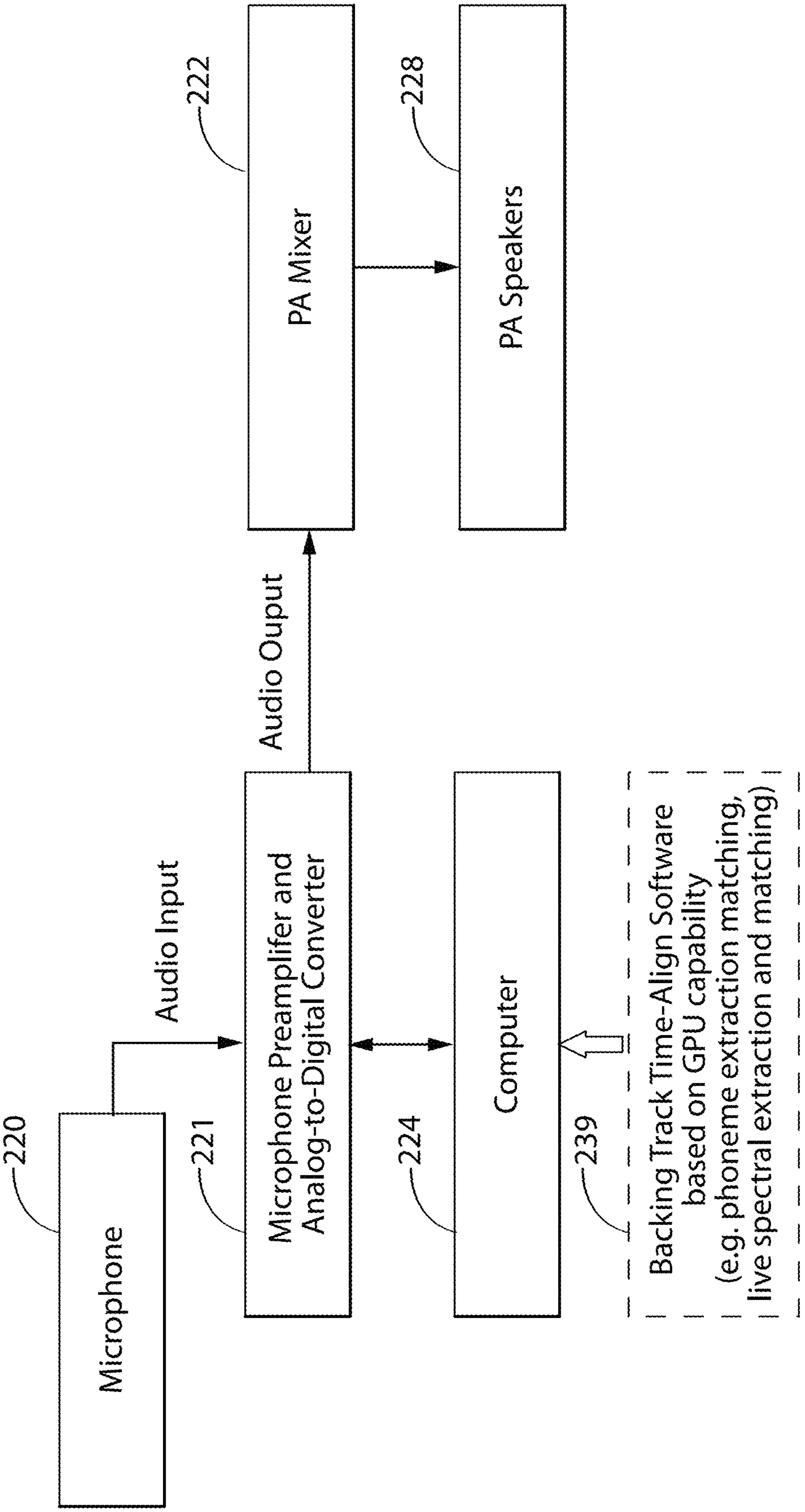
FIG. 36 illustrates a simplified block diagram of the alternative live use case of FIG. 34 where the software runs the vocal element extraction and matching process based on the computer's hardware capability.

Vector Embedding extraction and synchronization, as well as phoneme extraction and synchronization, in realtime, typically require a computer with GPUs suitable for machine-learning calculations. There may be notebook and desktop computers available that have the required GPU capability. Spectral Analysis, such as FFT and STFT, appear to be less accurate than phoneme or vector embeddings extraction. However, they are less GPU intensive. FIGS. 35 and 36 illustrate a block diagram that approximates the live use case of FIG. 34, with the microphone 220, microphone preamplifier converter 221, live sound mixer 222, external computer 224, and PA speakers 228, as previously described. In FIG. 35, the external computer 224 includes vocal element extraction-synchronization software 229 that may function as described for FIG. 34 and may include start point detection. In FIG. 36, the external computer 224 includes vocal element extraction-synchronization software 239 that may also detect system capabilities, such as GPU, CPU, or memory. Based on the computer's capabilities, the software will select the appropriate vocal element identification, matching, and synchronization routine. For example, if the system had sufficient GPU, CPU, and memory, the system would load software routines that use phonemes or vector embeddings. If the system had sufficient CPU and memory but not GPU capability, it might automatically load and run software routines that use vocal audio spectra.

The vocal element extraction and synchronization system can also be used for intentionally delayed, or "deferred live," broadcasting of television or live streaming of video with audio that includes a vocalist. Live broadcast television often uses deferred live broadcast to censor out profanity. This is known in the broadcast industry as the "seven second delay" but is not limited to seven seconds. For example, it may be as little as five seconds or could be thirty seconds or longer. Live broadcast engineers could, during the delay period, use the vocal element extraction and synchronization system to fix errors in the vocal performance, by replacing portions of the live vocal performance with a prerecorded vocal backing track. The vocal element extraction and synchronization system may be connected in the delayed live vocal broadcast stream. If there is an error during the live vocal performance, the live broadcast engineer, or playback engineer, could quickly cue up the offending portion of the vocal performance, and begin the vocal element identification, extraction, matching and synchronization process. The process of identification, extraction, matching, and synchronization would be the same as previously described, except the delayed live vocal stream modifies the prerecorded vocal backing track.

Figure 37:
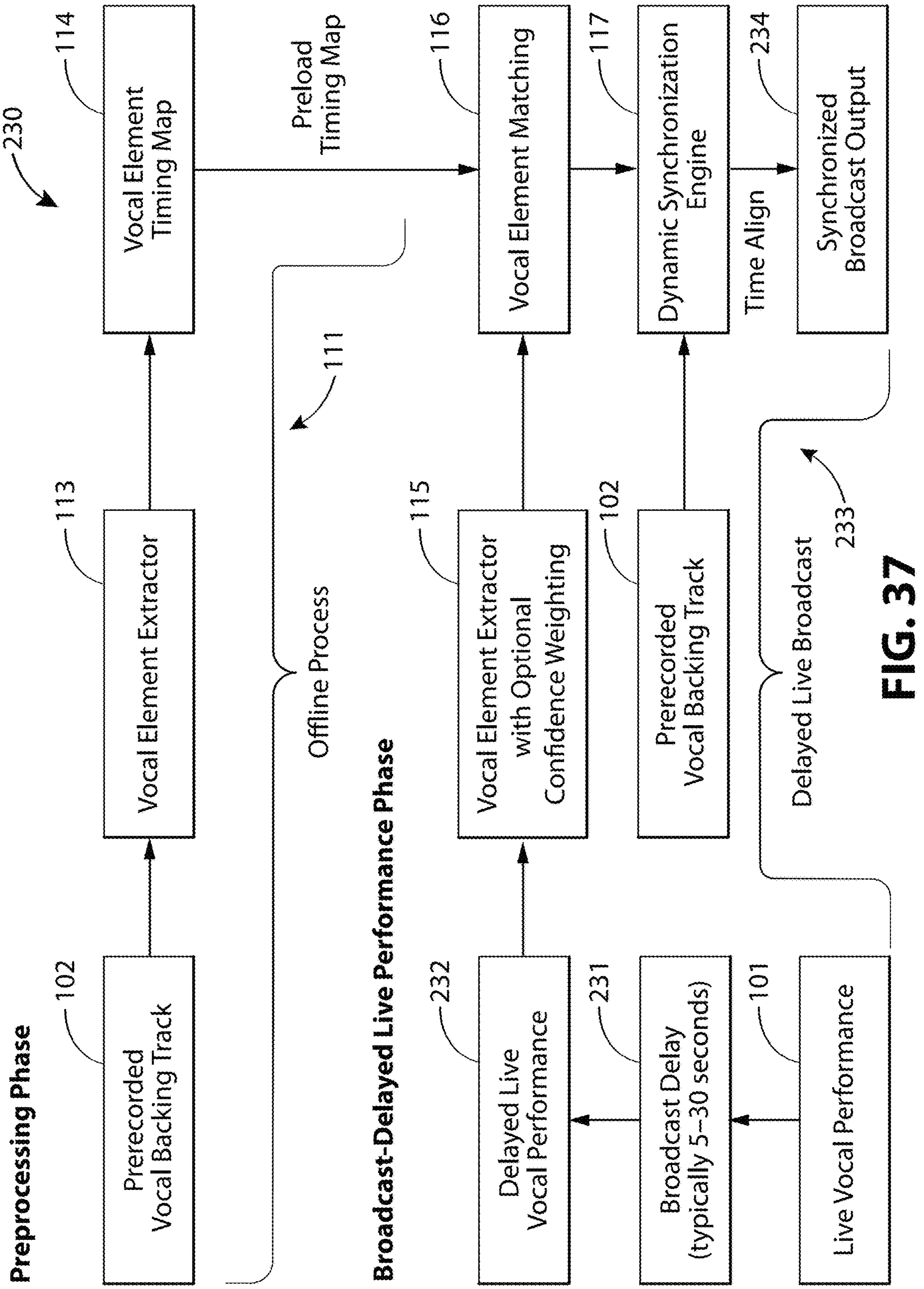
FIG. 37 illustrates a conceptual overview of the preprocessing phase and broadcast-delayed live performance phase of the vocal element extraction and synchronization system.

FIG. 37 illustrates a conceptual overview of the preprocessing phase 111, and broadcast-delayed live performance phase 233, of the vocal element extraction and synchronization system 230. Referring to FIG. 37, the live vocal performance 101 is run through a broadcast delay 231. This broadcast delay 231, as stated above, is typically five to thirty seconds. This results in a delayed live performance signal 232. The delayed live performance signal feeds the vocal element extraction unit 115. The preprocessing phase 111, including the prerecorded vocal backing track 102 and vocal element extractor 113, remains the same as previously described. The vocal element matcher 116 and the dynamic synchronization engine 117 function as previously described, and results in a synchronized broadcast output 234.

Conclusion and Variations.

The Summary, Detailed Description, and figures describe a system, device, and method using realtime vocal element extraction and synchronization to enhance vocal performance. This disclosure provides examples of devices, components, and configurations to help the reader understand the described general principles. The following are examples of variations and combinations of different components, structures, and features that still adhere to the general principles.

Steps or methods performed by "a processor," may be performed by at least one processor, but may be distributed among multiple processors. For example, the process of identifying and extracting vocal elements, such as phonemes, vector embeddings, or vocal audio spectra, may be performed by a single processor, or a multiple core processor, or may be distributed in parallel or serially across more than one processor. For example, the live performance phase 122 of FIG. 8 may be performed by a single processor, a multi-core processor, or distributed across multiple processors. These multiple processors may be enclosed within one enclosure or device or distributed among multiple devices. Likewise, step 302, 303, 304 of FIG. 7, may be performed by a single processor or multi-core processor, but it may also be distributed across several processors within single or multiple devices. Streaming and time-aligning the prerecorded vocal backing track to the live vocal stream can be accomplished by a multi-core CPU used to identify the vocal elements in the live vocal stream or may be performed by separate CPUs. Controlling the gain of the microphone preamplifier within audio interface 198 of FIG. 29 may be accomplished by the multi-core CPU 191, the SoC CPU 203, a dedicated gain control device, or an external computer accessed via the network interface 200. The analog-to-digital conversion process is typically controlled by a dedicated analog-to-digital converter. The analog-to-digital converter may be combined with a CPU, SoC CPU, field programable logic arrays (FPGA) or a combination device that includes an analog-to-digital and a digital-to-analog converter. The processor may be a microprocessor, a specialized processor optimized for machine-learning, a multi-core processor with internal memory, a multi-core processor with external memory, a digital signal processor (DSP), or a processor optimized for audio processing. The processor may be one processor or more than one processor that encompasses a combination of some or all of the above-mentioned processor types. Some or all of the processing tasks, audio conversion tasks, or digital audio communication, may be accomplished by an FPGA or other equivalent devices.

The tangible medium that stores non-transitory computer-readable instructions that are read and executed by at least one or more processors, may be a memory device separate from the processor such as DRAM or EEC RAM. The tangible medium may be a memory device integrated within the processor. The tangible medium that stores non-transitory computer-readable instructions may alternatively, or additionally, be a flash memory, a hard drive, or other storage medium know in the art. The non-transitory computer-readable instructions may be stored in one tangible medium, and transferred to another tangible medium. For example, the non-transitory computer-readable instructions may be stored on a solid-state drive, such as general data storage 196 of FIG. 29 and transferred into system memory, such as system memory 192 of FIG. 29.

The microphone preamplifier may be internal or external to the vocal backing track synchronization unit 175. Microphone preamplifier can be in a standalone unit. The microphone preamplifier may be combined with the analog-to-digital converter in a standalone unit, for example the microphone preamplifier converter 221 of FIG. 34. The microphone preamplifier may be inside the microphone. The combination of the microphone preamplifier and analog-to-digital converter may be inside the microphone. The microphone preamplifier or combination of microphone preamplifier and analog-to-digital converter may be inside a digital mixer, or a digital audio workstation.

FIGS. 4, 5, and 6 illustrate examples of timestamped vocal elements in the form of timestamped phonemes, timestamped feature vectors, and timestamped vocal audio spectra, respectively. These can be stored in standalone files. They may also be appended to the prerecorded vocal backing track, for example as a header file. They can be stored and formatted in any appropriate manner that allows the vocal element extraction and synchronization system to process that data as described within this disclosure.

FIGS. 3, 8, 10-12, 14, 16, 27, 31 and 37 include software-based conceptual blocks in order to aid the reader's understanding of the disclosed concepts. FIGS. 19, 20, 25, 26, 35, and 36 illustrate hardware elements with software conceptual blocks in dashed lines. Functions within these conceptual blocks may be combined or may be broken down into sub-blocks. For example, referring to FIG. 3, the vocal element extraction unit 115 and vocal element matcher 116 might both use the same software, such as ContentVec or Wave2Vec 2.0, and be combined into one block. It might be useful, for illustrative purposes, to express these as several sub-blocks, as in the case of FIG. 12. The point being, that these blocks and sub-blocks are conceptual in nature and are presented to simplify explanation. The inventive concept is not limited to these blocks and sub-blocks.

Examples of software that may be suitable for some or all of the tasks associated with extracting phonemes or vector embeddings, creating vector embeddings, as well as time-stamping the prerecorded vocal backing track, include ContentVec, Wave2Vec 2.0 (by Meta), HUBERT (by Meta), CMU Sphinx, Kaldi, DeepSpeech (Mozilla), Praat, Gentle Forced Aligner, and NVIDIA Nemo.

FIG. 3 discussed the general case of vocal elements. FIGS. 8, 10, and 14 showed specific examples of vocal elements: phonemes, vector embeddings, and vocal audio spectra, respectively. The vocal elements may include two or more types of vocal elements. A first example of two or more types of vocal elements would be phonemes and vector embeddings. A second example of two or more types of vocal elements would be phonemes and vocal audio spectra. A third example of two or more types of vocal elements would be vector embeddings and vocal audio spectra. A fourth example of two or more types of vocal elements would be phonemes, vector embeddings, and vocal audio spectra. The two or more types of types of vocal elements could be used with or without the confidence weighting. Dynamically controlling timing of the prerecorded vocal backing track in realtime could use two or more types of vocal elements extracted from the live vocal performance, matched to corresponding timestamped two or more types of vocal elements, extracted from the prerecorded vocal backing track. For example, phonemes and vector embeddings could be extracted from the live vocal performance. The phonemes extracted from the live vocal performance could be matched to corresponding timestamped phonemes extracted from the prerecorded vocal backing track. At the same time, vector embeddings extracted from the live vocal performance could be matched to corresponding time-stamped vector embeddings extracted from the prerecorded vocal backing track.

While this description discussed three types of vocal elements, phonemes, vector embedding, and vocal audio spectra, there are other types of vocal elements that could be used by following the similar principles. For example, the vocal element extraction and synchronization system could use feature vectors. Feature vectors could be utilized in a similar manner as was discussed for vector embedding in FIG. 10.

The monitor speakers 166 in FIG. 18 and PA speakers 228 of FIG. 34 are assumed to be self-powered and include built-in audio amplifiers. Alternatively, these monitor speakers may be passive and be paired with external amplifiers. The live sound mixer 222 of FIG. 34 may be self-powered and be paired with passive speakers. In the case of self-powered speakers, the feed between the audio mixer or digital audio workstation may be analog or digital. In the case of passive speakers, the feed between the audio mixer or digital audio workstation and power amplifier may be analog or digital. The speakers 179 of FIG. 21 are depicted as a pair of line-array speakers. This is to simplify illustration. A typical large-venue concert may include many clusters of line array speakers as well as sub-woofers. Typical line array speakers used in large venues include Clair Cohesion series CO-12. In addition, the speakers are not limited to line array speakers. FIG. 21 illustrates the speakers being fed by audio amplifiers 178. As with the speakers 179 the illustrated number of the audio amplifiers 178 is for illustration purposes. The number of audio amplifiers, as well as the number and type of speakers, may be readily determined by one skilled in the art of live sound system design. The speakers 179 may, alternatively, be active speakers (i.e., include built in amplifiers), eliminating the need for the audio amplifiers 178. An example of a self-powered speaker suitable for large venues is the Panther by Meyer Sound.

Note that while FIG. 21 depicts a large-venue concert system, the vocal backing track synchronization unit 175 is not limited to such and may be used in live sound venues of any size. For example, a prosumer-level live sound mixer, digital audio workstation, or even a laptop computer, coupled with external audio converters, could be substituted for the front-of-house mixer 176. PA speakers 228, such as those illustrated in FIG. 31, may be substituted for the speakers 179 and audio amplifiers 178 in FIG. 21.

The variations described, the general principles taught, and undescribed variations, devices, and systems that encompass the general principles described in this disclosure, are within the claim's scope.

The invention claimed is:

1. A method, comprising:

preprocessing a prerecorded vocal backing track before a live vocal performance by identifying, extracting, and time stamping backing track vocal elements, creating timestamped vocal elements;

capturing the live vocal performance with a microphone, a microphone preamplifier, and an analog-to-digital converter to produce a live vocal stream that digitally represents the live vocal performance;

identifying and extracting vocal elements from the live vocal stream in realtime;

dynamically controlling timing of the prerecorded vocal backing track in realtime during the live vocal performance by matching the vocal elements to the time-stamped vocal elements from the prerecorded vocal backing track by using at least one processor of one or more processors, resulting in a dynamically controlled prerecorded vocal backing track; and playing back the dynamically controlled prerecorded vocal backing track to an audience in realtime, time-synchronized to the live vocal performance.

2. A method, comprising:

capturing a live vocal performance with a microphone, a microphone preamplifier, and an analog-to-digital converter to produce a live vocal stream that digitally represents the live vocal performance;

identifying and extracting vocal elements in realtime from the live vocal stream and dynamically controlling timing of a prerecorded vocal backing track in realtime using the vocal elements extracted from the live vocal stream matched to timestamped vocal elements from the prerecorded vocal backing track by using at least one processor of one or more processors; and outputting a resulting dynamically controlled prerecorded vocal backing track in realtime that is time-synchronized to the live vocal stream.

3. The method of claim 2, wherein:

dynamically controlling the timing of the prerecorded vocal backing track in realtime includes using time compression and expansion of the prerecorded vocal backing track based on timing differences between the vocal elements extracted from the live vocal stream and the timestamped vocal elements from the prerecorded vocal backing track.

4. The method of claim 2, wherein:

the timestamped vocal elements include timestamped phonemes;

the vocal elements include phonemes;

identifying and extracting the phonemes from the live vocal stream in realtime; and dynamically controlling the timing of the prerecorded vocal backing track in realtime using the phonemes matched to the timestamped phonemes from the prerecorded vocal backing track.

5. The method of claim 4, wherein:

dynamically controlling the timing of the prerecorded vocal backing track in realtime includes using time compression and expansion of the prerecorded vocal backing track based on timing differences between the phonemes extracted from the live vocal stream and corresponding matched timestamped phonemes from the prerecorded vocal backing track.

6. The method of claim 2, wherein:

the vocal elements include vector embeddings; and dynamically controlling the timing of the prerecorded vocal backing track in realtime using the vector embeddings extracted from the live vocal stream performance matched to timestamped vector embeddings from the prerecorded vocal backing track.

7. The method of claim 6, wherein:

dynamically controlling the timing of the prerecorded vocal backing track in realtime includes using time compression and expansion of the prerecorded vocal backing track based on timing differences between the vector embeddings extracted from the live vocal stream performance and corresponding timestamped vector embeddings from the prerecorded vocal backing track.

8. The method of claim 2, wherein:

the vocal elements include vocal audio spectra; and dynamically controlling the timing of the prerecorded vocal backing track in realtime using the vocal audio spectra extracted from the live vocal stream matched to timestamped vocal audio spectra from the prerecorded vocal backing track.

9. The method of claim 8, wherein:

dynamically controlling the timing of the prerecorded vocal backing track in realtime includes using time compression and expansion of the prerecorded vocal backing track based on timing differences between the vocal audio spectra extracted from the live vocal stream and corresponding matched timestamped vocal audio spectra from the prerecorded vocal backing track.

10. The method of claim 2, wherein:

the vocal elements include two or more types of vocal elements; and dynamically controlling timing of the prerecorded vocal backing track in realtime using the two or more types of vocal elements extracted from the live vocal stream matched to corresponding timestamped two or more types of vocal elements from the prerecorded vocal backing track.

11. The method of claim 10, further comprising:

obtaining a confidence weight by comparing the two or more types of vocal elements to the corresponding timestamped two or more types of vocal elements; and dynamically controlling the timing of the prerecorded vocal backing track based at least in part whether the confidence weight is above or below a predetermined confidence threshold.

12. The method of claim 2, wherein:

the vocal elements include phonemes and vocal audio spectra; and dynamically controlling the timing of the prerecorded vocal backing track in realtime using the phonemes and the vocal audio spectra extracted from the live vocal stream matched to corresponding timestamped phonemes and timestamped vocal audio spectra from the prerecorded vocal backing track.

13. The method of claim 12, further comprising:

obtaining a confidence weight by comparing the phonemes and the vocal audio spectra from the live vocal stream to the corresponding timestamped phonemes and the timestamped vocal audio spectra; and dynamically controlling the timing of the prerecorded vocal backing track based at least in part whether the confidence weight is above or below a predetermined confidence threshold.

14. The method of claim 2, wherein:

the vocal elements include phonemes and vector embeddings; and dynamically controlling the timing of the prerecorded vocal backing track in realtime using the phonemes and the vector embeddings extracted from the live vocal stream matched to corresponding timestamped phonemes and timestamped vector embeddings from the prerecorded vocal backing track.

15. The method of claim 14, further comprising:

obtaining a confidence weight by comparing the phonemes and the vector embeddings from the live vocal stream to the corresponding timestamped phonemes and the timestamped vector embeddings; and dynamically controlling the timing of the prerecorded vocal backing track based at least in part whether the confidence weight is above or below a predetermined confidence threshold.

16. The method of claim 2, wherein:

the vocal elements include vocal audio spectra and vector embeddings; and dynamically controlling the timing of the prerecorded vocal backing track in realtime using the vocal audio spectra and the vector embeddings extracted from the live vocal stream matched to corresponding timestamped vocal audio spectra and corresponding timestamped vector embeddings from the prerecorded vocal backing track.

17. The method of claim 16, further comprising:

obtaining a confidence weight by comparing the vocal audio spectra and the vector embeddings from the live vocal stream to the corresponding timestamped vocal audio spectra and the corresponding timestamped vector embeddings; and dynamically controlling the timing of the prerecorded vocal backing track based at least in part whether the confidence weight is above or below a predetermined confidence threshold.

18. A system, comprising:

a microphone preamplifier structured to receive a live vocal performance from a microphone;

an analog-to-digital converter connected to the microphone preamplifier and structured to produce a digital audio signal as a live vocal stream that digitally represents the live vocal performance;

one or more processors;

a tangible medium that includes non-transitory computer-readable instructions that, when applied to at least one processor of the one or more processors, instructs the at least one processor to perform a method comprising:

identifying and extracting vocal elements in realtime from the live vocal stream and dynamically controlling timing of a prerecorded vocal backing track in realtime using the vocal elements extracted from the live vocal stream matched to timestamped vocal elements from the prerecorded vocal backing track; and outputting a resulting dynamically controlled prerecorded vocal backing track in realtime that is time-synchronized to the live vocal stream.

19. The system of claim 18, wherein:

the vocal elements include two or more types of vocal elements; and the tangible medium further instructs the at least one processor to dynamically control the timing of the prerecorded vocal backing track in realtime using the two or more types of vocal elements matched to corresponding timestamped two or more types of vocal elements from the prerecorded vocal backing track.

20. The system of claim 19, wherein:

the tangible medium further instructs the at least one processor to obtain a confidence weight by comparing the two or more types of vocal elements to the corresponding timestamped two or more types of vocal elements; and dynamically controlling the timing of the prerecorded vocal backing track based on at least in part whether the confidence weight is above or below a predetermined confidence threshold.

21. The system of claim 18, wherein:

the vocal elements include phonemes; and the tangible medium instructs the at least one processor to dynamically control the timing of the prerecorded vocal backing track in realtime using phonemes extracted from the live vocal stream matched to timestamped phonemes from the prerecorded vocal backing track.

22. The system of claim 21, wherein:

the tangible medium instructs the at least one processor to dynamically control the timing of the prerecorded vocal backing track in realtime using time compression and expansion of the prerecorded vocal backing track based on timing differences between the phonemes extracted from the live vocal stream and the timestamped phonemes from the prerecorded vocal backing track.

23. The system of claim 18, wherein:

the vocal elements include vector embeddings; and the tangible medium further instructs the at least one processor to dynamically controlling the timing of the prerecorded vocal backing track in realtime using the vector embeddings extracted from the live vocal stream matched to timestamped vector embeddings from the prerecorded vocal backing track.

24. The system of claim 23, wherein:

the tangible medium further instructs the at least one processor to dynamically control the timing of the prerecorded vocal backing track in realtime includes using time compression and expansion of the prerecorded vocal backing track based on timing differences between the vector embeddings extracted from the live vocal stream and corresponding timestamped vector embeddings from the prerecorded vocal backing track.

25. The system of claim 18, wherein:

the vocal elements include vocal audio spectra; and the tangible medium further instructs the at least one processor to dynamically controlling the timing of the prerecorded vocal backing track in realtime using the vocal audio spectra extracted from the live vocal stream matched to timestamped vocal audio spectra from the prerecorded vocal backing track.

26. The system of claim 25, wherein:

the tangible medium further instructs the at least one processor to dynamically control the timing of the prerecorded vocal backing track in realtime includes using time compression and expansion of the prerecorded vocal backing track based on timing differences between the vocal audio spectra extracted from the live vocal stream and corresponding matched timestamped vocal audio spectra from the prerecorded vocal backing track.

27. The system of claim 18, wherein:

the vocal elements include phonemes and vocal audio spectra; and the tangible medium further instructs the at least one processor to dynamically control the timing of the prerecorded vocal backing track in realtime using the phonemes and the vocal audio spectra extracted from the live vocal stream matched to corresponding timestamped phonemes and timestamped vocal audio spectra from the prerecorded vocal backing track.

28. The system of claim 27, further comprising:

the tangible medium further instructs the at least one processor to obtain a confidence weight by comparing the phonemes and the vocal audio spectra from the live vocal stream to the corresponding timestamped phonemes and the timestamped vocal audio spectra; and dynamically controlling the timing of the prerecorded vocal backing track based at least in part whether the confidence weight is above or below a predetermined confidence threshold.

29. The system of claim 18, wherein:

the vocal elements include vocal audio spectra and vector embeddings; and the tangible medium further instructs the at least one processor to dynamically control the timing of the prerecorded vocal backing track in realtime using the vocal audio spectra and the vector embeddings extracted from the live vocal stream matched to corresponding timestamped vocal audio spectra and corresponding timestamped vector embeddings from the prerecorded vocal backing track.

30. The system of claim 29, further comprising:

the tangible medium further instructs the at least one processor to obtain a confidence weight by comparing the vocal audio spectra and the vector embeddings from the live vocal stream to the corresponding timestamped vocal audio spectra and the corresponding timestamped vector embeddings; and dynamically controlling the timing of the prerecorded vocal backing track based at least in part whether the confidence weight is above or below a predetermined confidence threshold.

* * * * *